United States Patent
Domenikos et al.

(10) Patent No.: US 8,359,278 B2
(45) Date of Patent: Jan. 22, 2013

(54) IDENTITY PROTECTION

(75) Inventors: Steven D. Domenikos, Millis, MA (US); Stamatis Astras, Boston, MA (US); Iris Seri, Roslindale, MA (US)

(73) Assignee: IndentityTruth, Inc., Waltham, MA (US)

( * ) Notice: Subject to any disclaimer, the term of this patent is extended or adjusted under 35 U.S.C. 154(b) by 321 days.

(21) Appl. No.: 11/846,305

(22) Filed: Aug. 28, 2007

(65) Prior Publication Data

US 2008/0103799 A1 May 1, 2008

Related U.S. Application Data

(60) Provisional application No. 60/854,237, filed on Oct. 25, 2006.

(51) Int. Cl.
G06Q 99/00 (2006.01)
(52) U.S. Cl. ......................................... 705/325; 705/1.1
(58) Field of Classification Search ................... 705/325
See application file for complete search history.

(56) References Cited

U.S. PATENT DOCUMENTS

| | | | |
|---|---|---|---|
| 5,274,547 A | 12/1993 | Zoffel et al. | |
| 5,323,315 A | 6/1994 | Highbloom | |
| 5,696,965 A | 12/1997 | Dedrick | |
| 5,742,775 A | 4/1998 | King | |
| 5,752,242 A | 5/1998 | Havens | |
| 5,809,478 A | 9/1998 | Greco et al. | |
| 5,872,921 A | 2/1999 | Zahariev et al. | |
| 5,878,403 A | 3/1999 | DeFrancesco et al. | |
| 5,879,297 A * | 3/1999 | Haynor et al. | 600/407 |
| 5,943,666 A | 8/1999 | Kleewein et al. | |
| 5,999,907 A | 12/1999 | Donner | |
| 6,023,694 A | 2/2000 | Kouchi et al. | |
| 6,029,149 A | 2/2000 | Dykstra et al. | |
| 6,029,194 A | 2/2000 | Tilt | |
| 6,125,985 A | 10/2000 | Amdahl et al. | |
| 6,142,283 A | 11/2000 | Amdahl et al. | |
| 6,144,988 A | 11/2000 | Kappel | |
| 6,249,228 B1 | 6/2001 | Shirk et al. | |
| 6,253,203 B1 | 6/2001 | O'Flaherty et al. | |
| 6,263,447 B1 | 7/2001 | French et al. | |
| 6,282,658 B2 | 8/2001 | French et al. | |
| 6,317,783 B1 | 11/2001 | Freishtat et al. | |
| 6,321,339 B1 | 11/2001 | French et al. | |

(Continued)

FOREIGN PATENT DOCUMENTS

| | | |
|---|---|---|
| EP | 1519281 | 3/2005 |
| JP | 10-257177 | 9/1998 |

(Continued)

OTHER PUBLICATIONS

"ID Analytics ID Network", from www.idanalytics.com, as retrieved from Internet Archive, dated Nov. 20, 2005 or earlier; attached as "ID Network (IDNb)".*

(Continued)

*Primary Examiner* — Traci Casler
(74) *Attorney, Agent, or Firm* — Winstead PC

(57) ABSTRACT

In general, in one aspect, the invention relates to a system for providing identity protection that, in one embodiment, includes a fraud model for specifying patterns of events indicative of identity fraud and a business rules subsystem used to identify fraud that is specified by the fraud models. The system aggregates data from a variety of sources, and has an analytical engine that operates on the aggregated data and determines, using the business rules, whether there are events that are correlative with the fraud models that are indicative of fraud.

11 Claims, 30 Drawing Sheets

U.S. PATENT DOCUMENTS

| | | |
|---|---|---|
| 6,448,889 B1 | 9/2002 | Hudson |
| 6,456,984 B1 | 9/2002 | Demoff et al. |
| 6,496,936 B1 | 12/2002 | French et al. |
| 6,532,459 B1 | 3/2003 | Berson |
| 6,553,495 B1 | 4/2003 | Johansson et al. |
| 6,612,488 B2 | 9/2003 | Suzuki |
| 6,700,220 B2 | 3/2004 | Bayeur et al. |
| 6,740,875 B1 | 5/2004 | Ishikawa et al. |
| 6,811,082 B2 | 11/2004 | Wong |
| 6,857,073 B2 | 2/2005 | French et al. |
| 6,866,586 B2 | 3/2005 | Oberberger et al. |
| 6,871,287 B1 | 3/2005 | Ellingson |
| 6,913,194 B2 | 7/2005 | Suzuki |
| 6,918,038 B1 | 7/2005 | Smith et al. |
| 6,930,707 B2 | 8/2005 | Bates et al. |
| 6,965,997 B2 | 11/2005 | Dutta |
| 6,991,174 B2 | 1/2006 | Zuili |
| 7,028,052 B2 | 4/2006 | Chapman et al. |
| 7,035,855 B1 | 4/2006 | Kilger et al. |
| 7,083,090 B2 | 8/2006 | Zuili |
| 7,089,592 B2 | 8/2006 | Adjaoute |
| 7,092,891 B2 | 8/2006 | Maus et al. |
| 7,104,444 B2 | 9/2006 | Suzuki |
| 7,174,335 B2 | 2/2007 | Kameda |
| 7,212,995 B2 | 5/2007 | Schulkins |
| 7,222,779 B1 | 5/2007 | Pineda-Sanchez et al. |
| 7,225,977 B2 * | 6/2007 | Davis ............................ 235/380 |
| 7,234,156 B2 | 6/2007 | French et al. |
| 7,240,363 B1 | 7/2007 | Ellingson |
| 7,246,067 B2 | 7/2007 | Austin et al. |
| 7,254,560 B2 | 8/2007 | Singhal |
| 7,272,857 B1 | 9/2007 | Everhart |
| 7,290,704 B1 * | 11/2007 | Ball et al. ....................... 235/380 |
| 7,314,162 B2 | 1/2008 | Carr et al. |
| 7,370,044 B2 | 5/2008 | Mulhern et al. |
| 7,386,506 B2 * | 6/2008 | Aoki et al. ....................... 705/38 |
| 7,392,534 B2 | 6/2008 | Lu et al. |
| 7,398,915 B1 | 7/2008 | Pineda-Sanchez et al. |
| 7,438,226 B2 | 10/2008 | Helsper et al. |
| 7,458,508 B1 * | 12/2008 | Shao et al. .................... 235/380 |
| 7,466,235 B1 | 12/2008 | Kolb et al. |
| 7,480,631 B1 | 1/2009 | Merced et al. |
| 7,481,363 B2 | 1/2009 | Zuili |
| 7,490,052 B2 | 2/2009 | Kilger et al. |
| 7,497,374 B2 | 3/2009 | Helsper et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,740 B2 | 6/2009 | Greene et al. |
| 7,548,886 B2 | 6/2009 | Kirkland et al. |
| 7,552,467 B2 | 6/2009 | Lindsay |
| 7,562,814 B1 | 7/2009 | Shao et al. |
| 7,568,616 B2 | 8/2009 | Zuili |
| 7,591,425 B1 | 9/2009 | Zuili et al. |
| 7,593,891 B2 | 9/2009 | Kornegay et al. |
| 7,606,790 B2 | 10/2009 | Levy |
| 7,610,229 B1 | 10/2009 | Kornegay et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,686,214 B1 | 3/2010 | Shao et al. |
| 7,689,007 B2 | 3/2010 | Bous et al. |
| 7,701,364 B1 | 4/2010 | Zilberman |
| 7,707,163 B2 | 4/2010 | Anzalone et al. |
| 7,708,200 B2 | 5/2010 | Helsper et al. |
| 7,711,636 B2 | 5/2010 | Robida et al. |
| 7,720,750 B2 | 5/2010 | Brody et al. |
| 7,735,125 B1 | 6/2010 | Alvarez et al. |
| 7,742,982 B2 | 6/2010 | Chaudhuri et al. |
| 7,747,559 B2 | 6/2010 | Leitner et al. |
| 7,752,236 B2 | 7/2010 | Williams et al. |
| 7,761,384 B2 | 7/2010 | Madhogarhia |
| 7,774,270 B1 | 8/2010 | MacCloskey |
| 7,779,456 B2 | 8/2010 | Dennis et al. |
| 7,779,457 B2 | 8/2010 | Taylor |
| 7,788,184 B2 | 8/2010 | Kane |
| 7,792,864 B1 | 9/2010 | Rice |
| 7,793,835 B1 | 9/2010 | Coggeshall et al. |
| 7,801,828 B2 | 9/2010 | Candella et al. |
| 7,805,391 B2 | 9/2010 | Friedlander et al. |
| 7,840,459 B1 | 11/2010 | Loftesness et al. |
| 7,860,769 B2 | 12/2010 | Benson |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,874,488 B2 | 1/2011 | Parkinson |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens |
| 7,933,835 B2 | 4/2011 | Keane et al. |
| 7,950,577 B1 | 5/2011 | Daniel |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,971,246 B1 | 6/2011 | Emigh et al. |
| 7,975,299 B1 | 7/2011 | Balducci et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,271 B2 | 9/2011 | Grant |
| 8,027,518 B2 | 9/2011 | Baker et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,449 B2 | 10/2011 | Hu et al. |
| 8,032,927 B2 | 10/2011 | Ross |
| 8,037,512 B2 | 10/2011 | Wright et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,915 B2 | 11/2011 | Voice et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 2002/0010684 A1 | 1/2002 | Moskowitz |
| 2002/0019938 A1 | 2/2002 | Aarons |
| 2002/0042879 A1 | 4/2002 | Gould et al. |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0080256 A1 | 6/2002 | Bates et al. |
| 2002/0087460 A1 | 7/2002 | Hornung |
| 2002/0130176 A1 | 9/2002 | Suzuki |

| Publication No. | Date | Name | | Publication No. | Date | Name |
|---|---|---|---|---|---|---|
| 2002/0138751 A1 | 9/2002 | Dutta | | 2006/0282395 A1 | 12/2006 | Leibowitz |
| 2002/0173994 A1 | 11/2002 | Ferguson | | 2006/0287902 A1 | 12/2006 | Helsper et al. |
| 2003/0004879 A1 | 1/2003 | Demoff et al. | | 2006/0294023 A1 | 12/2006 | Lu |
| 2003/0009426 A1 | 1/2003 | Ruiz-Sanchez | | 2007/0011100 A1 | 1/2007 | Libin et al. |
| 2003/0057278 A1 | 3/2003 | Wong | | 2007/0016521 A1 | 1/2007 | Wang |
| 2003/0070101 A1 | 4/2003 | Buscemi | | 2007/0016522 A1 | 1/2007 | Wang |
| 2003/0143980 A1 | 7/2003 | Choi et al. | | 2007/0038568 A1 | 2/2007 | Greene et al. |
| 2003/0149744 A1 | 8/2003 | Bierre et al. | | 2007/0040017 A1 | 2/2007 | Kozlay |
| 2003/0222500 A1 | 12/2003 | Bayeur et al. | | 2007/0040019 A1 | 2/2007 | Berghel et al. |
| 2003/0233278 A1 | 12/2003 | Marshall | | 2007/0043577 A1 | 2/2007 | Kasower |
| 2004/0004117 A1 | 1/2004 | Suzuki | | 2007/0048765 A1 | 3/2007 | Abramson |
| 2004/0005912 A1 | 1/2004 | Hubbe et al. | | 2007/0050638 A1 | 3/2007 | Rasti |
| 2004/0026496 A1 | 2/2004 | Zuili | | 2007/0061273 A1 | 3/2007 | Greene et al. |
| 2004/0107363 A1 | 6/2004 | Monteverde | | 2007/0072190 A1 | 3/2007 | Aggarwal |
| 2004/0111335 A1 | 6/2004 | Black et al. | | 2007/0073622 A1 | 3/2007 | Kane |
| 2004/0149820 A1 | 8/2004 | Zuili | | 2007/0073630 A1 | 3/2007 | Greene et al. |
| 2004/0149827 A1 | 8/2004 | Zuili | | 2007/0078786 A1 | 4/2007 | Bous et al. |
| 2004/0153656 A1 | 8/2004 | Cluts et al. | | 2007/0083460 A1 | 4/2007 | Bachenheimer |
| 2004/0153663 A1 * | 8/2004 | Clark et al. .................. 713/200 | | 2007/0087795 A1 | 4/2007 | Aletto et al. |
| 2004/0158723 A1 | 8/2004 | Root | | 2007/0100774 A1 | 5/2007 | Abdon |
| 2004/0230538 A1 | 11/2004 | Clifton et al. | | 2007/0106611 A1 | 5/2007 | Larsen |
| 2004/0234117 A1 | 11/2004 | Tibor | | 2007/0107050 A1 | 5/2007 | Selvarajan |
| 2004/0243539 A1 | 12/2004 | Skurtovich et al. | | 2007/0109103 A1 | 5/2007 | Jedrey et al. |
| 2004/0243567 A1 | 12/2004 | Levy | | 2007/0110282 A1 | 5/2007 | Millsapp |
| 2004/0254868 A1 | 12/2004 | Kirkland et al. | | 2007/0112667 A1 * | 5/2007 | Rucker ........................... 705/38 |
| 2005/0001028 A1 | 1/2005 | Zuili | | 2007/0112668 A1 * | 5/2007 | Celano et al. ................. 705/38 |
| 2005/0021476 A1 | 1/2005 | Candella et al. | | 2007/0124270 A1 | 5/2007 | Page |
| 2005/0021519 A1 | 1/2005 | Ghouri | | 2007/0157299 A1 | 7/2007 | Hare |
| 2005/0050577 A1 | 3/2005 | Westbrook et al. | | 2007/0174208 A1 | 7/2007 | Black et al. |
| 2005/0065874 A1 | 3/2005 | Lefner et al. | | 2007/0179903 A1 | 8/2007 | Seinfeld et al. |
| 2005/0071282 A1 | 3/2005 | Lu et al. | | 2007/0180209 A1 | 8/2007 | Tallman |
| 2005/0081052 A1 | 4/2005 | Washington | | 2007/0186276 A1 | 8/2007 | McRae et al. |
| 2005/0086161 A1 | 4/2005 | Gallant | | 2007/0198410 A1 | 8/2007 | Labgold et al. |
| 2005/0097364 A1 | 5/2005 | Edeki et al. | | 2007/0205266 A1 | 9/2007 | Carr et al. |
| 2005/0125226 A1 | 6/2005 | Magee | | 2007/0214037 A1 | 9/2007 | Shubert et al. |
| 2005/0125686 A1 | 6/2005 | Brandt | | 2007/0214076 A1 | 9/2007 | Robida et al. |
| 2005/0144143 A1 | 6/2005 | Freiberg | | 2007/0219928 A1 | 9/2007 | Madhogarhia |
| 2005/0154671 A1 | 7/2005 | Doan et al. | | 2007/0220594 A1 | 9/2007 | Tulsyan |
| 2005/0165667 A1 | 7/2005 | Cox | | 2007/0234427 A1 | 10/2007 | Gardner et al. |
| 2005/0187863 A1 | 8/2005 | Whinery et al. | | 2007/0244807 A1 | 10/2007 | Andringa et al. |
| 2005/0203885 A1 | 9/2005 | Chenevich et al. | | 2007/0250704 A1 | 10/2007 | Hallam-Baker |
| 2005/0216953 A1 | 9/2005 | Ellingson | | 2007/0250920 A1 | 10/2007 | Lindsay |
| 2005/0242173 A1 | 11/2005 | Suzuki | | 2007/0266439 A1 * | 11/2007 | Kraft .............................. 726/26 |
| 2005/0257261 A1 | 11/2005 | Shraim et al. | | 2007/0291995 A1 | 12/2007 | Rivera |
| 2005/0279869 A1 | 12/2005 | Barklage | | 2007/0292006 A1 | 12/2007 | Johnson |
| 2006/0004622 A1 | 1/2006 | Fanelli et al. | | 2007/0294104 A1 | 12/2007 | Boaz et al. |
| 2006/0004663 A1 | 1/2006 | Singhal | | 2008/0027857 A1 | 1/2008 | Benson |
| 2006/0041464 A1 | 2/2006 | Powers et al. | | 2008/0027858 A1 | 1/2008 | Benson |
| 2006/0045105 A1 | 3/2006 | Dobosz et al. | | 2008/0059236 A1 | 3/2008 | Cartier |
| 2006/0047605 A1 | 3/2006 | Ahmad | | 2008/0059352 A1 | 3/2008 | Chandran |
| 2006/0047725 A1 | 3/2006 | Bramson | | 2008/0059366 A1 | 3/2008 | Fou |
| 2006/0064374 A1 | 3/2006 | Helsper et al. | | 2008/0076386 A1 | 3/2008 | Khetawat et al. |
| 2006/0069697 A1 | 3/2006 | Shraim et al. | | 2008/0098222 A1 | 4/2008 | Zilberman |
| 2006/0074798 A1 | 4/2006 | Din et al. | | 2008/0103798 A1 | 5/2008 | Domenikos et al. |
| 2006/0075028 A1 | 4/2006 | Zager et al. | | 2008/0103799 A1 | 5/2008 | Domenikos et al. |
| 2006/0080230 A1 | 4/2006 | Freiberg | | 2008/0103800 A1 | 5/2008 | Domenikos et al. |
| 2006/0080263 A1 | 4/2006 | Willis et al. | | 2008/0103811 A1 | 5/2008 | Sosa |
| 2006/0089905 A1 | 4/2006 | Song et al. | | 2008/0103972 A1 | 5/2008 | Lanc |
| 2006/0101508 A1 | 5/2006 | Taylor | | 2008/0120237 A1 | 5/2008 | Lin |
| 2006/0143073 A1 | 6/2006 | Engel et al. | | 2008/0126116 A1 | 5/2008 | Singhai |
| 2006/0144924 A1 | 7/2006 | Stover | | 2008/0162383 A1 | 7/2008 | Kraft |
| 2006/0149580 A1 | 7/2006 | Helsper et al. | | 2008/0189789 A1 | 8/2008 | Lamontagne |
| 2006/0149674 A1 | 7/2006 | Cook et al. | | 2008/0208548 A1 | 8/2008 | Metzger et al. |
| 2006/0168202 A1 | 7/2006 | Reshef et al. | | 2008/0208726 A1 | 8/2008 | Tsantes et al. |
| 2006/0178971 A1 | 8/2006 | Owen et al. | | 2008/0217400 A1 | 9/2008 | Portano |
| 2006/0178982 A1 | 8/2006 | Ramsey et al. | | 2008/0244717 A1 | 10/2008 | Jelatis et al. |
| 2006/0179004 A1 | 8/2006 | Fuchs | | 2008/0288430 A1 | 11/2008 | Friedlander et al. |
| 2006/0200855 A1 | 9/2006 | Willis | | 2008/0288790 A1 | 11/2008 | Wilson |
| 2006/0224409 A1 | 10/2006 | Leininger et al. | | 2008/0294689 A1 | 11/2008 | Metzger et al. |
| 2006/0239512 A1 | 10/2006 | Petrillo | | 2008/0296367 A1 | 12/2008 | Parkinson |
| 2006/0239513 A1 | 10/2006 | Song et al. | | 2008/0296382 A1 | 12/2008 | Connell, II et al. |
| 2006/0255914 A1 | 11/2006 | Westman | | 2008/0300877 A1 | 12/2008 | Gilbert et al. |
| 2006/0271456 A1 | 11/2006 | Romain et al. | | 2009/0007220 A1 | 1/2009 | Ormazabal et al. |
| 2006/0271457 A1 * | 11/2006 | Romain et al. ................. 705/35 | | 2009/0018934 A1 | 1/2009 | Peng et al. |
| 2006/0271507 A1 | 11/2006 | Anzalone et al. | | 2009/0021349 A1 | 1/2009 | Errico et al. |
| 2006/0271568 A1 | 11/2006 | Balkir et al. | | 2009/0024417 A1 | 1/2009 | Marks et al. |
| 2006/0273158 A1 | 12/2006 | Suzuki | | 2009/0024636 A1 | 1/2009 | Shiloh |
| 2006/0282285 A1 | 12/2006 | Helsper et al. | | 2009/0024663 A1 * | 1/2009 | McGovern ................. 707/104.1 |
| 2006/0282372 A1 | 12/2006 | Endres et al. | | 2009/0026270 A1 | 1/2009 | Connell, II et al. |

| | | | |
|---|---|---|---|
| 2009/0079539 A1 | 3/2009 | Johnson | |
| 2009/0099960 A1 | 4/2009 | Robida et al. | |
| 2009/0106153 A1 | 4/2009 | Ezra | |
| 2009/0106846 A1 | 4/2009 | Dupray et al. | |
| 2009/0125439 A1 | 5/2009 | Zarikian et al. | |
| 2009/0126013 A1 | 5/2009 | Atwood et al. | |
| 2009/0138391 A1 | 5/2009 | Dudley et al. | |
| 2009/0141318 A1 | 6/2009 | Hughes | |
| 2009/0151005 A1 | 6/2009 | Bell et al. | |
| 2009/0158404 A1 | 6/2009 | Hahn et al. | |
| 2009/0204457 A1 | 8/2009 | Buhrmann et al. | |
| 2009/0205032 A1 | 8/2009 | Hinton et al. | |
| 2009/0216560 A1 | 8/2009 | Siegel | |
| 2009/0222362 A1 | 9/2009 | Stood et al. | |
| 2009/0222897 A1 | 9/2009 | Carow et al. | |
| 2009/0224875 A1 | 9/2009 | Rabinowitz et al. | |
| 2009/0224889 A1 | 9/2009 | Aggarwal et al. | |
| 2009/0226056 A1 | 9/2009 | Vlachos et al. | |
| 2009/0248198 A1 | 10/2009 | Siegel et al. | |
| 2009/0248497 A1 | 10/2009 | Hueter | |
| 2009/0254484 A1 | 10/2009 | Forero et al. | |
| 2009/0257595 A1 | 10/2009 | de Cesare et al. | |
| 2009/0259560 A1 | 10/2009 | Bachenheimer | |
| 2009/0259588 A1 | 10/2009 | Lindsay | |
| 2009/0259855 A1 | 10/2009 | de Cesare et al. | |
| 2009/0261189 A1 | 10/2009 | Ellis, Jr. | |
| 2009/0270126 A1 | 10/2009 | Liu | |
| 2009/0271617 A1 | 10/2009 | Song et al. | |
| 2009/0272801 A1 | 11/2009 | Connell, II et al. | |
| 2009/0276244 A1 | 11/2009 | Baldwin, Jr. et al. | |
| 2009/0281945 A1 | 11/2009 | Shakkarwar | |
| 2009/0281951 A1 | 11/2009 | Shakkarwar | |
| 2009/0307778 A1 | 12/2009 | Mardikar | |
| 2009/0326972 A1 | 12/2009 | Washington | |
| 2010/0004965 A1 | 1/2010 | Eisen | |
| 2010/0024037 A1 | 1/2010 | Grzymala-Busse et al. | |
| 2010/0031030 A1 | 2/2010 | Kao et al. | |
| 2010/0037308 A1 | 2/2010 | Lin et al. | |
| 2010/0042526 A1 | 2/2010 | Martinov | |
| 2010/0085146 A1 | 4/2010 | Johnson | |
| 2010/0088338 A1 | 4/2010 | Pavoni, Jr. et al. | |
| 2010/0095357 A1 | 4/2010 | Willis et al. | |
| 2010/0100406 A1 | 4/2010 | Lim | |
| 2010/0132043 A1 | 5/2010 | Bjorn et al. | |
| 2010/0145847 A1 | 6/2010 | Zarikian et al. | |
| 2010/0169210 A1 | 7/2010 | Bous et al. | |
| 2010/0169947 A1 | 7/2010 | Sarmah et al. | |
| 2010/0205662 A1 | 8/2010 | Ibrahim et al. | |
| 2010/0218255 A1 | 8/2010 | Ritman et al. | |
| 2010/0229225 A1 | 9/2010 | Sarmah et al. | |
| 2010/0229230 A1 | 9/2010 | Edeki et al. | |
| 2010/0241501 A1 | 9/2010 | Marshall | |
| 2010/0250364 A1 | 9/2010 | Song et al. | |
| 2010/0250411 A1 | 9/2010 | Ogrodski | |
| 2010/0275265 A1 | 10/2010 | Fiske et al. | |
| 2010/0293090 A1 | 11/2010 | Domenikos et al. | |
| 2010/0302157 A1 | 12/2010 | Zilberman | |
| 2010/0306101 A1 | 12/2010 | Lefner et al. | |
| 2010/0313273 A1 | 12/2010 | Freas | |
| 2010/0332292 A1 | 12/2010 | Anderson | |
| 2011/0016042 A1 | 1/2011 | Cho et al. | |
| 2011/0040983 A1 | 2/2011 | Grzymala-Busse et al. | |
| 2011/0060905 A1 | 3/2011 | Stack et al. | |
| 2011/0119291 A1 | 5/2011 | Rice | |
| 2011/0270727 A1 | 11/2011 | Kasower | |
| 2011/0276496 A1 | 11/2011 | Neville et al. | |
| 2011/0289032 A1 | 11/2011 | Crooks et al. | |
| 2011/0289322 A1 | 11/2011 | Rasti | |
| 2011/0295721 A1 | 12/2011 | MacDonald | |
| 2011/0295750 A1 | 12/2011 | Rammal | |
| 2011/0296529 A1 | 12/2011 | Bhanoo et al. | |
| 2011/0302412 A1 | 12/2011 | Deng et al. | |
| 2011/0302641 A1 | 12/2011 | Hald et al. | |

FOREIGN PATENT DOCUMENTS

| | | |
|---|---|---|
| WO | WO-01/04799 | 1/2001 |
| WO | WO-03/010688 | 2/2003 |
| WO | WO-2005/076135 | 8/2005 |
| WO | WO-2006/017937 | 2/2006 |
| WO | WO-97/114108 | 6/2006 |
| WO | WO-2006/058217 | 6/2006 |
| WO | WO-2006/065882 | 6/2006 |

OTHER PUBLICATIONS

"Intersections, Inc. Identity Guard", from www.intersections.com and www.identityguard.com, as retrieved from Internet Archive, dated Nov. 25, 2005 or earlier; attached as "Identity Guard (IDG)".* www.idcops.com; retrieved from www.archive.org any linkage Feb. 16, 2007.*

U.S. Appl. No. 09/557,252, filed Apr. 24, 2000, Page.

Caruso, Denise. "Digital Commerce: Personal Information is Like Gold in the Internet Economy, and the Rush is on to Both Exploit It and Protect It." New York Times, ProQuest Historical Newspapers—The New York Times 1851—2004, (Mar. 1, 1999), p. C4.

Clausing, Jeri. "Report Rings Bell About Privacy on the Internet." New York Times, ProQuest Historical Newspapers—The New York Times 1851—2004, (Feb. 7, 2000), p. C10.

Bose, Ranjit. "Intelligent Technologies for Managing Fraud and Identity Theft." Proceedings of the Third International Conference on Information Technology: New Generations (ITNG'06), IEEE Computer Society, (Apr. 10-12, 2006), pp. 446-451.

Goth, Greg. "Identity Theft Solutions Disagree on Problem." IEEE Distributed Systems Online, IEEE Computer Society (Aug. 2005), vol. 6, Issue 8, pp. 1541-4922.

Holz, Thorsten. "A Short Visit to the Bot Zoo." IEEE Security & Privacy Magazine, IEEE Computer Society (May/Jun. 2005), vol. 3, Issue 3, pp. 76-79.

Lenton, Dominic. "Stand and Deliver: Modern Day Highwaymen Are Making a Mint From Cybercrime." IEEE Review, (May 2005), vol. 51, Issue 5, pp. 24-25.

McCarty, Bill. "Automated Identity Theft." IEEE Security & Privacy, IEEE Computer Society, (Sep./Oct. 2003), vol. 1, Issue 5, pp. 89-92.

Wang, WenJie et al. "A Contextual Framework for Combating Identity Theft." IEEE Security & Privacy Magazine, IEEE Computer Society, (Mar./Apr. 2006), vol. 4, Issue 2, pp. 30-38.

"Pioneers in Identity Theft Protection: Privacy ProBot Technology" [online]. Identity Cops Inc. [retrieved Oct. 11, 2007]. Retrieved from the Internet: <http://www.idcops.com/Default.htm>, 4 pages.

"Identity Cops Wins 'Best New Technology of the Year'" [online]. Identity Cops Inc., Jul. 15, 2005 [retrieved Oct. 11, 2007]. Retrieved from the Internet <http://www.idcops.com/Press%20Release%20July%2017.05%20MESDA%20award.pdf>, 1 page.

"Our Technology: Privacy ProBot" [online]. Identity Cops Inc. [retrieved Oct. 11, 2007]. Retrieved from the Internet: <http://www.idcops.com/ourtechnology.html>, 5 pages.

"IDetective Individual Subscriptions" [online]. Identity Cops Inc. [retrieved Oct. 11, 2007]. Retrieved from the Internet: <http://www.idcops.com/individual.html>, 4 pages.

"Corporate Services" [online]. Identity Cops Inc. [retrieved Oct. 11, 2007]. Retrieved from the Internet: <http://www.idcops.com/corporate.html>, 6 pages.

"Facts About Identity Theft" [online]. Identity Cops Inc. [retrieved Oct. 11, 2007]. Retrieved from the Internet: <http://www.idcops.com/idtheftfacts.html>, 10 pages.

"ID Theft Arena" [online]. Identity Cops Inc. [retrieved Oct. 11, 2007]. Retrieved from the Internet: <http://www.idcops.com/idtheftarena.html>, 3 pages.

"Identity Cops Launches New Product Line and Website," [online]. Identity Cops Inc., Dec. 6, 2005 [retrieved Oct. 11, 2007]. Retrieved from the Internet: <http://www.idcops.com/Press%20Release%20Dec%206.2005.pdf>, 1 page.

"Identity Cops Introduces its Newest Service for Corporate Identity Theft Protection and Recovery," [online]. Identity Cops Inc., Apr. 3, 2006 [retrieved Oct. 11, 2007]. Retrieved from the Internet: <http://www.idcops.com/PR%204.3.06%20IDT%20Response.pdf>, 1 page.

"Identity Cops Inc. Launches "IDENTI-Fl" Financial Institution Field Intelligence" [online]. Identity Cops Inc., Mar. 5, 2007 [retrieved Oct. 11, 2007]. Retrieved from the Internet: <http://www.idcops.com/Press%20Release%20March%2007%20IDENTIFI.pdf>, 2 pages.

"Demonstration—Identity Cops Inc.: Self Defense for the 21st Century" [online]. Identity Cops Inc. [retrieved Oct. 13, 2007] <http://www.idcops.com/privacyconsole.html>, 66 pages.

* cited by examiner

| | Source name | Category | Example Questions Answered | Data |
|---|---|---|---|---|
| 200 | Internet Observation Co. | Wholesale Broker | Are my users' sensitive personal data floating on the Internet? | Social Security Number; Credit Card Number, bank accounts, ATM accounts, etc. |
| 201 | Data Co. | Data Wholesale | Are my users' public data being changed? | General public records |
| 202 | Public Records Co. | Data Wholesalers | Are my users' public data being changed? Is there activity about my users' public records? | Phone and Post Office records; addresses; Registry of Motor Vehicle records |
| 203 | RBOCs | Businesses | Are there any suspicious telephone connections or disconnections associated with my users? | Daily telephone connect/disconnect requests |
| 204 | News Sources | General | Are there any relevant Identity Fraud Incidents, events, etc? | New types of frauds, misuse permutations |
| 205 | Post Office | Government | Is there a change of address request? | National Change of Address request (NCOA) |
| 206 | Anti-phishing organizations | Private | Fraud & Phishing incidents, originating sources, types of attacks | Fraud models, demographic data |
| 207 | FTC | Government | Types of fraud incidents, phishing attacks | Fraud models, demographic data |
| 208 | Credit Bureaus | Businesses | Is a new financial record created in a State that I don't live in? | Credit data |
| 209 | Utility Companies | Businesses | Is there a public record or utility account in a State I don't live in? | New accounts data |

ID truth | Home | My Account | Services | Customer Support | Log out / Feedback

John Smith

2300

Detected Events — 2360
Click to resolve
- There is a new application for credit
  September 18, 2006
- Your SSN was found to have been compromised
  September 24, 2006
- There is a change of address
  August 31, 2006
- There is a new TV cable contract on your name
  August 18, 2006

2305

My Identity Theft Risk — 2310

Good  Average  Bad
0   25   50   75

Real Estate Fraud Pattern — 2320

2 months   1 week
MORE FRAUD PATTERNS

Most probable detected pattern with 3 confirmed events, watch for unauthorized mortgage activity Sign up today for a free trial !
xxxxx xxxxxx xxxxx
xxxxx xxxxxx xxxxx
CLICK HERE ☐

My Identity — 2365

Events — 2370

43

Breaches — 2375

Risk Report — 2380

News — 2330
Breaches — 2340
Local News — 2350

Volutpat Risus Quis Nisi Et Sit Amet Lorem Ipsum Dolor
Volutpat risus quis nisi et sit amet lorem ipsum dolor Privacy / Terms of Use  |  About Us  |  Site map

| Date | Institution | Size | Severity |
|---|---|---|---|
| 11/25/2006 | Kaiser Permanence Colorado | 38000 | 38000 |
| 11/13/2006 | Johnston County (North Carolina) | Unknown | NC |
| 10/22/2006 | Greenville (South Carolina) County School District | 100000 | SC |
| 10/18/2006 | Stolen computers may contain women's Social Security numbers, names, and medical information. CLICK FOR MORE | 1740 | IL |
| 09/14/2006 | | 7500 | IN |
| 09/06/2006 | | 15000 | England |
| 08/30/2006 | New York City Administration for Children's Services | 143 | NY |
| 08/17/2006 | Jefferson College of Health Sciences | 22500 | ME |
| 08/06/2006 | Connors State College | Unknown | AZ |
| 07/28/2006 | Hertz Global Holdings Inc. | 440 | 440 |
| 07/05/2006 | ARCO | 1000 | Japan |
| 06/01/2006 | Los Alamos National Laboratory / KSL Services Inc. | 1000 | MA |
| 05/10/2006 | Calgary Health Region | 5800 | Canada |

2800

2810

Tab. 1 Breaches
Tab. 2 Breaches

John Smith
Log out / Feedback

ID truth | Home | My Account | My Products | Customer Support

My Events vs Breaches

My Identity
My History
My Events vs Breaches
My Risk Level

News
Breaches
Local News

VOLUTPAT RISUS QUIS NISI ET SIT AMET LOREM IPSUM DOLOR
Volutpat risus quis nisi et sit amet Lorem ipsum dolor Privacy / Terms of Use | About Us | Site map

FIG. 29

IDENTITY PROTECTION

CROSS-REFERENCE TO RELATED APPLICATION

This application claims priority to and the benefit of, and incorporates herein by reference in its entirety, U.S. Provisional Patent Application No. 60/854,237, which was filed on Oct. 25, 2006.

TECHNICAL FIELD

The invention generally relates to systems and methods for protecting people from identity theft. More particularly, the invention relates to systems and methods for detecting identity theft by analyzing data from various sources.

BACKGROUND

In today's society, people generally do not know where their private and privileged information may be used, by whom, and for what purpose. This gap in "identity awareness" gives rise to identity theft, which is growing at epidemic proportions.

The concept of identity is not restricted to only persons, but applies also to devices, applications, and physical assets that comprise additional identities to manage and protect in an increasingly networked, interconnected and always-on world.

SUMMARY OF THE INVENTION

There is a need for a solution that delivers greater awareness about personal and sensitive information that may be misused to help reduce risk and better secure individuals' identities. For example, individuals would like to know whether their personal data has been breached (i.e., leaked) without their knowledge, whether their data has been exposed (e.g., traded, exchanged, or bartered), and whether their identity has been misused or compromised in some way. Further, individuals would like to know whether their personal information is properly represented in public records databases.

In general, various aspects of the systems and methods described herein provide solutions that deliver greater awareness about sensitive personal information that may be misused, thereby helping to reduce risk and better secure identities. This information may include business and financial account numbers, social security numbers, medical insurance numbers, credit card information, driver's license numbers, and any other identifying and/or sensitive personal information.

Identity fraud occurs when someone uses such sensitive personal information, possibly along with other identifying information, without permission to commit fraud or other crimes. The solution described herein addresses the problem of identity fraud, in part by considering that a person's identity is not just about data. Compromise of an individual's private data is a prelude to attacking the individual's assets such as accounts, refunds, credit capability, property, etc. To provide an effective solution, an identity model takes into consideration not only private data but also looks at movement of assets linked to that data. For example, it may be possible to monitor the traffic of personal sensitive data to determine whether it is available on the Internet, or has been traded or misused in other ways. Understanding the "traffic" of identity data is useful in understanding behavior and the ability to gain a much greater level of awareness.

Movement of sensitive data may then be associated with possible movement of personal assets. This approach enables determination of probable misuses, both within and outside the credit system, and delivers the earliest possible notification in advance of identity misuses, potentially before they result in a large scale fraud accompanied by high cost and extensive recovery time.

In various embodiments, solutions may provide answers to the following questions:

(1) Has an individual's data been breached with knowledge of the individual and/or the keeper of the data?

(2) Has an individual's sensitive personal data been detected as available, traded, or misused?

(3) Has an individual's identity been misused in any way?

(4) How relevant is a given individual's identity compromise to risk exposure?

In some implementations, a solution may be delivered as an automated service to bridge the gap in awareness by delivering time-sensitive information on a regular basis to reduce risk and help people to better secure their identities. Solutions also may be delivered "on-demand" to allow a user or a business to periodically check the state of an individual's identity compromise.

In general, in one aspect, the invention features a method for specifying an individual's risk of identity theft. The method includes determining a likelihood of identity theft of an individual's assets, specifying a risk of identify theft as a numerical measure of the determined likelihood of identity theft compared to other individuals, and storing the numerical measure as an identity theft risk indicator for that individual. In one embodiment of this aspect of the invention, determining the likelihood of identity theft includes identifying credit-related assets for the individual, determining a value of the credit-related assets that an identity thief could attack, determining a likelihood that an identity thief would attack the identified credit-related assets, and determining demographic information of the individual.

In general, in another aspect, the invention features a method for specifying an individual's risk of identity theft. The method includes identifying credit-related assets for an individual, determining a value for the credit-related assets that an identity thief could attack, determining the likelihood that an identity thief would attack the identified credit-related assets, and determining demographic information of the individual. In addition, the method includes specifying the risk of identity theft as a risk indicia in response to the determined value, the determined likelihood, and the demographic information, and communicating the risk indicia to the individual.

In general, in yet another aspect, the invention features a system for providing identity fraud risk indicia. The system includes a fraud model subsystem for specifying patterns of events indicative of identity fraud and a business rules subsystem that, based on the fraud model, specifies rules to identify fraud. The system also includes a data aggregation subsystem that collects data input from a variety of sources. These data sources include demographic data and asset data for individuals, event occurrence data, identity theft statistical data, and personal data. The system also includes an analytical engine for processing the data aggregated by the data aggregation subsystem to provide a numerical measure of identity theft risk associated with an individual. In one embodiment of this aspect of the invention, the analytical engine determines a likelihood of identity theft by evaluating the individual's credit-related assets, the value of the credit-related assets that an identity thief could attack, a likelihood that an identity thief would attack the identified credit-related assets, and the demographic information of the individual.

The analytical engine may also provide a prediction of fraud events that are likely to occur, which may include a probability that such fraud events are likely to occur, and recommendations of steps to be taken to avoid the predicted fraud events.

Various embodiments of these three aspects of the invention include the following features, or implement system components for achieving the following features. The numerical measure or risk indicia may be an identity health score and may be higher for increased risk and lower for decreased risk, or vice versa. The likelihood of identity theft or the identity theft risk measure may be determined at least in part by the occurrence of a particular event with respect to an individual, for example a change or addition to the individual's personal or credit data or a data breach report from an organization. In some embodiments, the likelihood of identity theft or the measure of identity theft risk is determined at least in part by comparing a fraud model with the event that occurred.

These methods may also include, and the systems may also implement components for, identifying fraud events that are likely to occur, communicating to the individual those fraud events, and providing advice to the individual on steps to take that are relevant to the fraud detected or predicted. The fraud events may be compared to fraud scenarios, and rulesets may be used to evaluate events that have occurred. In addition, the numerical measure or risk indicia may be communicated to the individual or to a financial organization, and the individual may be alerted to a change in the numerical measure or risk indicia over time. The occurrence of identity theft for individuals with a demographic profile may also be determined.

In general, in still another aspect, the invention features a method for evaluating an individual's risk of identity theft. The method includes facilitating communication by an individual of data, determining a numerical measure of the likelihood of identity theft compared to other individuals in response to the communicated data, and communicating the numerical measure to the individual. The data communicated by the individual may include a zip code, a birth year, and a home purchase year.

In various embodiments of this aspect of the invention a communication of additional information regarding the individual is facilitated for further analysis. An indicator may be provided to indicate the usefulness of the additional information, the confidence in the numerical measure in response to the amount of data provided by the individual, and/or that more information is needed to provide the numerical measure to a high degree of confidence. The method may also include providing a display communicating the numerical measure and facilitating subscription to identify fraud monitoring and/or prediction services. Facilitating the subscription may include asking the individual about the individual's relationship to fraud-related events. Furthermore, identity fraud event information may be provided on the display, and a link to a list of events related to identity fraud may also be provided.

In general, in a further aspect, the invention features a method for providing a user interface to assist an individual in evaluating the individual's risk of identity theft. The method includes providing a summary of recent detected events relevant to the individual's risk of identity theft, providing a numeric representation of the risk, along with a descriptive label regarding the numeric representation, and providing a depiction of relevant fraud models.

In various embodiments of this aspect of the invention the numerical representation includes an identity health score. The numerical representation may be higher for increased risk and lower for decreased risk, or vice versa. In some embodiments, providing the numeric representation of risk includes identifying credit-related assets for an individual, determining a value of the credit-related assets that an identity thief could attack, determining a likelihood that the identity thief would attack the identified credit-related assets, and determining demographic information of the individual. Providing the numeric representation of risk may also include considering the occurrence of a particular event with respect to the individual, such as a change or addition to the individual's personal or credit data or a data breach report from an organization. The fraud models may each include a fraud scenario, and the method may further include communicating to the individual fraud events that are likely to occur.

In general, in yet another aspect, the invention features a method for providing a user interface to assist an individual in evaluating the individual's risk of identity theft. The method includes displaying a time-series graph depicting known breaches that have occurred throughout the population, displaying on the time-series graph a depiction of events relevant to the individual's risk of identity theft, facilitating input by the individual of confirmation that the events are relevant to the individual's risk of identity theft, facilitating indication by the individual that certain displayed breaches are relevant to the individual, and storing the input from the individual for use in evaluating the individual's risk of identity theft.

In various embodiments of this aspect of the invention an event is relevant to the individual's risk of identity theft if the individual is directly or indirectly affected by the event. The input may be facilitated by asking the individual whether the individual has a personal connection to the event. The indication may be facilitated by asking the individual whether the individual has an account or data with an entity that has been breached.

BRIEF DESCRIPTION OF THE DRAWINGS

The foregoing and other objects, aspects, features, and advantages of the invention will become more apparent and may be better understood by referring to the following description, taken in conjunction with the accompanying drawings, in which:

FIG. 2 is a demonstrative example table listing data sources in one embodiment in accordance with the invention;

FIG. 8 is an exemplary screen display in one embodiment in accordance with the invention;

FIG. 10 is an exemplary screen display in one embodiment in accordance with the invention;

FIG. 17 is an exemplary home page of an embodiment in accordance with the invention;

FIG. 19 is an exemplary personal information page of an embodiment in accordance with the invention;

FIG. 22 is an exemplary start page for a free trial subscription according to an embodiment of the invention;

FIG. 23 is an exemplary dashboard according to an embodiment of the invention;

FIG. 24 is an exemplary "my identity" screen according to an embodiment of the invention;

FIG. 27 is an exemplary "events vs. breaches" screen according to an embodiment of the invention;

FIG. 28 is an exemplary breaches list display according to an embodiment of the invention;

FIG. 29 is an exemplary identity theft risk distribution screen according to an embodiment of the invention.

DESCRIPTION

Figure 1:
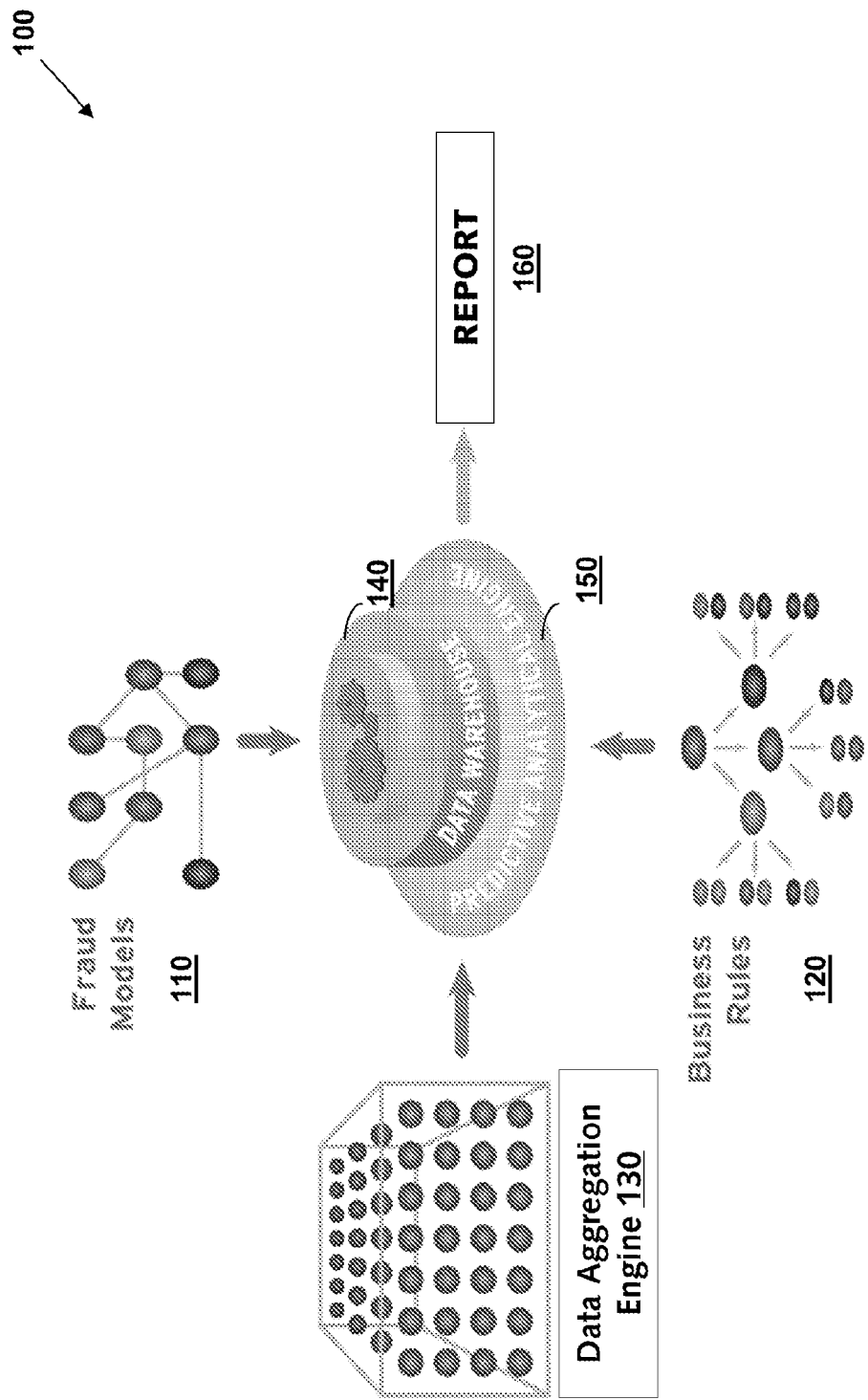
FIG. 1 is a block diagram of an exemplary embodiment of a system in accordance with the invention.

Referring to FIG. 1, an exemplary, demonstrative embodiment 100 makes use of a modular architecture. The system 100 includes fraud models 110, which characterize events that reflect identity misuse scenarios. Business rules 120 specify actions to be taken for identification of patterns indicated by the fraud models 110.

Data is aggregated from a number of different sources for analysis. In one embodiment, public and private data sources provide a view into an individual's identity and asset movement. These sources may include data sources publicly available on the Internet or otherwise, and data vendors. In some embodiments, it is useful to detect activity that would not typically appear on a credit report, and might therefore go undetected for a long time. A data aggregation engine 130 receives data from multiple sources, applies relevancy scores, classifies them in the appropriate categories, and stores them in a data repository for further processing. New data sources may be added as they become available, to continuously improve the effectiveness of the service.

Referring briefly to FIG. 2, a few demonstrative examples of data that may be used includes data from "Internet Observation Co." 200, an exemplary wholesale broker, that observes internet activity to determine whether any user's sensitive personal data (e.g., social security numbers, credit card numbers, bank accounts, ATM accounts, and so on) are "floating," that is, have been publicly communicated or made available over the Internet or have otherwise been traded or misused. The broker may employ search engines and other types of monitoring to identify floating data. Another data wholesale company, "Data Co.," 201 may provide indications about whether a user's public data is being changed. This public data may be available to Data Co. from general public records. Likewise, other data wholesalers, such as "Public Records Co.," 202 may provide information about whether records have been changed. Examples of other data wholesalers 202 who provide commercially available information include TracersInfo, MerlinData, Lexus/Nexus, Thomson-West, MelissaData, LocatePlus, Experian, TransUnion, ChexSystems, Equifax, DataQuick, and InfoUSA, among others. These wholesalers 202 may provide, for example, phone and post office records, government automobile registration and driver's license records, and so on. Telephone companies, such as "RBOCs," 203 may provide telephone business records. These records may indicate whether there are any suspicious telephone connections or disconnections associated with a user. News sources 204 may provide information about identity fraud incidents or events. For example, there may be information about a security breach at a particular financial institution or web site. Announcement of such a breach, for example, may allow the system 100 to alert the user, or inquire as to whether the user uses such financial institution or web site, if the information is not already known to the system 100.

Government agencies, such as the post office 205 in this example, may provide information about address changes. A change of address request may be indicative of a problem, for example, when combined with other events. Like the news sources 204, private organizations that fight identity theft 206, sometimes referred to as anti-phishing organizations, and government organizations 207 that share the same objective, such as the Federal Trade Commission, may publish information about fraud and identity theft incidents, including the originating sources and types of attacks. This information may be used in developing fraud models 110 and business rules 120, and also may be events that may be correlated with other information. For example, this information may be correlated with demographic data to identify risk profiles.

Credit bureaus 208 may provide indication of new financial records being established. Details about a new record, for example, that it is associated with a different name but same social security number, or same name but different address, may be indicative of compromise. Likewise, utility company records 209 may indicate that an account has been opened for a user in an unexpected place. Again, each of these different types of information may be interesting of themselves, but when correlated with other data as described in a fraud model 110, may be useful in the aggregate to identify that identity theft has occurred and/or to analyze the risk that it will occur.

Referring again to FIG. 1, a predictive analytical engine 150 uses the fraud models 110 and business rules 120 to correlate data, identify events in the data, and determine actions to be taken. The analytical engine 150 is responsible for analyzing the independent and highly diverse data sources. Each data source provides useful information, and the analytical engine 150 may associate and connect independent events together, creating another layer of data that may be used by the analytical engine 150 to detect fraud activities that to date may have been undetected. The raw data from the sources and the correlated data produced by the analytical engine may be stored in a secure data warehouse 140.

The results may be provided to end users in various communications, including ongoing monitoring and on-time reporting. Reports 160 may be generated for businesses that relate to the entity and/or customers of the entity, or for individuals.

The system 100 takes an approach of solving an event management problem in some ways analogous to that of network event management. Detecting signatures of identity misuse or potential identity exposure requires careful balancing between eliminating false negatives and limiting the number of false positives, while minimizing overlook.

Fraud models 110 help eliminate false positive notifications while reducing the likelihood of false negatives, just as, for example, detection of computer network intrusion. Each identity event may be analyzed, for example, to determine whether it is indicative of a positive or negative, in light of other events.

Figure 3:
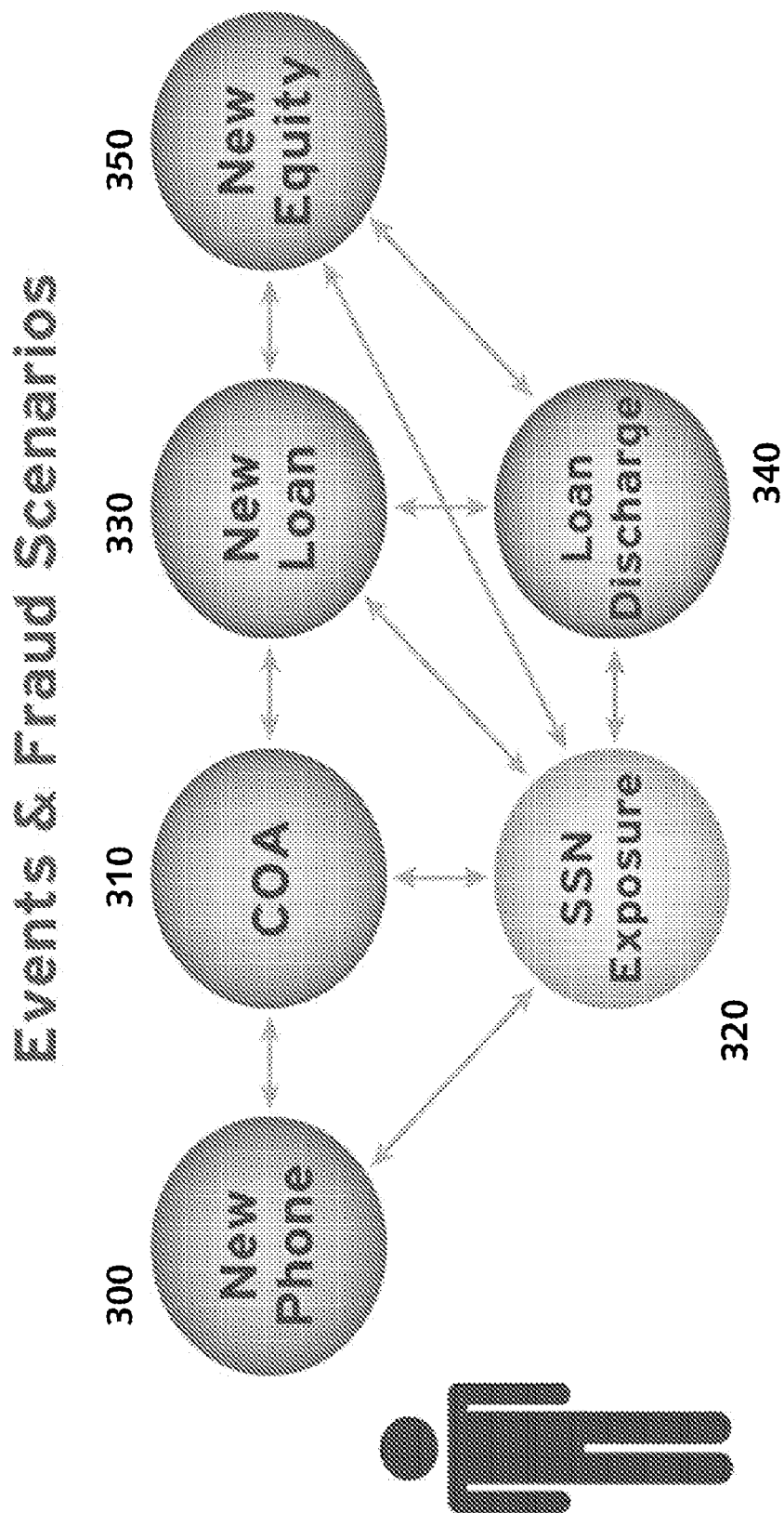
FIG. 3 is a demonstrative example of event and fraud scenarios in one embodiment in accordance with the invention.

Referring briefly to FIG. 3, various fraud scenarios may be evidenced by a combination of events. For example, the registering of a new telephone number 300, the creation of a new account (COA) 310, the reporting of social security number (SSN) exposure 320, the taking out of a new loan 330 and/or a loan discharge 340, and the purchase and/or borrowing against new equity assets 350 may be events that are evidence of identity compromise. These events may take place near each other in time or they make take place over a period of time. SSN exposure 320 followed by the creation of a new account 310, for example, may be stronger evidence of near term exposure than creation of a new account 310 long before the SSN exposure 320. The variations of the scenarios, with respect to timing, for example, or activity, as another example, may be described in the fraud models 110. Persistent analysis of new methods of fraud may be used to develop new fraud models 110 so that the fraud models 110 are kept up to date. Likewise, algorithms and business rules 120 may be continuously expanded to accommodate for new fraud permutations.

Referring again to FIG. 1, in one embodiment, a layer of metadata (not shown) based on temporal analysis and feedback from end-users may be provided back into the engine 150 to help refine the signature detections. This metadata and a relevancy scoring system, built from individual events in comparison with the frequency of occurrence in the related population, and the individual's past history with personal feedback help prevent false positives.

Thus, the system 100 may make use of a combination of event capturing, event processing techniques, powerful predictive algorithms, and a sophisticated software engine that incorporates domain expertise in the form of the identity fraud models 110. Further, similar events and their attributes may be analyzed in aggregate in order to ascertain whether a feature vector of certain attribute values is representative of increased likelihood of fraud for that event. This may allow the system 100 to discriminate between events generated by data entry errors versus those that are generated by true fraud.

Figure 4:
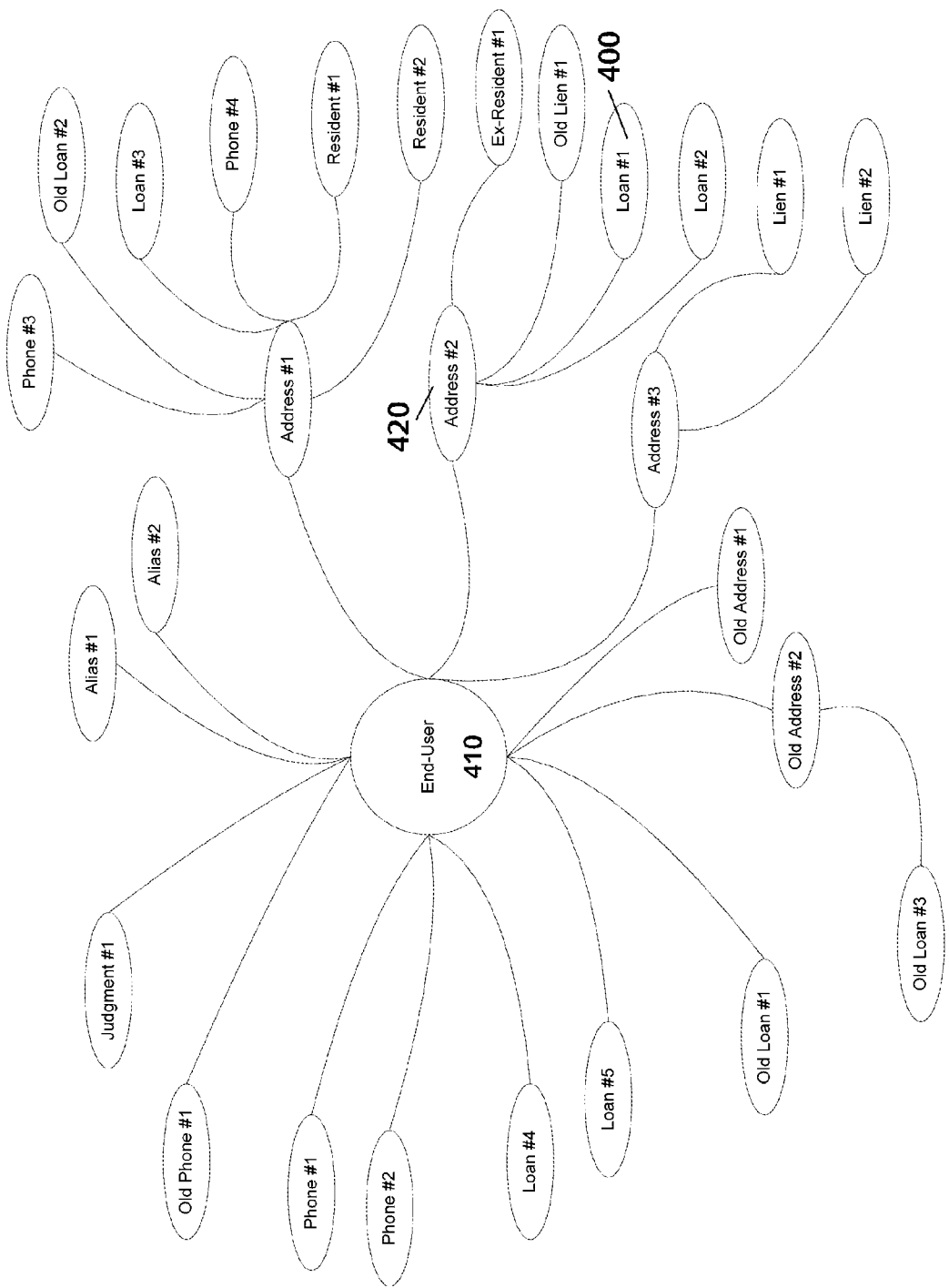
FIG. 4 is an exemplary depiction of a structure of user's data in one embodiment in accordance with the invention.

Referring to FIG. 4, in one embodiment, the analytical engine 150 begins its work by examining the static structure of a subject's most recent data as it relates to the subject's underlying assets. As shown in the example, a loan (e.g., Loan #1 400) may be associated with an End User 410 and also with an address (e.g., Address #2 420). This examination may allow for generating scores and classifications that give a preliminary identity picture of the subject and flags any deviations from a typical identity profile.

Embodiments of the system have been developed with the understanding that compromising someone's personal data may be a prelude to compromising that person's assets. As such, the concept of identity is expanded to include the assets that may be associated with the specific data set. Thus, a graph of this data may be analyzed and compared with fraud models. Generally, this identity-asset data model is not static; its content, structure, and data relationship change as more data about the subject is gathered through monitoring.

For example, an individual may change his or her primary address, phone and other personal identities, or add new ones. The data model reflects identity transition (or addition), rather than discarding the old data. The fraud model 110 may refer to that "old" data in some identity theft scenarios. In some embodiments, the identity-asset data model is easily extendable, as new asset types and personal identities may be added to it without changing the analytical engine 150.

Figure 5:
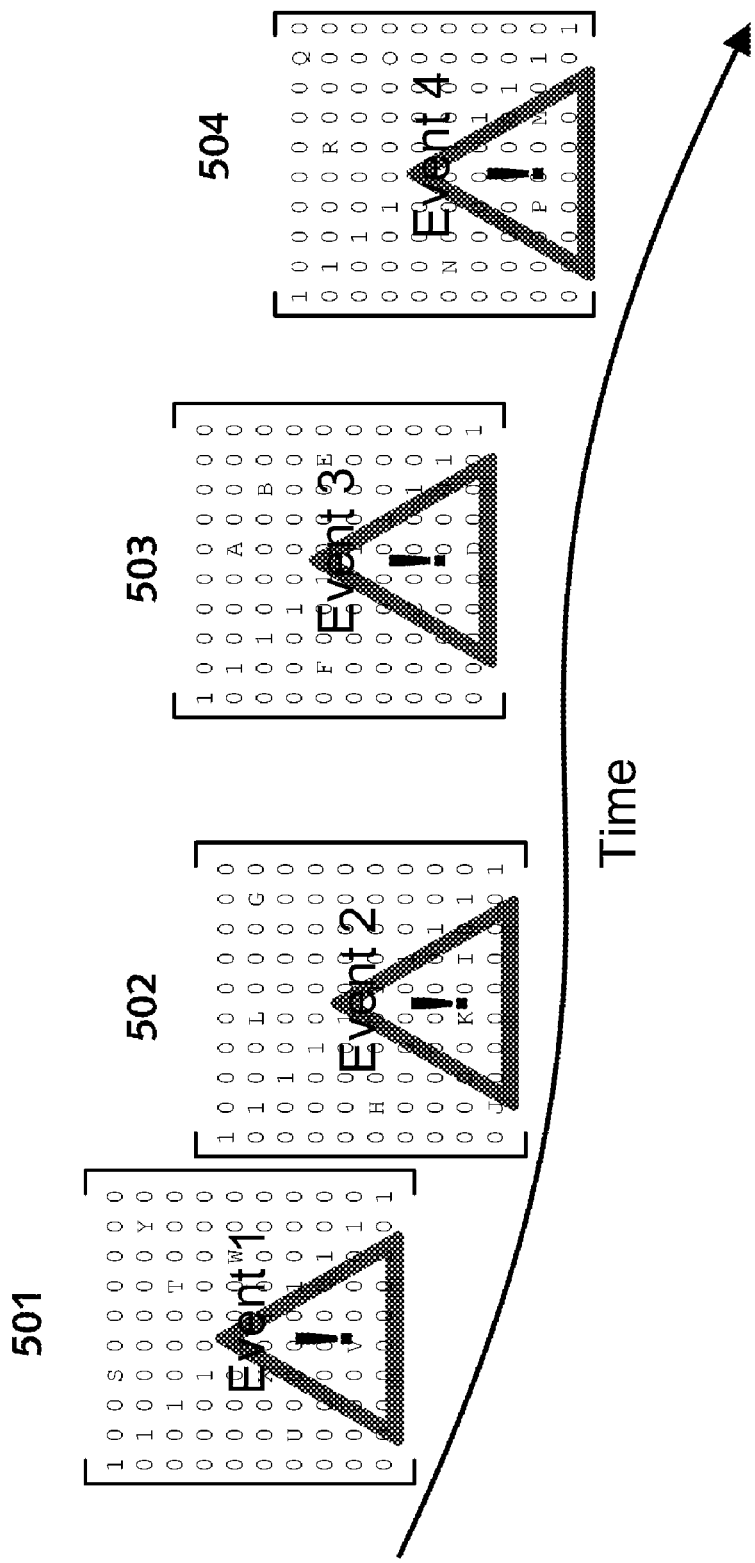
FIG. 5 is a graphic depiction of data analysis in one embodiment in accordance with the invention.

Referring to FIG. 5, in some embodiments, after examining the static structure, or "graph" of data inter-connectivity, the system 100 may go beyond graph theory analysis, by correlating interconnectivity of data with events that have changed the asset/data structure in the past and the events that have most recently affected it. Each event 501, 502, 503, 504 may be scored with a matrix of values that interconnect the event to other events as shown in FIG. 5. The resulting matrices may then be analyzed.

Figure 6:
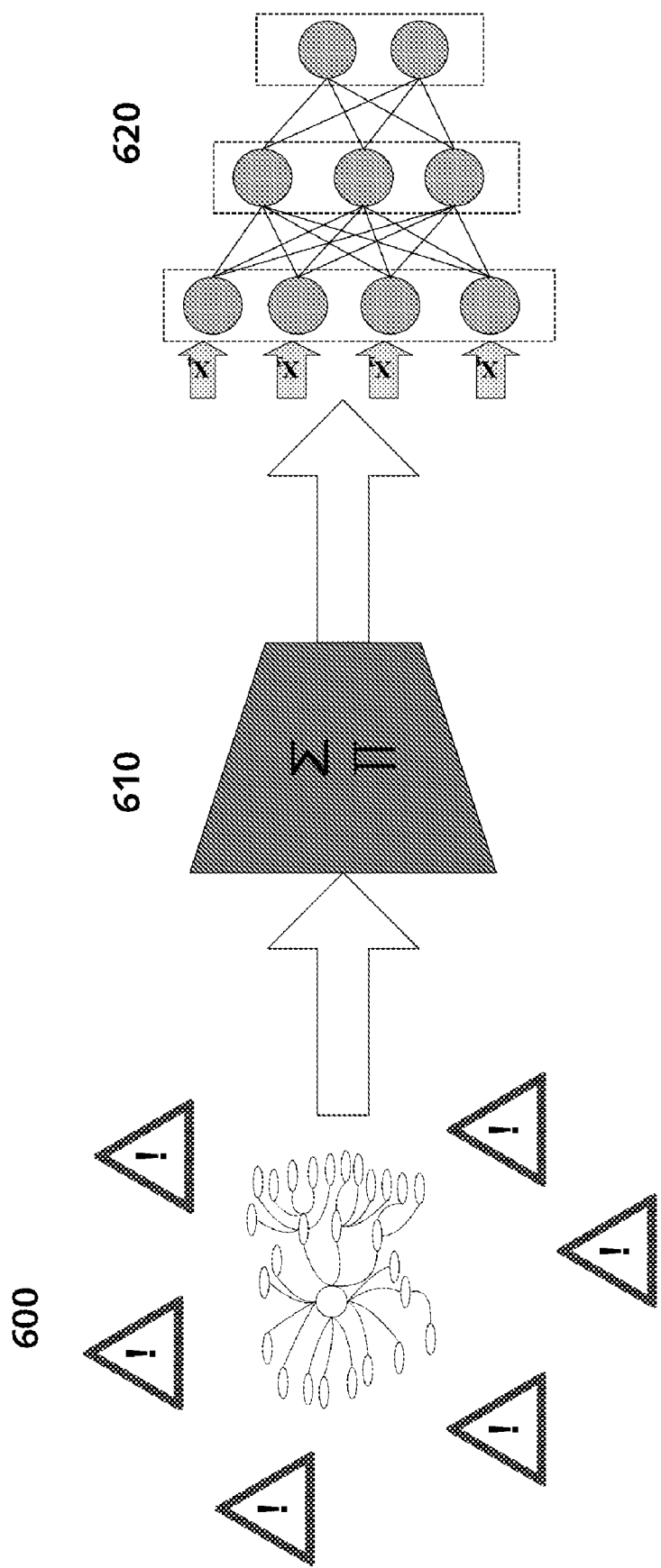
FIG. 6 is a graphic depiction of data analysis in one embodiment in accordance with the invention.

Referring to FIG. 6, the events and their scoring matrices and the static structure scores 600 may be processed by the analytical engine 150, where the matrices and static structure scores are mathematically combined and arranged 610 into a series of "nodes" 620 as shown. The output of this nodal network produces meaningful results and relevant alert triggers while reducing non-relevant noise triggers.

Figure 7:
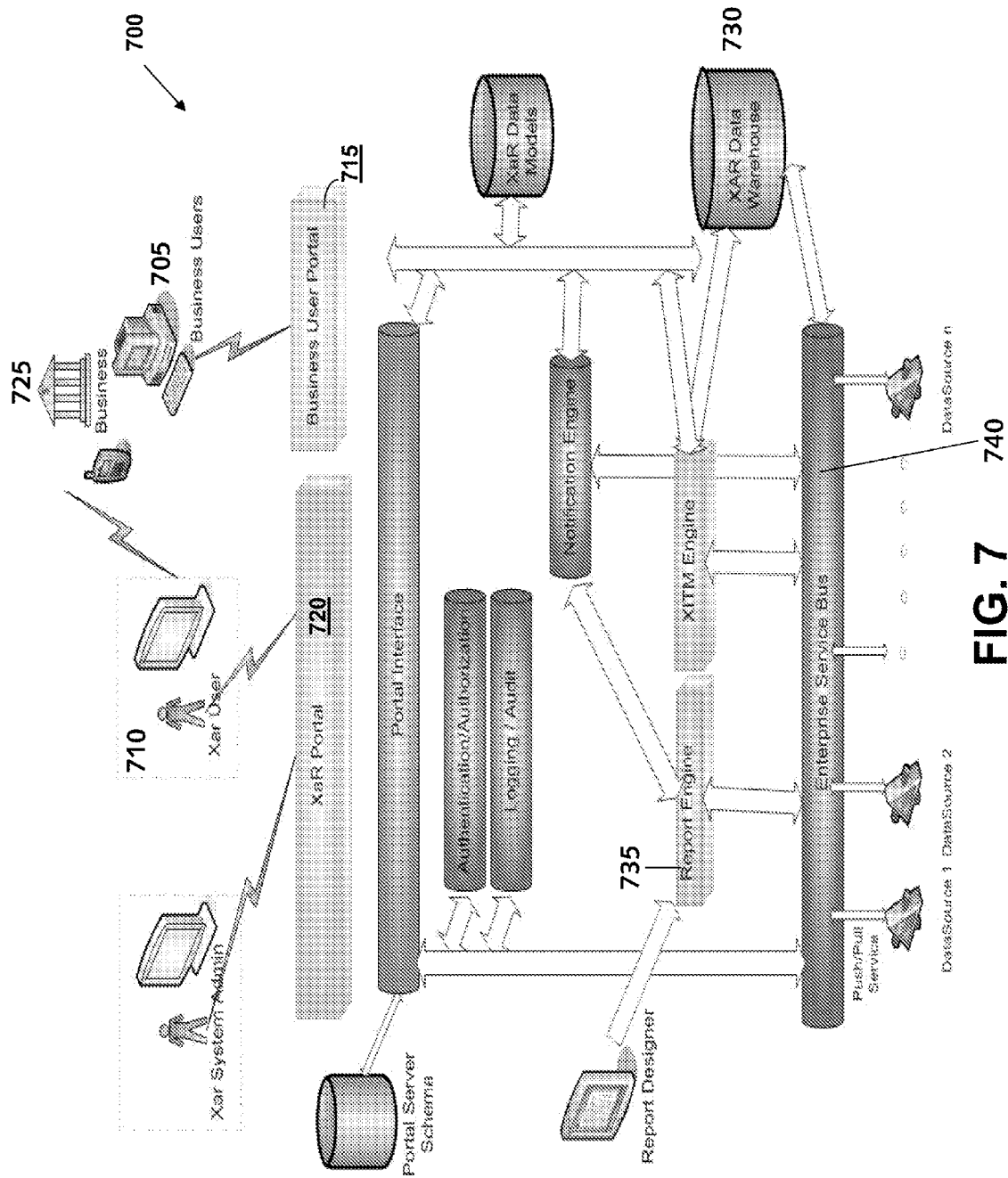
FIG. 7 is a block diagram of an exemplary embodiment of a system in accordance with the invention.

Referring to FIG. 7, in one exemplary embodiment, core processing takes place within a server that is hosted in a secure environment 700. Business users 705 monitoring their constituencies, or end-users 710 concerned about their own identities, may make use of services provided through one or more web portals 715, 720. This allows services to be provided without requiring deployment of either server software or client software. Use via a standard web browser with no install footprint reduces IT rollout challenges, minimizing the time to implement and to deploy the service.

The web portals 715, 720 provide user login and authentication for both the individual end-user 710 and the business user 705. Each business customer 725 may have several individuals 705 within their organization that need to login to the site to perform various different management tasks. In addition, the business 725 may be using the services on behalf of tens of thousands of end-users 710, who may also need to login to the portal 720 to manage their own individual parameters.

The portals 715, 720 may support a variety of user roles, each able to perform different administrative tasks. This is useful because the nature of the data being monitored and the ensuing results are highly sensitive and should only be viewed by the appropriate individuals.

In one embodiment, after logging in to the web portal 715, business users 705 will see a dashboard containing information that is important to them. For example, the dashboard may include high level summaries for lists of users that are being monitored, and the ability to drill down to lists of compromised consumers, and further information regarding lists of fraudulent events for a compromised user, as well as reports and graphs displaying important snapshot and time series data in a useful format.

As part of business account management, business users 705 may configure the server to send notification reports via email. These reports may be sent based on notification configuration settings including periodicity, an urgent notification threshold, etc., and may include information regarding the health of monitoring consumers similar to the information the business users 705 can see on the web portal dashboard.

A business 725 may differentiate service levels between each of their user/customer classes. They may choose to provide deeper data checks against more data sources and do this more frequently for their premium customers than their standard or economy class customers. User monitor sets allow a business 725 to carve their customer base up in any way they choose and independently attach frequency and data source parameters to each set.

Businesses 725 that have suffered one or more data breaches may create a different user monitor set for each breach, whereas each set contains just the records that were part of that breach. This allows the business 725 to better track organized use of the breached data and assess the causality between fraud on the consumer and the business data breach.

At the option of business customers 725, end-users 710 may receive direct notification for fraud alerts, suspicious activities, and regular reports on a periodic basis. These communications may be customized and co-branded or be private labeled by the business customer 725. The end-user 710 may also receive, at the business' discretion, an account to login to a site to view status and information on their history of suspicious activity and data breaches. The end-user 710 access to a web site may be private labeled or co-branded.

In some embodiments, the data collected about individual identities may include non-public and personally identifiable information. As such, security is an important factor in the design and deployment. In one embodiment, a data warehouse 730 is maintained in a physically secure hosting facility, following security practices for physical and electronic access. All non-public personal information is encrypted with advanced encryption algorithms when stored in a database or transmitted between systems. Full unencumbered non-public personal information is not available to any user through the application user interface, only the last four digits or some similar partially identifiable sub-portion. Databases may be locked down and physical and electronic access fully audited. All backups may be performed with encryption and stored offsite in a professional and highly secure data archival center.

In one embodiment, the system is built upon industry-proven technology platforms. Using Java as the foundation, there are many available components, both open source and licensable, available to help build the system. Leveraging these components drives down time to market and development cost, improves maintainability, and produces more reliable systems because much of the code has already been tested in production environments.

In some embodiments, an internet service that is marketed and sold directly to end-users combines proactive monitoring of both personal identity information as well as credit data. The service has comprehensive data sources, proactive data analysis/reporting that may alert customers to compromised identities before malicious damage occurs, and an overall user experience and ease of use. The service provides a variety of subscription options for customers with varying levels of reporting data available with each option. For example, some reports may not be available on certain plans or the completeness of the report may be increased based on the plan selected. Additionally, in some embodiments, there may be one-time service offers including a social security number security report, one time full credit report, or more services in a snapshot one time offering instead of an ongoing subscription. A variety of subscription plans allow users to select the information delivery that they prefer.

In some embodiments, customers may be able to perform most activities in a self-service function (e.g., create account, select subscription plan, upgrade subscription plan, change account details, view reporting data).

In one embodiment, the service lets users know if their private or sensitive identity data is exposed or available on the Internet. The service may inform users if their identity is misused, if there are new legal and/or financial records detected, and may provide information about the risk of becoming a victim of identity theft. In some embodiments, the service provides a measure of identity theft risk for a particular individual. The service may track events in time and construct the progress of various events as they relate to a specific identity and visibly display it. The service provides reporting output to a user in a manner that is clearly understood in the context of their identity security and provides a proactive means of response should an actual and/or potential theft instance be discovered.

In some embodiments, the service may aggregate personal data about individuals even when there is not a common key. In some embodiments, the service requests additional information from a user as necessary to associate records with an individual.

In some embodiments, the consumer service employs a three tier architecture consisting of presentation, transaction/business logic and data layers. Security concerns, as well as secure eCommerce best practices, dictate SSL access to the web application, as well as separation of the presentation and transaction engines with firewalled DMZs.

Examples of components that may be used in some embodiments include LifeRay, an open source Java Portal Server that meets the JSR 168 Portlet Specification, improves user experience and cuts development time by providing a flexible GUI framework and widely available pre-tested UI widgets. Spring is an application framework that makes development agile and improves testability and scalability of the entire application. Hibernate provides a data persistence layer that cuts development time and improves performance, making seamless integration with the variety of DBMSs. MySQL provides a database layer that keeps deployment and development costs down and supports high performance and scalability. BIRT provides an open source reporting system that consists of Report Designed and run-time Report Engine 735. Apache Service Mix provides an open source distributed Enterprise Service Bus (ESB) 740 and Service Oriented Architecture (SOA) toolkit that allows for easy and standardized integration with the data sources and other external systems. It should be understood that these components are described by way of example, and that there are many available alternatives to these components.

The combination of a powerful robust platform, third party solid components, and the described data and analytics may be used in a powerful and effective application that can detect fraud and abuse of an individual's personal data and related assets.

Figure 8:
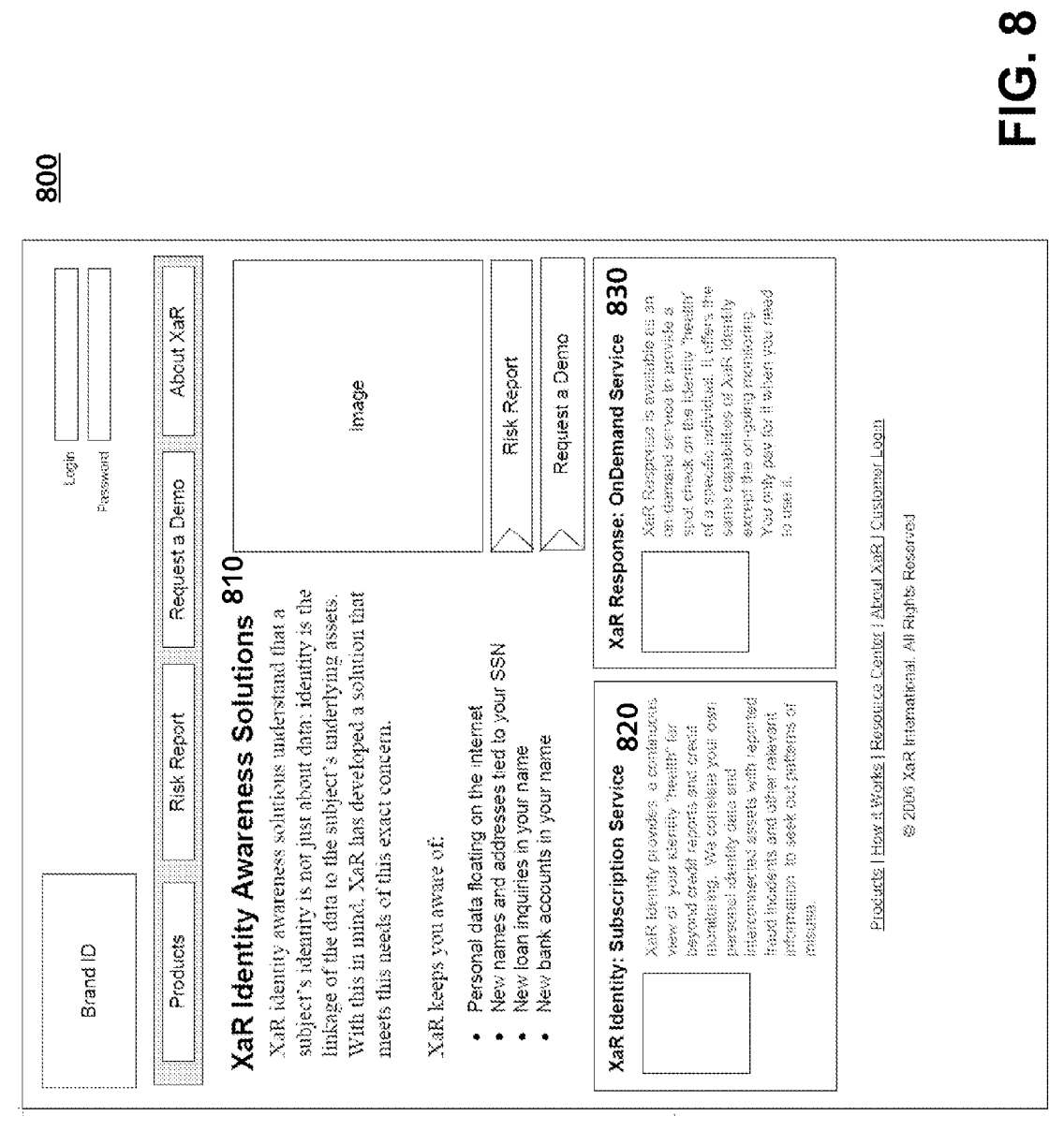

Referring to FIG. 8, an exemplary screen display 800 demonstrates that identity awareness solutions 810 may be provided in a subscription service 820, in which a continuous view of a user's identity state may be provided. Identity awareness solutions 810 also may be provided as a one-time, on demand service 830 to check the state of an identity of an individual. In some embodiments, the state of a user's identity is referred to as the identity "health" of the individual. A user is healthy if risk is low, and increasingly unhealthy as risk increases and/or actual fraud occurs.

Figure 9:
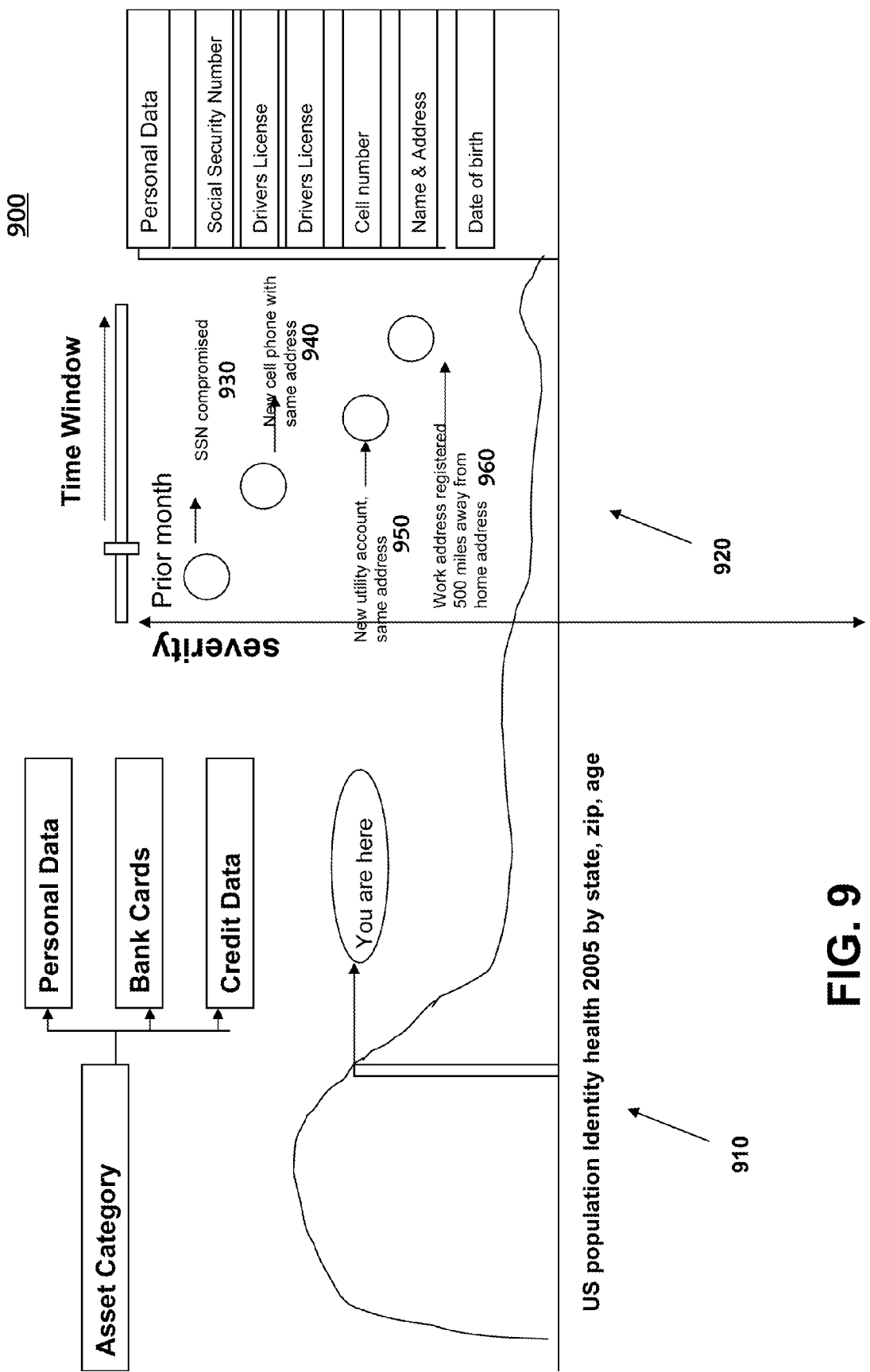
FIG. 9 an exemplary screen display in one embodiment in accordance with the invention.

Referring to FIG. 9, an exemplary, demonstrative system interface 900 provides a user with information about the state of their identity. The interface provides a chart 910 that presents the aggregated identity health of a population, in this example, the United States population, and also shows the state of the individual against the overall population. Here, the display shows that the individual is on the riskier side of the high curve, but still not into the tail on the right side of the graph.

Also shown on the display 900 is a list of events 920 that have been identified by the system 100. The events 920 include the compromise of a social security number 930, the opening of a new mobile telephone account at the same address 940, the opening of a new utility account at the same address 950, and a work address registered 500 miles away from the home address 960. The first event, the compromise of the social security number 930, when correlated with the other events 940, 950, 960 may be indicative of fraud. In some embodiments, event severity may be determined by the fraud models 110 with weights assigned to each event.

In this display, each event circle ("bubble") when selected may provide more detailed information about the event. In some embodiments, each bubble has a different icon, color, or size depending on the nature and importance of the event.

In some embodiments, the user may be asked to confirm or deny a specific event.

Figure 10:
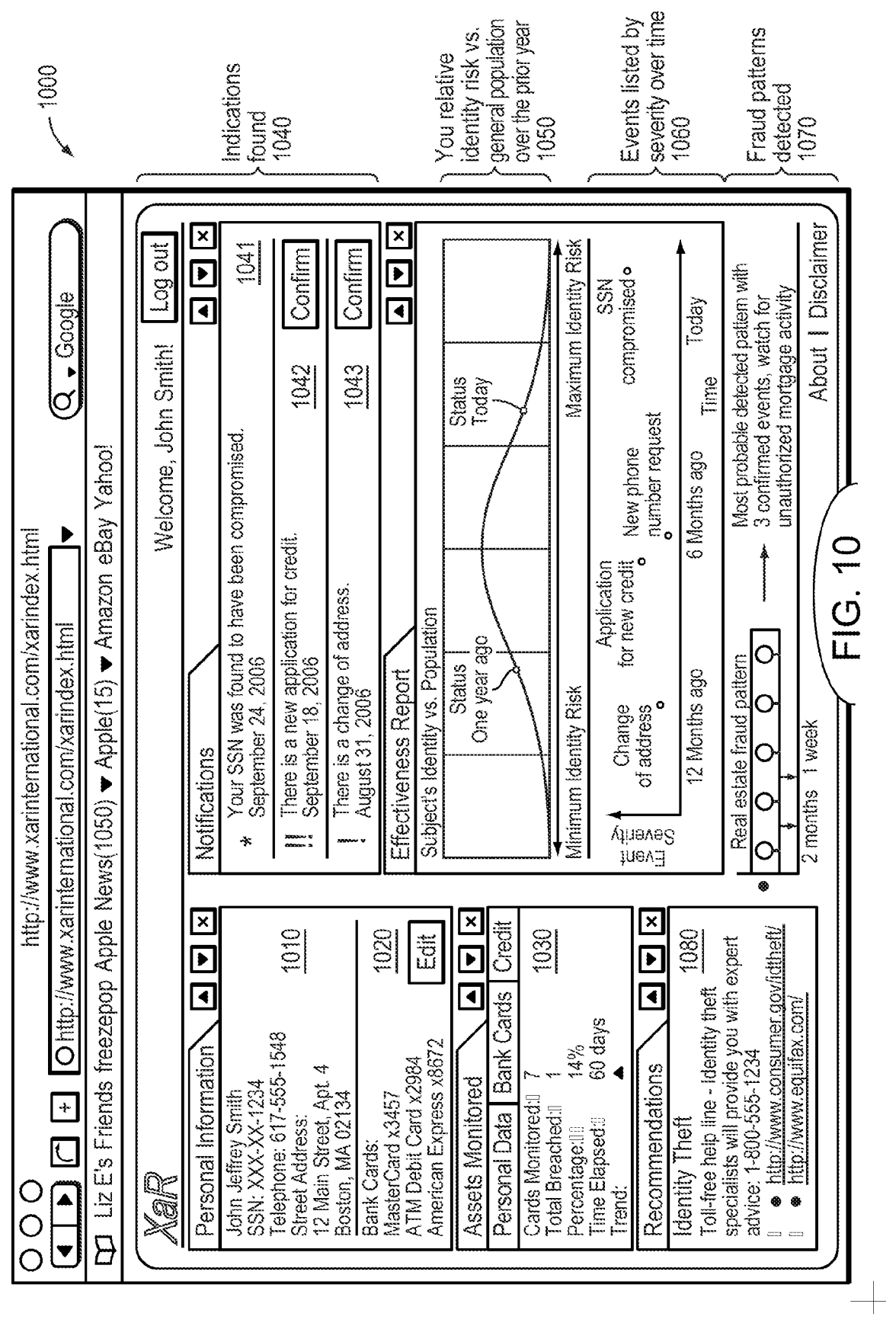

Referring to FIG. 10, in another demonstrative screen display 1000, information is provided to a user that includes personal identification information of the user 1010, including the credit cards 1020 known to belong to the user. The display 1000 includes a list of assets monitored 1030, which in this example indicates that one of the cards has been breached in the last 60 days.

Notifications are provided to the user, indicating 1040 that events have been identified. These include that the user's social security number was found to have been compromised 1041, that there is a new application for credit 1042, and there is a change of address 1043.

There is also a display 1050 of a user's relative risk as compared to the general population. The display shows that over the past year, the user's risk has increased significantly. The events also are displayed 1060 by severity over time, to show both the event history and how important the events are.

Fraud patterns detected are displayed 1070, indicating to the user the type of fraud pattern, and any predicted timing, based on the events and fraud models. In this example, real estate fraud is the most probable detected pattern, with three confirmed events in the model. The suggestion displayed is to watch for unauthorized mortgage activity.

A display also provides recommendations 1080 to the user about how they may address the problems identified. In this example, information about an identity theft hotline is provided.

Figure 11:
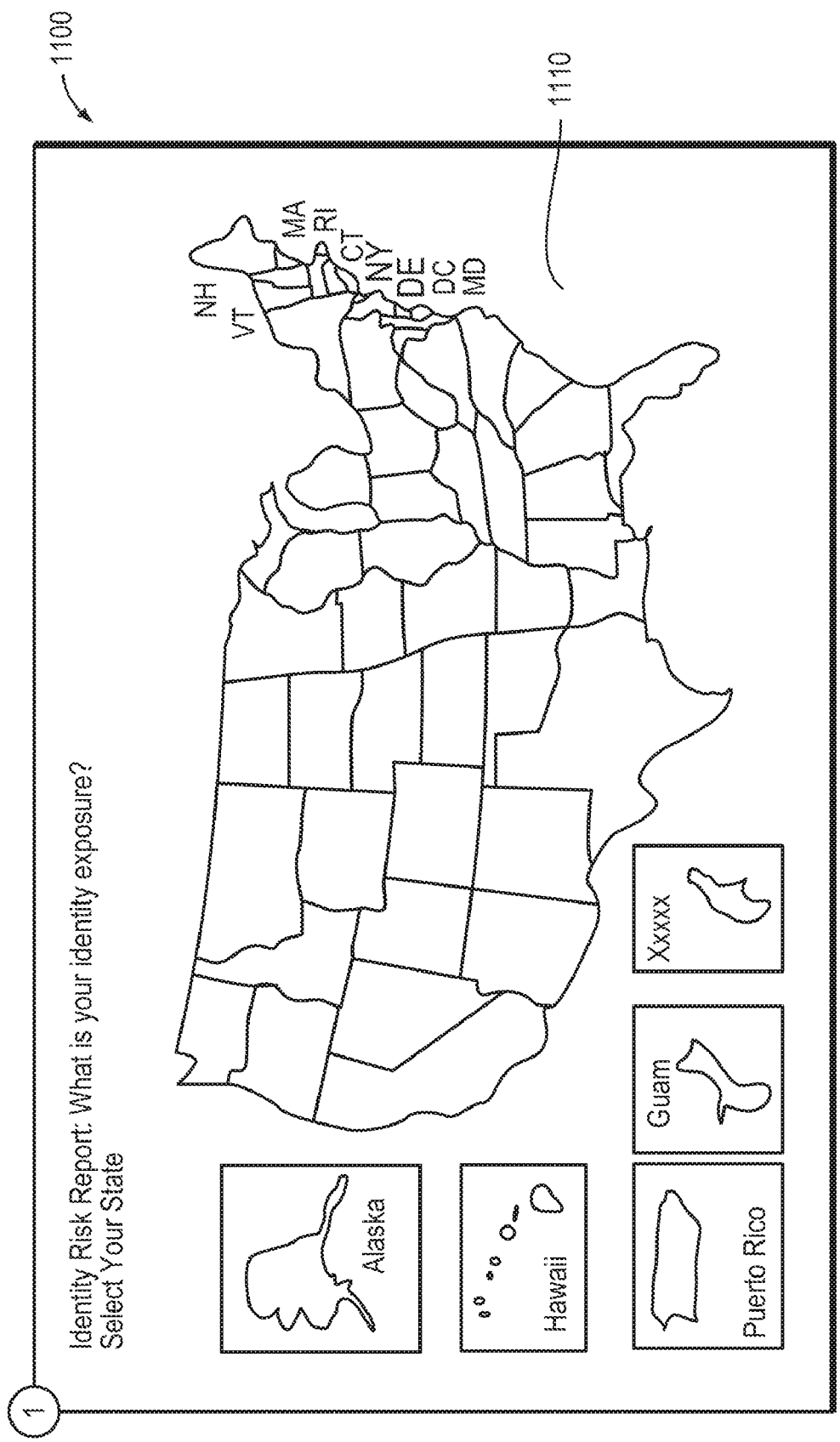
FIG. 11 is an exemplary screen display in one embodiment in accordance with the invention.
Figure 12:
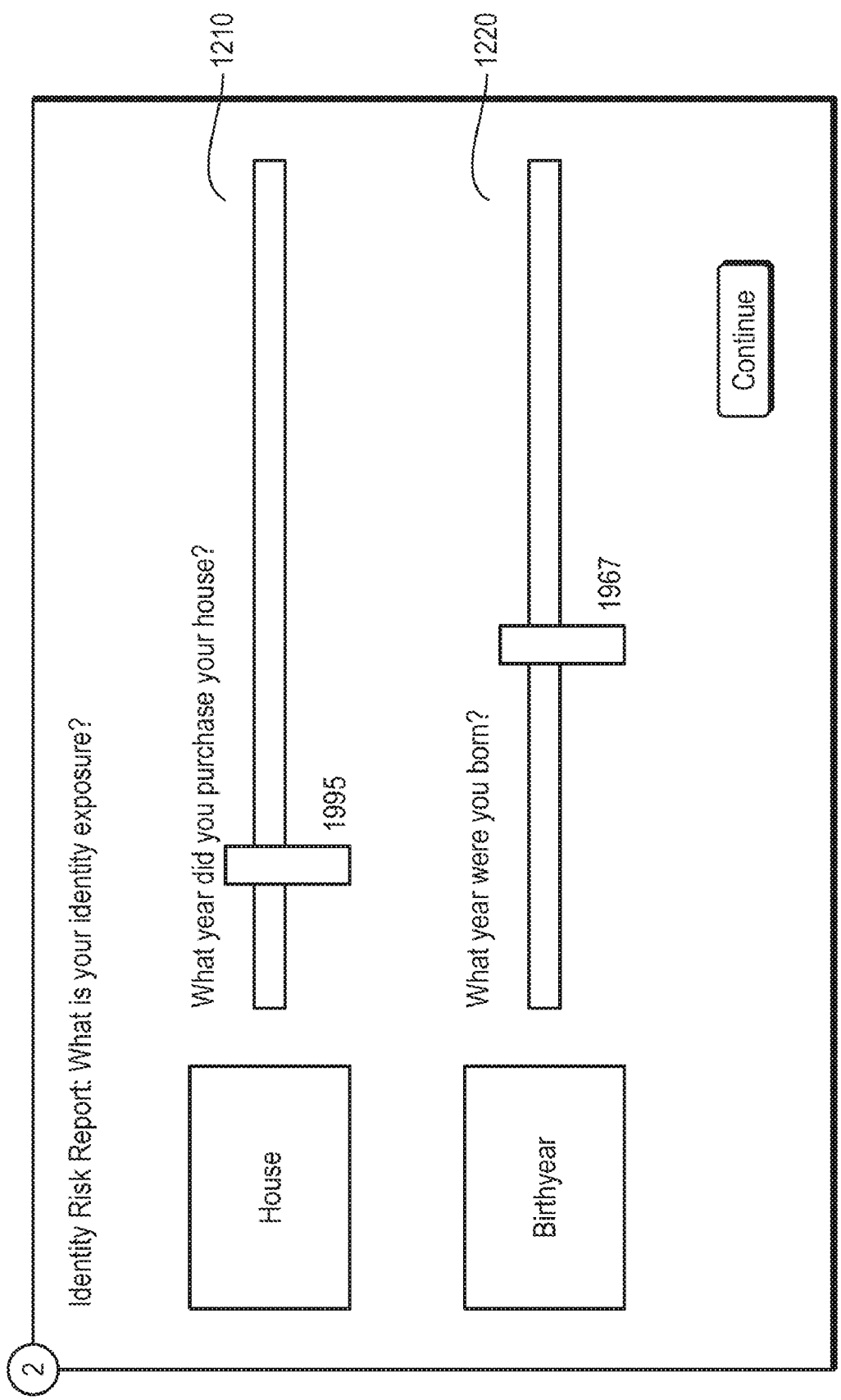
FIG. 12 an exemplary screen display in one embodiment in accordance with the invention.

Referring to FIG. 11, in one embodiment, a system is provided to inform a user of the user's identity theft risk, based on demographics 1100. The system presents the user with a map of a geographic area 1110, in this case, the United States. The user may select a location within the geographic area, for example by clicking on the selected geographic area with his mouse or by providing a zip code to focus the graph on a particular location. Referring to FIG. 12, the user is also asked when they purchased their house 1210, and their year of birth 1220. Based on the geography, length of time in their house, and their age, the system may determine the risk of identity theft as compared to the general population. It should be understood that this demographic data is demonstrative, and that other demographic data may be used instead or in addition to what is described here.

Figure 13:
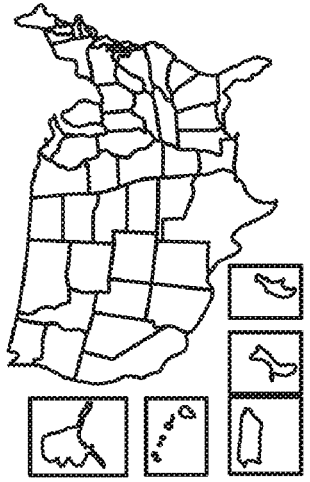
FIG. 13 an exemplary screen display in one embodiment in accordance with the invention.

Referring to FIG. 13, the user is presented with a risk score 1310—an evaluation of risk based on this demographic information. This score is determined using reported events of the general population for each demographic group. This information may then be provided to the user. In one embodiment, this information is provided to a user prior to the user subscribing to a service, as a way for the user to assess their need for an identity protection service.

Figure 14:
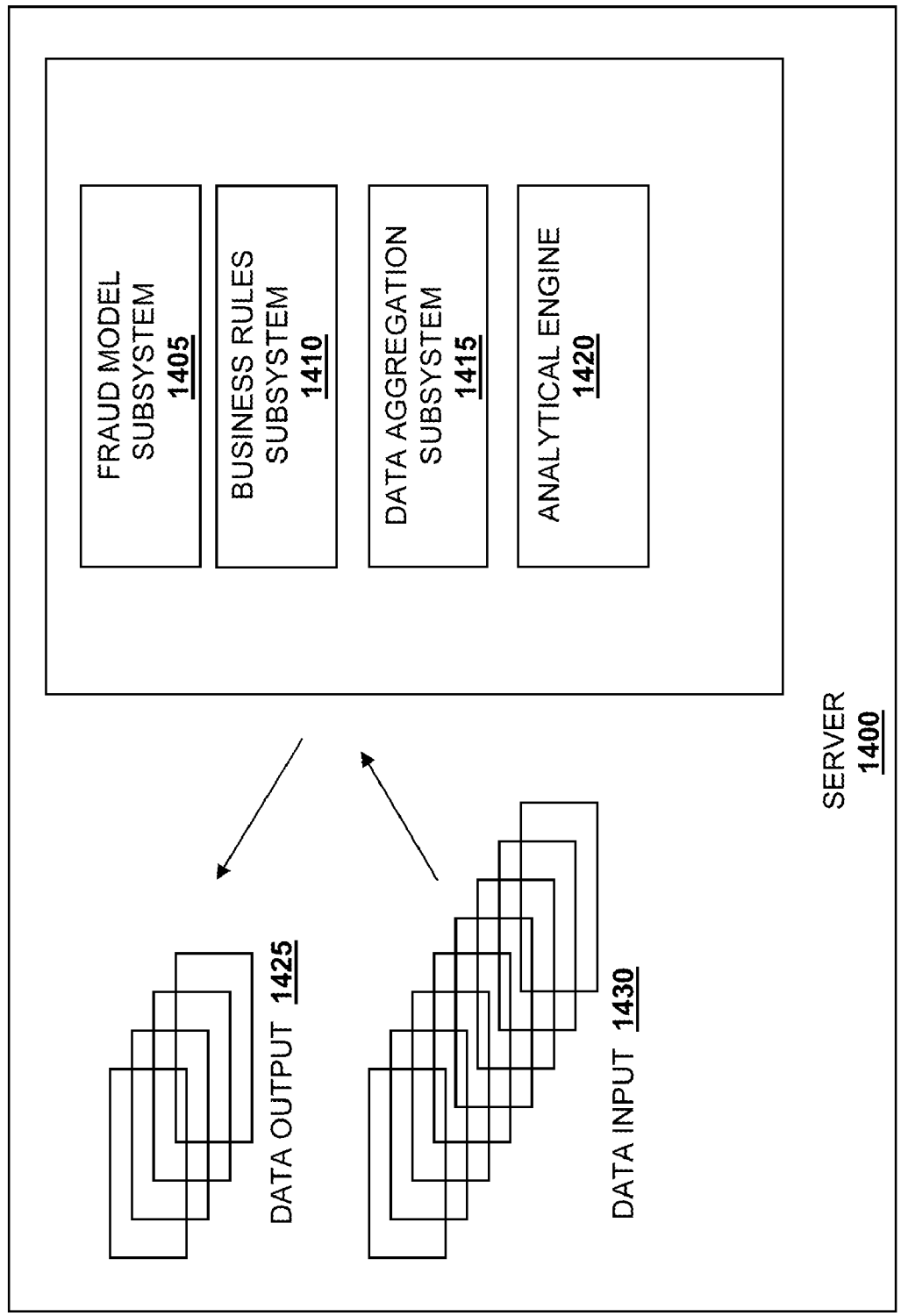
FIG. 14 is a block diagram of an exemplary embodiment of a system in accordance with the invention.

Referring to FIG. 14, in one embodiment, a server 1400 for providing the services described here includes a fraud model subsystem 1405 for specifying patterns of events indicative of identity fraud. The subsystem 1405 may include fraud models provided by users, generated by experts, or by some other way. The server 1400 also includes a business rules subsystem 1410, which, based on the fraud models is used to identity fraud that is specified by the fraud models. The server 1400 also includes a data aggregation subsystem 1415, which collects data input 1430 from a variety of sources such that it may be processed. The sources may be the data source described. The analytical engine 1420 operates on the data collected by the data aggregation subsystem 1415, and determines whether there are events that are correlative with the fraud models based on the business rules. Events are analyzed and stored in an output data store 1425, such as a data warehouse.

Predictive Analytical Engine 150, 1420

In some embodiments, the Predictive Analytical Engine 150, 1420 may be designed to produce meaningful reports about a user's identity including a prediction of likely fraudulent events to watch out for given events that have already happened. The engine 150, 1420 may include logic to notify the user of important events and provide the appropriate level of urgency depending on the event discovered. The design may be implemented in a manner to minimize false positives, e.g., classifying a benign or valid event as fraudulent and alarming the user unnecessarily, and also to minimize false negatives, e.g., classifying a fraudulent or potentially fraudulent event as benign or valid.

For example, in some implementations, events received by the system 100 may be assigned a score based on the likelihood each given event is fraudulent activity or contributes to an overall pattern of fraudulent activity. Using this score, the system 100 may classify into these categories: routine, fraudulent, or uncertain. The system 100 may been trained in such a way that it can usually place events with near certainty in either the routine or fraudulent classes.

The "uncertain" category is used for those cases in which the system 100 may not have and/or cannot obtain complete information concerning an event. As a result, the event score may not allow the system 100 to definitely place an event into either a routine or fraudulent category. Such "gray area" events may be placed in an uncertain category for manual adjudication. There may be degrees to this indecision. The system 100 may allow specification of how sure it must be before placing the event into either one category or the other. In one embodiment, by default, the system 100 may be 100 times more certain that an event may be classified one way rather than another. In order to minimize "false positives" (the inappropriate classifications of innocent, routine events as identity theft) and "false negatives" (the inappropriate classifications of identity fraud events as routine or innocent), the certainty threshold may be increased to 1,000, 10,000 or more.

The system 100 may be adaptive and learn from its history. In the interest of transparency, all events captured concerning a particular subscriber account may be available for review by the subscriber, along with the classification of the events into the routine, fraudulent, or uncertain categories. Subscribers may (and, in fact, may be encouraged to) provide feedback on the classification via questionnaires within the portal. Input from the subscriber may enable the system 100 to retrain its adaptive certainty threshold so as to minimize inappropriate classification of future events, while also maximizing detection of events.

Data Fraud Models 110, 1405

In some embodiments, the system 100 has the dynamic capability to add new fraud models 110 and new business rules 120 on a continuous basis. The analytical engine 150, 1420 may take into consideration the fuzzy nature of the problem. For example, this typically would not be a pattern matching based approach, but rather a comparison of events' attributes to a feature vector that has been determined to represent fraud.

It should be understood that each of these subsystems may be implemented by software modules or special-purpose hardware, or in any other suitable fashion, and, if software, that they all may be implemented on the same computer, or may be distributed individually or in groups among different computers. There may be multiple instances of some or each of the subsystems, and they may be operated in any suitable manner.

In general, in various embodiments, the server 1400 may include software running on a general-purpose computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH OS X operating system from Apple Computer of Cupertino, Calif., and various varieties of Unix, such as SUN SOLARIS from SUN MICROSYSTEMS, and GNU/Linux from RED HAT, INC. of Durham, N.C. (and others). The server 1400 also may be implemented on such hardware as a smart or dumb terminal, network computer, wireless device, wireless telephone, information appliance, workstation, minicomputer, mainframe computer, or other computing device that is operated as a general purpose computer or a special purpose hardware device used for serving the purposes described here.

High-Level Architecture

Figure 15:
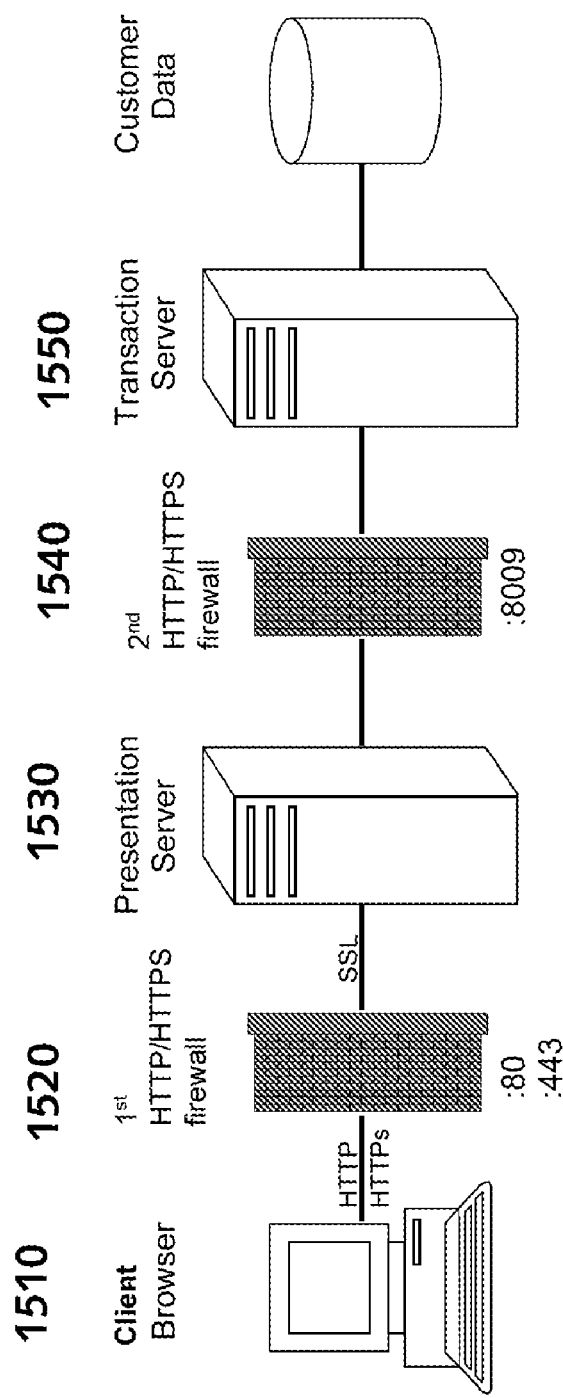
FIG. 15 is a block diagram of high-level architecture for an embodiment in accordance with the invention.

Referring to FIG. 15, an exemplary high-level architecture 1500 is shown. A transaction server 1550 is responsible for dynamically generating HTML and relaying it to the client browser 1510 via the presentation server 1530. In some embodiments, no caching of data is permitted at the presentation server 1530 for security purposes. An HTTP/HTTPS firewall 1520 is provisioned between the presentation server and the client browser 1510, and no other ports are opened. A firewall 1540 between the presentation server 1530 and the transaction server 1550 is also provisioned, secured by static IP address and socket. To meet this requirement, there may be a DMZ architecture with a firewall 1520 (e.g., Cisco PIX #1) between the Internet and the presentation server 1530. There may also be a firewall 1540 (e.g., Cisco PIX #2) between the presentation server 1530 and the transaction server 1550. Ingress ports may be limited (e.g., to port 80) so that there are a limited number of ingress ports open on the first firewall 1520 (e.g., Cisco PIX #1). A different port or ports (e.g., port 443, port 8000, and/or port 8009, etc.) may be the only ingress port(s) open on the second firewall 1540 (e.g., Cisco PIX #2). Given a Java Tomcat 5.x architecture for the transaction server 1550 (possibly embedded in JBoss), the presentation server 1530 may be an Apache HTTP server running mod_jk which is connected via the port open on the second firewall 1540 (e.g., port 8009) to the Java Tomcat server.

This exemplary architecture provides for both security and enables additional scalability (e.g. by increasing the number of presentation and/or transaction servers and load balancing access between them)

The service may support consumers (end-users) and administrators. Consumers have self-service control of their account and service parameters, including account creation, password resets, service plan selection, editing of user data, viewing of their reporting data, and submission of ID theft instances. Administrators may have access to consumer functions as well as additional privileges to change user's service plan, terminate user's account and view aggregate user reporting data.

Figure 16A:
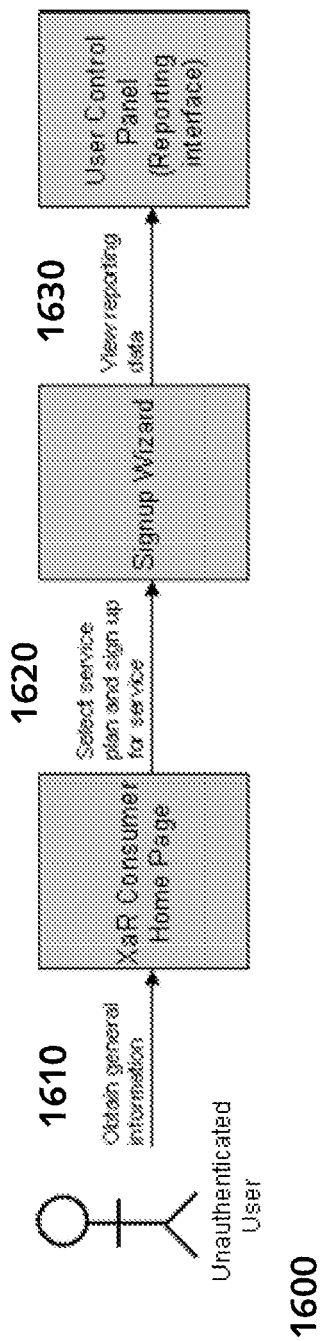
FIG. 16A and FIG. 16B depict exemplary workflows in an embodiment in accordance with the invention.
Figure 16B:
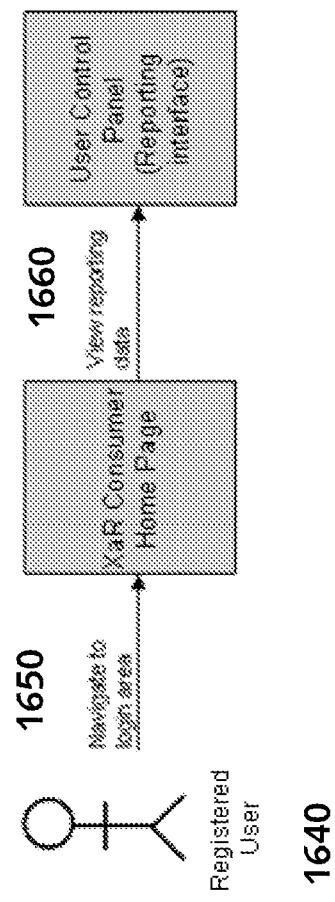

Referring to FIG. 16A and FIG. 16B, in some embodiments, the service supports a process flow for unauthenticated users (e.g., guests) 1600, and one for authenticated users 1640. The unauthenticated user flow (FIG. 16A) may permit unauthenticated users 1600 to browse the services offered 1610 and, if interested, select a service plan and signup 1620, and then begin using the service via the user interface 1630. The authenticated user flow (FIG. 16B) permits registered users 1640 to log in to the service 1650 to view their identity reporting data 1660, and/or update service preferences.

User authentication may be important given the nature of the service and the sensitivity of the data handled. At the same time, it may be helpful to minimize the information needed to create a new subscription and delay asking for more sensitive data until necessary. For example, a more stringent authentication process may be needed when a user requests a credit report or when sensitive information is displayed to the user. Strong authentication may be used, such as using the Level 3 authentication process available from Experian and/or other commercially available alternatives. Level 3 authentication involves asking the user "top-of-mind" questions such as range of mortgage payments or make and model of a car owned in the past. A user passing this type of authentication (providing correct answers in a limited amount of time) may be considered the baseline to determine if the user is who they claim to be. A further description of the exemplary subscription and authentication processes is provided below.

A consumer service home page may serve as the primary vehicle to advertise service plans, educate customers, and serve as a service entry point for both new and existing users. Accordingly, it may serve multiple types of users while also adhering to goals of a consumer service user experience (e.g., simple to use, innovative/high-quality user experience, etc.).

Figure 17:
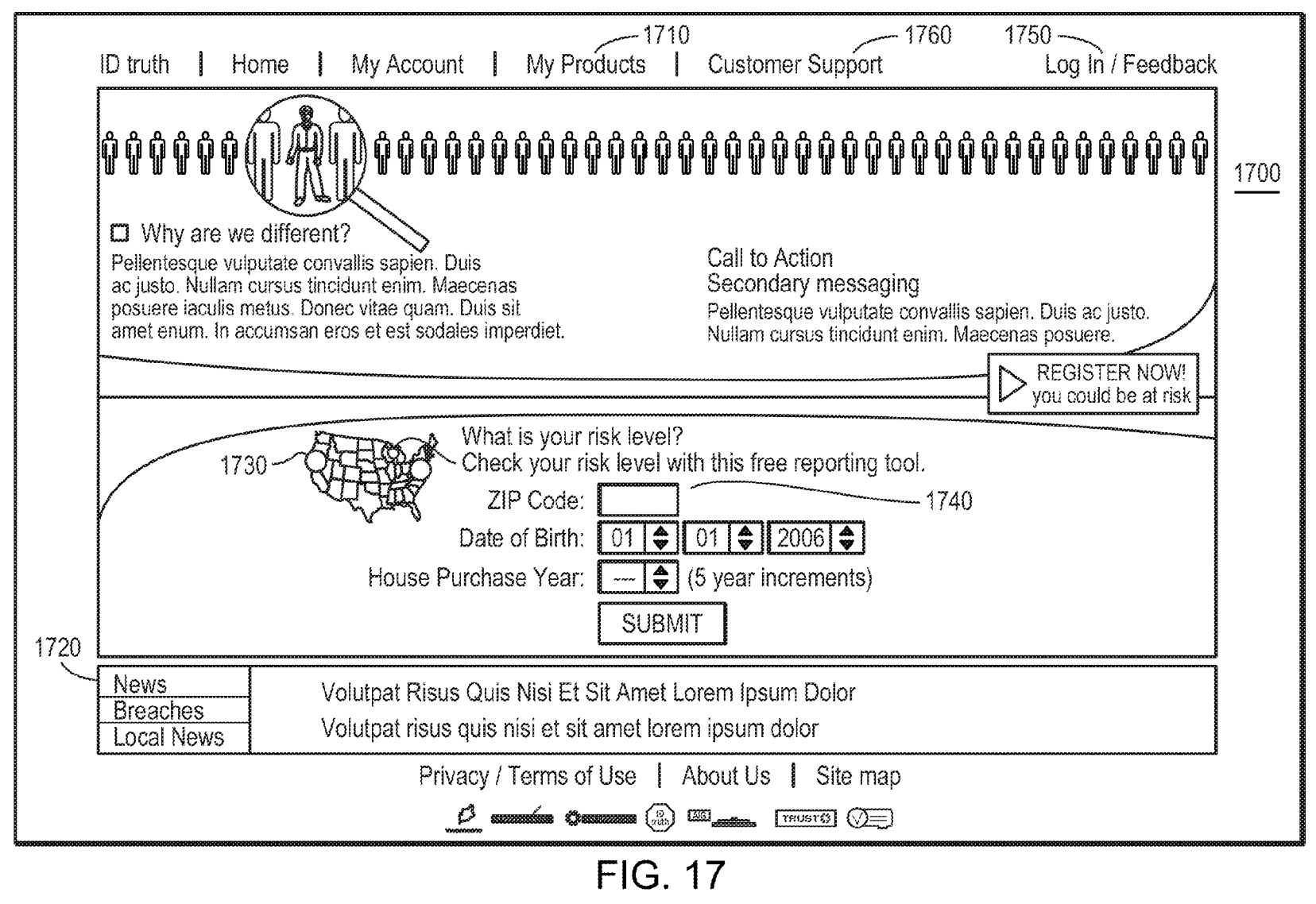

Referring to FIG. 17, in some embodiments, when a user first connects to the site, a "home page" 1700 for the service is provided that may include an area 1710 describing the products/services offered. A link may be provided that allows a user to obtain an on-demand look-up of a particular social security number, to see if it is "floating" on-line. There may be no requirement that users have a monthly subscription, but creation of a user account allows collection of payment information and so forth. A link may be provided to a demonstration and information about the service. The home page may also include facts, figures, news and information about identity theft breaches 1720, and an interactive graph 1730 displaying identity theft by geography. A user may provide a zip code 1740 to focus the graph on a particular location. The home page may also provide a place 1750 for existing users to enter username and password information. In some embodiments, the authentication information required from a user may be increased if the user is attempting to log in from a computer that they have not used before. A link to customer support 1760 may be provided.

Registration

In some embodiments, to aid user registration, a registration wizard may be used to guide users through the process of creating their account. The overriding goal of employing a wizard-based approach to collect user data is to provide a simple, user-friendly method to collect what may otherwise become an overwhelming amount of data.

A registration wizard serves to create the customer account and collect payment information as appropriate. Plan-specific information collected from the user may include strong authentication after the registration process is completed. A separation of registration from plan sign-up allows for a consistent registration process and allows for users to register with a site even if they have not made a plan selection, for example, to receive identification theft news, contribute to forums and/or track promotions.

In some embodiments, a wizard may implement four steps in which data requested of users is compartmentalized into logical groupings:

Step 1: Login information and security questions (e.g., FIG. 18)

Step 2: Name/Personal information (address, date of birth, phone) and ID theft survey (e.g., FIG. 19)

Step 3: Notification preferences (email or SMS) (e.g., FIG. 20)

Step 4: Payment information (except for Start for Free plans in which case user may be presented with a page to enter the credentials that they want to track) (e.g., FIG. 21).

Figure 18:
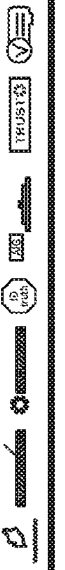
FIG. 18 is an exemplary registration screen of an embodiment in accordance with the invention.

Referring first to FIG. 18, a general description of the registration follows. FIG. 18 shows a login screen 1800 in an exemplary embodiment. The initial screen 1800 includes a graphic 1810 indicating that the registration area is secure. There may be a field 1820 for a user to enter his or her email address, which serves as a user ID, and a field 1830 for a user to enter a password. The password may be masked, to avoid viewing by others. There may be a field 1840 in which the user confirms the password (again, this may be masked). The user may be presented with security questions 1850 (e.g., mother's maiden name, name of high school), and a place 1860 to provide an answer to these questions. There may be a display 1870 that is not machine-readable, to confirm that the viewer is human, and not a computer. There may be a user agreement 1880 displayed in a text box. There may be a check box 1890 that the user will check to confirm that he or she agrees with the usage terms. There may be a "next" button 1895 that a user may click to proceed to the next step. If the user does not enter the appropriate information, the user may be returned to this page, with an indicator of the error. When collecting a login id, the user may be prompted for a different one if it duplicates an id already in the system. Rather than refreshing the entire page each time this cycle repeats, it is preferable to have an embedded applet which will provide a more real-time, interactive experience (e.g., AJAX).

In some embodiments, users may enter the registration wizard either by selecting a plan or by directly registering without making a plan selection. A home page or a products link from the home page presents the available plans with descriptive information for each. Users may select a plan and also confirm acceptance of applicable terms and conditions.

Figure 19:
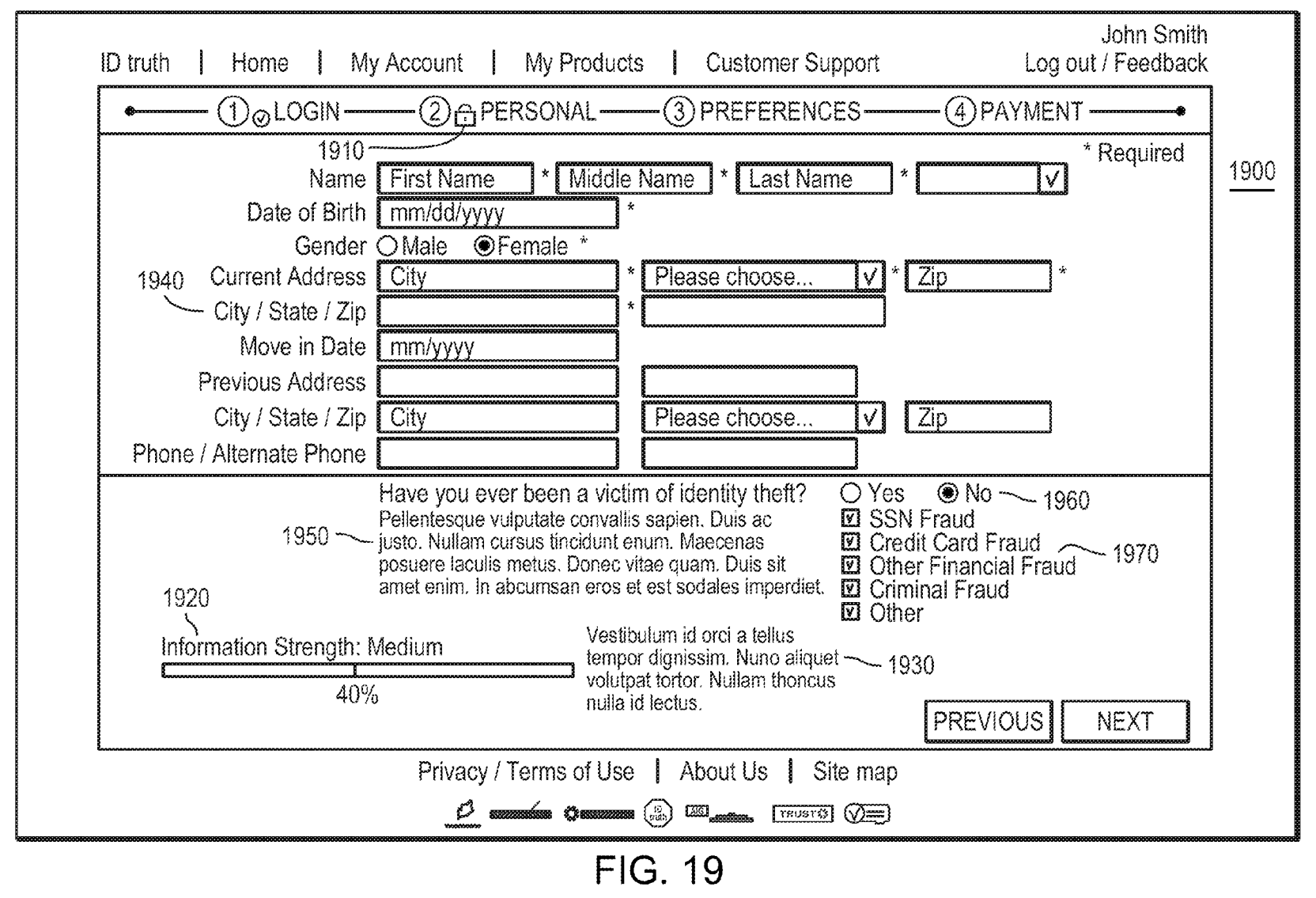

Referring to FIG. 19, in an exemplary representation 1900 of step 2 of such a registration process, there may be a graphic 1910 indicating that the registration area is secure. There may be an indication of the step that the user is on as he or she moves through the registration process. The user may be made aware that the quality and accuracy of the service increases with the amount and accuracy of information provided by the end user. There may be an "information strength meter" 1920 at the bottom of the page that indicates to the user the "strength" of the information that the system has for him or her, with the objective of encouraging the user to enter as much information as possible, to maximize the strength. There may be explanatory text 1930 accompanying the meter.

In one embodiment, the strength displayed by the information strength meter 1920 is reflective of the number and type of fields of information that the user fills out. The strength is generated as the user provides various types of information. Table 1 below provides strength values that may be assigned to different pieces of information provided by the user:

TABLE 1

INFORMATION STRENGTH VALUES

| Information Field Provided by the User | Strength Value |
| --- | --- |
| firstName | 2 |
| middleName | 3 |
| lastName | 2 |
| nameSuffix | 3 |
| phone | 2 |
| streetAddress1 | 2 |
| streetAddress2 | 0 |
| city | 2 |
| state | 2 |
| zip | 2 |
| moveInMonth | 3 |
| moveInYear | 3 |
| birthDay | 3 |
| birthMonth | 3 |
| birthYear | 3 |
| previousStreetAddress1 | 3 |
| previousStreetAddress2 | 0 |
| previousCity | 3 |
| previousState | 3 |
| previousZip | 3 |
| ssn | 5 |

The total score, or "strength," may then be placed into a range, from low to high, that is used to select the graphic that displays the information strength meter 1920 on the screen for the user to see. The information strength ranges, in one exemplary embodiment, for the different total strength scores are depicted in Table 2 below:

TABLE 2

INFORMATION STRENGTH METER RANGES

| Total Strength Value | Range |
| --- | --- |
| 0-4 | low0 |
| 5-9 | low1 |
| 10-19 | low2 |
| 20-29 | medium1 |
| 30-39 | medium2 |
| 40-49 | high1 |
| 50 and higher | high2 |

There may be a form 1940 with the following fields for capturing the user's personal information: first, middle, last, and suffix of user's name; date of birth; gender (e.g., male or female radio buttons); current address, city, state, and zip; move-in date; previous address, city, state, and zip; phone, and optionally a second phone. Some of this information may be optional and some of the information may be required. As depicted in Table 1 above, this information may be used in determining the strength depicted by the information strength meter 1920.

There may be questions 1950 that survey the user as to their experience with identity fraud. The questions may include such questions as "have you ever been a victim of identity theft?" The user may see a radio button control 1960 with an option of answering yes or no. If the user selects yes, he/she the user may be presented with a pick list 1970 allowing the user to indicate which type of identity theft they were victims of. Users may select more than one answer. If they select "other", the user may enter information into an adjacent text field.

The list 1970 of identity theft problems may include, for example, Social Security Number (SSN)/Financial ID Fraud (with a description of what this fraud is), credit card fraud, other financial fraud, criminal fraud, or other. Financial ID theft typically focuses on an individual's name and Social Security number (SSN). A perpetrator may apply for telephone service, credit cards or loans, buy merchandise, lease cars or apartments. In criminal ID theft, the perpetrator provides the victim's information instead of his or her own when stopped by law enforcement. Eventually, if a warrant for arrest is issued, it is in the victim's name. In an identity cloning case, the perpetrator uses the victim's information to establish a new life. They work and live as the victim. For example, the perpetrators may be illegal aliens, criminals avoiding warrants, people hiding from abusive situations, or persons becoming a "new person" to leave behind a poor work and financial history. In business or commercial identity theft, the perpetrator may open credit cards or checking accounts in the name of the business. The business finds out when unhappy suppliers send collection notices or their business rating score is affected.

Figure 20:
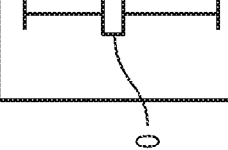
FIG. 20 is an exemplary preferences page of an embodiment in accordance with the invention.

Referring to FIG. 20, a user may set notification preferences 2000. The user may select email 2010, SMS 2020 (e.g., mobile telephone messaging), or both. If email 2010 is selected, there may be an adjacent text field 2030 for entering one's email address. By default, the field 2030 may be pre-populated with a user's login email address. The user may change it if desired. If user selects SMS 2020, the user may be able to enter either the phone number or email address for the corresponding device. In some embodiments, the messaging information may be validated such that a code, link, or other information may be provided that then may be communicated to the system to confirm receipt of the message. In some embodiments, there may be a slider control 2040 that enables the user to set the severity threshold of detected events alerts. The less severe the setting, the more alerts the user will receive, and so forth.

Figure 21:
FIG. 21 is an exemplary payment page of an embodiment in accordance with the invention.

Referring to FIG. 21, a payment screen 2100 may allow a user to enter a credit card and/or other payment information. The payment information may include credit card number and other information 2110, as well as billing information 2120.

A payment information step may be displayed if the user selects or enters the registration process after selecting a plan. Once credit card data is entered, it may be submitted to a payment gateway for validation only. If validation is unsuccessful, an error message detailing the reason for failure is displayed, and the wizard returns to this step to permit users to update the credit card data, enter a new card, etc. The system may support a "buy once" functionality for on-demand services and a subscription functionality that charges monthly.

Subscriber Authentication

The registration process allows users to submit information that may be used later to authenticate that the person who is logging in to the service is the person who registered with the service. After the registration flow, the user may be asked to click on a link emailed to him/her in order to activate the account. For example, the user may receive an email message with the following exemplary text:

Dear Customer,

Thank you for visiting www.identitytruth.com. You have registered your account using this email address. You may activate your account by clicking the link below and logging in with the username and password you entered during registration. https://www.identytruth.com/confirm_registration/?emailToken=0466dfa1

CONFIDENTIALITY NOTICE: This e-mail may contain information that is privileged, confidential or otherwise protected from disclosure. If you are not the intended recipient of this e-mail, please notify the sender immediately by return e-mail, purge it and do not disseminate or copy it.

Thank you,

The Identity Truth Team

In the event of loss of password or of user id, the security questions and other data provided at registration may be used to authenticate the user. A credit card also may be verified if provided. This type of authentication may not attempt to confirm that the subscriber is who they say they are. For that, the system may strongly authenticate a subscriber, using, for example, commercially available authentication technologies.

Strong authentication may be a deterrent to legitimate users if too much information is requested to register. This type of authentication has financial costs associated with it. It therefore may be necessary to balance the need to authenticate with the data to be presented. For example, before presenting credit reporting data to a subscriber or before requesting credit reporting data about a subscriber, strong authentication may be used. Strong authentication typically will not be part of an initial registration process. If a plan includes reports that make use of credit reporting data, the strong authentication may be used as part of the plan configuration independent of the registration wizard.

In some embodiments, a price-per-credential pricing model is used. For example, for certain data, there may be a cost for each credential searched on.

In some embodiments, notification preferences are set during registration that allow users to specify initial preferences for notification of fraud activity (e.g., email, SMS text message, telephone call, and/or some combination). The email option may be pre-filled with the email address entered previously, and/or users may enter another email address.

When a user has completed the notification step, the wizard may terminate, and alert the user that an account has been successfully created. The user may be asked to click on a link emailed to their primary email address in order to activate the account. When the user clicks the link, the user is asked to sign in and if successfully authenticated may be shown the dashboard 2300 (see FIG. 23).

Figure 22:
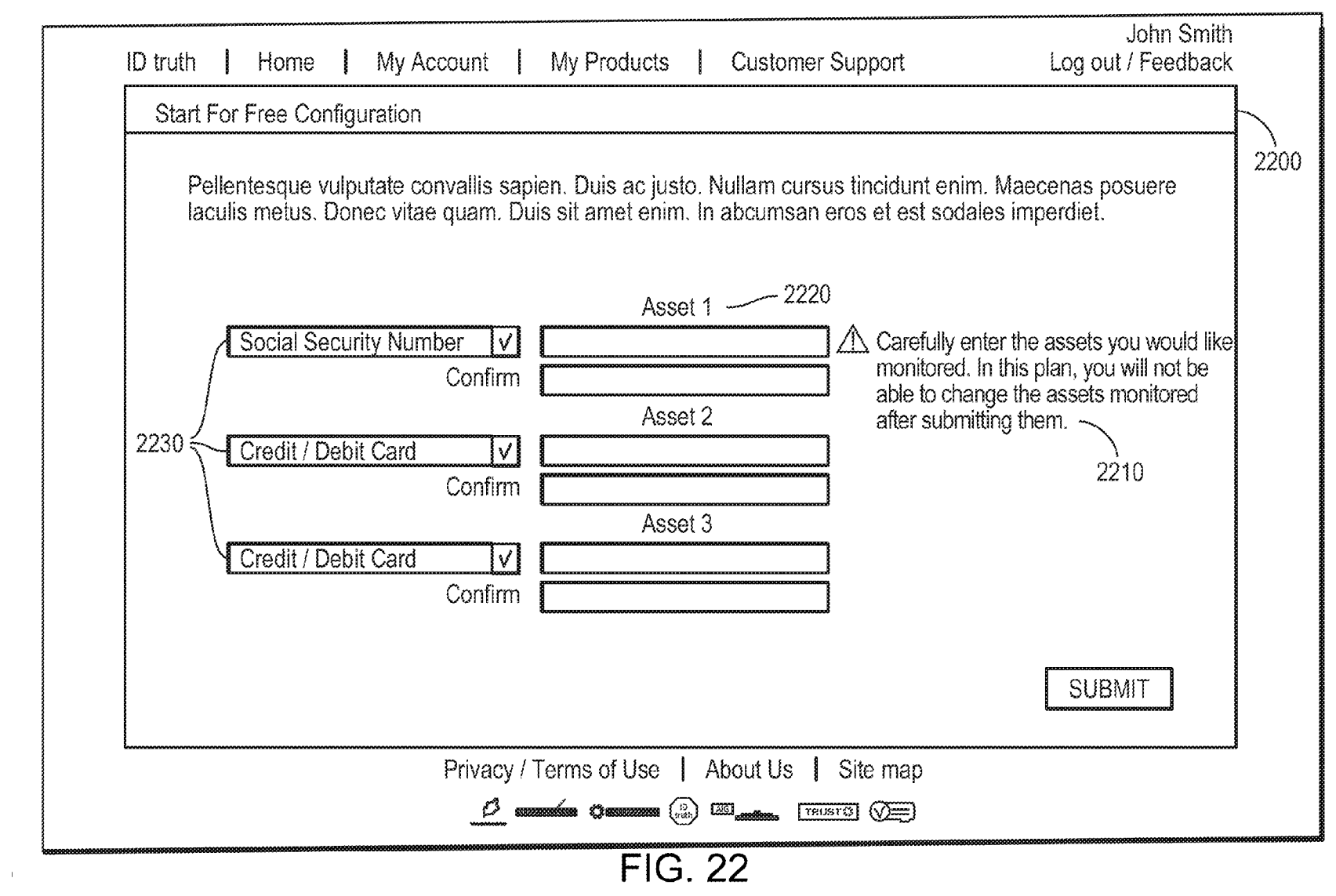

Referring to FIG. 22, in some embodiments, if a user has selected a plan that does not require payment, he or she would proceed through Steps 1-3 of the registration process, but would not be presented with Step 4 (payment information). Instead, such users would be presented with a page 2200 that prompts them to enter the assets that they would like to be able to monitor for free.

As shown in FIG. 22, there may be some text 2210 positioned at the top of the registration area that gives the user a general description of what he/she is supposed to do on this page. For example, the text may read "Carefully enter the assets you would like monitored." In some embodiments, users may not change the assets once entered. The user may be presented with fields 2220 for entering information on up to a number (e.g., 1, 2, 3, 4, or more) of personal assets.

Each asset entry area may be preceded with a drop-down selector 2230 that allows the user to select the type of asset to be monitored (social security number, credit card, etc.). For example, the default for the first drop-down field may be "Social Security Number". Subsequent fields may contain "Credit/Debit Card" as the default text within the drop-down list. Users may be restricted from entering more than one Social Security Number. In some embodiments, the SSN may be verified to be the user's SSN, for example by checking publicly and/or commercially available records.

Each asset may contain a text field for entering the SSN or account number that corresponds to the asset. The number may be masked as it is entered. There may also be a text field (also masked) for confirming the SSN or account number. If a SSN is entered, there may be logic that allows the user to only enter credit cards for the remaining unused assets. There may be logic that verifies the format of a real SSN so that the system does not incur costs for passing invalid formats to a vendor. There are commercially available services to perform this verification.

In some embodiments, the selection of other plans, including a plan requiring payment, provides similar information collection functionality for collecting user information. Thus, this page may vary as to the information collected for different services offerings. In addition, in all embodiments, the collection of user information may include collecting from the user a value for each credit-related or other asset that the user identifies.

Referring to FIG. 23, in some embodiments, a user dashboard 2300 provides the main entry point for registered users of the system. Once logged in, users may be directed to the dashboard 2300, from which they may access general market data, news and discussions, their personal risk profile and alert information, as well as details and preferences for their account. For example, the user dashboard 2300 may include a summary of recent detected events 2305 (e.g. applications for credit, changes of address, etc.).

The events may be determined from data that the service has captured as well as data gathered from the commercial information sources. As described, the service may initially capture data on the customer during the initial signup process, in order to make the initial queries to the external data sources. Once the reports have been retrieved based on the customer-provided data, this information will also be displayed in detected events.

A consumer may never have seen all this public and private information compiled about them displayed in a navigable report. This is the raw data view of the reports retrieved.

Each data value may be hyperlinked to the supporting document that provides drilldown into the report which supplied this value, if possible. Also, there may be a place for feedback on each data item for the customer to resolve (confirm or deny that the item is in fact related to them) the data item. This information on the customer data may be saved in order to be used in future processing.

The dashboard 2300 also may include the user's identity theft risk 2310 (graphically displayed as a scale/bar with numeric representation of "risk" (i.e. a scale of 0 to 100) as well as descriptive labels (e.g. "good", "average", "bad") with a marker representing where the user "scores" in relation.

The overall risk value may be used to indicate to the customer their overall identity health, analogous to a credit score. This value may be calculated based upon the number of discrepancies that the data validation rulesets found, the fraud models rulesets risk value, and the general market data and news story inference rule sets risk values. Each of these individual risk values contribute to the overall risk value with a weighting value. In this way, some risk values contribute more to the overall value. For example, the social security number found on the Internet poses a greater risk than living in a high risk metropolitan area. The overall risk value is to be normalized so that it may be trended and compared over time, even as the number of assets monitored and the ruleset evolve.

The overall risk value may be visualized by a meter, with gradations from low risk to high risk. This meter may offer drilldown capability to enable the user to get further information about why their score is what it is. The highest weighted values to the lowest weighted values contribute to the score and may be presented in a table ordered as such. There may be links to FAQs that describe what may be done to lower the score and remedy detected problems.

A user dashboard also may contain a depiction of relevant fraud models 2320 (e.g. real estate fraud). The fraud models 2320 are scenarios which allow for the detection of fraud from the individual events in the raw data. The fraud models 2320 may be compared to changes in the customer's identity profile to uncover identity compromise from the correlation of these individual events. A risk value is associated with each fraud model ruleset. As described, rulesets take as input data retrieved from the data sources and past analysis and derive results. The rulesets identify trends which might indicate fraud, identify discrepancies in the data, and calculate metrics and statistics.

As an example, a ruleset may indicate whether a social security number or credit card number has been found on the Internet. The risk value returned by such a ruleset is 1 if the asset was found on the Internet or 0 otherwise.

As another example, the data validation rules may include rules like those used generally to identify inconsistencies and anomalies in the data retrieved from external sources. These include: invalid addresses, high risk addresses/phone numbers, disconnected phones, invalid social security numbers, SSN deceased file check, SSN issued prior to date of birth, telephone number/address inconsistency, and/or other data validation.

As another example, an FTC inference ruleset may be derived from the Federal Trade Commission data, the general market data, and a variety of news stories. These rules assign a risk value to the customer, based on the general information provided by the customer such as age, address, and the number of years that the given customer has held a credit card. This may be a 'background' risk value, based, for example, on the population studies made by the FTC on the identity theft complaints and cases. An example would be that a customer in the age bracket 18-29, living in Phoenix, Ariz., is at the highest risk based on the reported incidents of identity theft, whereas someone in the age bracket 60-64 in Jamestown, N. Dak. is at the lowest.

Likewise, rulesets may be created based on a topical news story concerning identity theft and may extend this background risk analysis by making the risk identification more dynamic and responsive to current events. An example is a news story concerning the apprehension of suspects involved in a phishing attack on Bank of America customers in the Boston area. A story of this type would be scanned for keywords in order to create a news ruleset matching Boston and Boston metropolitan area Bank of America customers. Customers in these markets would have a higher background risk level based on this news ruleset.

In an analyzed tree view, icons may be placed beside the data items which the analysis engine 150, 1420 'red flag's.

The customers may then drilldown into these discrepancies to see the source of the discrepancy. An example of the type of discrepancy highlighted here may be telephone number and address mismatches.

For the analysis results which are not tied to a particular data item, but rather to the data as a whole, in this example, a separate pane may be placed above the tree view. This pane may serve as the headlines and alerts pane. Analysis outputs from the fraud model, that synthesizes results from the data as a whole, are shown in this pane. The results shown here represent significant value to the customer and power of the analysis engine and rulesets. Analysis arising from topical news stories inference rules are placed in this pane as an alert item. A FTC/market/news background risk value may be placed at the bottom of this pane. Given the nature of this value, this value may be calculated for every user for which the service has age and residence information. As a result, this headline/alert pane typically is not empty.

Each data item or analysis may provide an AJAX control to provide feedback back to the service concerning the analysis such that they may confirm, deny, and provide additional commentary upon the item. This feedback is gathered via a questionnaire and the results persisted for future processing. An advice link is offered on avoiding this type attack through a set of FAQs.

The user dashboard 2300 also may include data analysis performed by the service analysis engine on the raw data shown in the detected events view. In this view, the customer can see the output of the service analysis engine, loaded with service rulesets, and processing of the raw data. The service rulesets may include the fraud models, data validation rules, and the inference rules based on the Federal Trade Commission/News/General Market Data and/or general identity theft incidence news stories.

The user dashboard 2300 also may include a summary of general market data, and news. In addition, this default view may provide links to other data (identity information, history, in-depth risk level, events vs. data breaches). Changing the user's focus to one of the other views may not necessitate a complete page refresh. Instead, data to render all views may be retrieved at the time of initial page generation. In this way, users can toggle between the dashboard views instantaneously (or near-instantaneously).

The dashboard 2300 may provide a section containing rotating news 2330, breaches 2340, and local news 2350 headlines. Users may be able to click on a headline and view the full-text of the story/item. The dashboard 2300 may provide a link 2360 to access a view which allows users to manage their account details and preferences. Specifically, users may be able to change their address, email, user id, password, and subscription plan, update credit card information (used for subscribing to the service), and manage their preferences for notification of fraud events (email/SMS/both, email address, mobile phone number). An Account Preferences View may mask (i.e., display 'x', '*', or some other relevant character) the characters of sensitive data entities. Specifically, the entire password may be masked as it is entered; all but the last 4 digits of the credit card number may be masked when it is displayed; all but the last 4 digits of the SSN may be masked when it is displayed.

The dashboard 2300 may prominently display references to provide users with information about more expensive subscription plans. Specifically, the default dashboard 2300 view may provide references to the information users could view if they upgraded to a more expensive plan. For example, a free trial user would also see samples of, or references to, the information available with the next levels of plans (e.g., cell phone records, credit data, etc.), similarly, a first level subscription user may see samples of the information available with the next subscription level plan. In addition, a link may be displayed which may take users through an upgrade process, including collecting credit card information, and other information if required. The general market data and news view also may provide links relating to upgrades.

An account preferences view may indicate users' current subscription plan as well as provide a link to guide users though the upgrade process. The dashboard 2300 may also provide a facility for users to request Really Simple Syndication (RSS) feeds as well as obtain additional information on RSS. At the bottom of all dashboard views, an RSS logo graphic/link may be displayed and may provide access to the RSS page where users may learn more about RSS and request any or all RSS feeds. In addition, the general market data and news view may provide RSS links within the specific content areas (e.g., "subscribe to content like this"). The following categories of content may provide RSS feeds: general news, user-submitted reports of identity theft schemes, and identity theft alerts for individual users. The RSS page may provide explanatory information on RSS (e.g., FAQ—What is RSS?, etc.), links to RSS readers (native XML, Yahoo, Google, Bloglines, Newsgater, AOL, Pluck, Rojo, etc.), and links to activate feeds for the three content areas. The dashboard 2300 may provide links to third-party service offers (e.g., credit protection insurance & identity recovery solutions). These services may be offered exclusively by providers independent of the service. Therefore, the dashboard 2300 may provide referral links to these providers' websites for signup and management functions.

The dashboard 2300 may provide a facility that permits users to make one-time purchases of additional data (initially, this may be an on-demand credit report for subscribers; some customers would already receive this data as part of their subscription so would not be offered this service). The dashboard 2300 may also provide links and a description to promote the one-time service and, if selected, may collect relevant billing (e.g., credit card) information and then display the resulting data.

The dashboard 2300 may present a link that allows the user to enter product feedback. The dashboard 2300 may present a graphical button 2365 that brings the user to a view of all confirmed items and credentials that are related to their identity (e.g. credit cards, addresses, etc.). This section may allow them to delete and edit items that are related to their identity. The dashboard 2300 may present a graphical button 2370 that brings the user to a view that provides them with all detected events related to them. The user may resolve unresolved DB-items as well as filter items by severity. The dashboard 2300 may present a graphical button 2375 that brings the user to a view that provides them with a timeline comparison of their events vs. known breaches in the general population, described further with respect to FIG. 27 below. The dashboard 2300 may present a graphical button 2380 that brings the user to a view that provides them with an overview of their personal risk level. Table 3 below depicts additional user interface features by section and describes what the user would see, in exemplary embodiments, in each section. Each section in Table 3 that presents risk or fraud data may include a help icon or information button that explains the data and includes remediation information if applicable. All or part of this information may also be shown when mousing over a graph. Where applicable, there may also be mouse over effects to highlight graph data.

TABLE 3

ADDITIONAL USER INTERFACE FEATURES

| User Interface/ Functionality | Description |
|---|---|
| Detected Events/ Results Section | This section enumerates all the events detected for the user such as Unrecognized Address found. It allows the user to view the detail of the event detected and specify whether they recognize the event or not. For example, the user may be asked whether s/he has a personal connection to the event (e.g., whether s/he has been directly or indirectly affected by the event). If the user does not recognize the event, s/he is presented with remediation information that may help clarify the source of the event or lead to discovery of fraud. The data associated with detected events is moved to the user's My Identity section (see below) if the user does recognize the event detected. If the user does not recognize the event, the event is classified as possible fraud and will impact the user's health score and predicted fraud. |
| Risk data bar graph | Depicts the Identity Health Score calculated for the user in a bar graph with a range from zero (0) to a hundred (100). The colors in the graph vary from red for low scores to green for high scores. The graph also contains a link to a page that explains the score in more details to the user. |
| Fraud model section | This section shows any fraud models that are predicted for the user given his or her profile and any detected events that the user has not recognized. |
| My Identity section - view/add/edit personal and login info | This section contains all information that is or has ever been associated with the user. The information in this section may have been entered by the user directly or it may have been added to the system via detected events that the user did recognize. |
| Track your identity - Risk data graph view | This graph depicts the history of Identity Health Scores calculated for the user. The Y-axis has a range from zero (0) to a hundred (100). The X-axis shows the time of each score change. The colors in the graph vary from red for low scores to green for high scores. |
| Track your identity - Uncertainty bar graph | This graph shows a measure of certainty from zero (0) to a hundred (100). The certainty refers to the Identity Health Score produced. Certain statistically based assumptions are made in order to produce the score. If the user confirms the assumptions made, the certainty about the health score will increase. |
| Identity Theft breaches | A breach refers to reports of data theft or data compromise reported by an organization. The service monitors such reports and produces a breach alert to notify users of the breach. Breach alerts are displayed as detected events as well. |
| Identity Theft News | The user interface may include news pertaining to identity theft that will be updated regularly. |
| Marketing campaign section, e.g. refer a friend and get something free or extra. | The user interface will include a section(s) promoting the different pricing options of the service and allowing users to refer the service to others. |
| Purchase additional On Demand Services | The user interface may present optional identity theft prevention related services that users may purchase for a fee such as remediation services or insurance. |
| Purchase System Services | Users have the ability to purchase the service using a variety of pricing options including pay per use or by subscription. |
| Logout | This takes user back to guest user home page |
| Home - | This takes user back to default page showing summary of detected events. |
| Customer Support Link | This takes the user to a page providing online support resources as well as contact information to customer support. |
| Security and partner logos and privacy notice | Security logos from authorized security certification vendors will be displayed in the user interface as well as authorized logos from partners that provide data used to deliver the service. |
| Customer feedback | This is a form to gather feedback from user on the service or on the usability of the user interface. |

Figure 24:
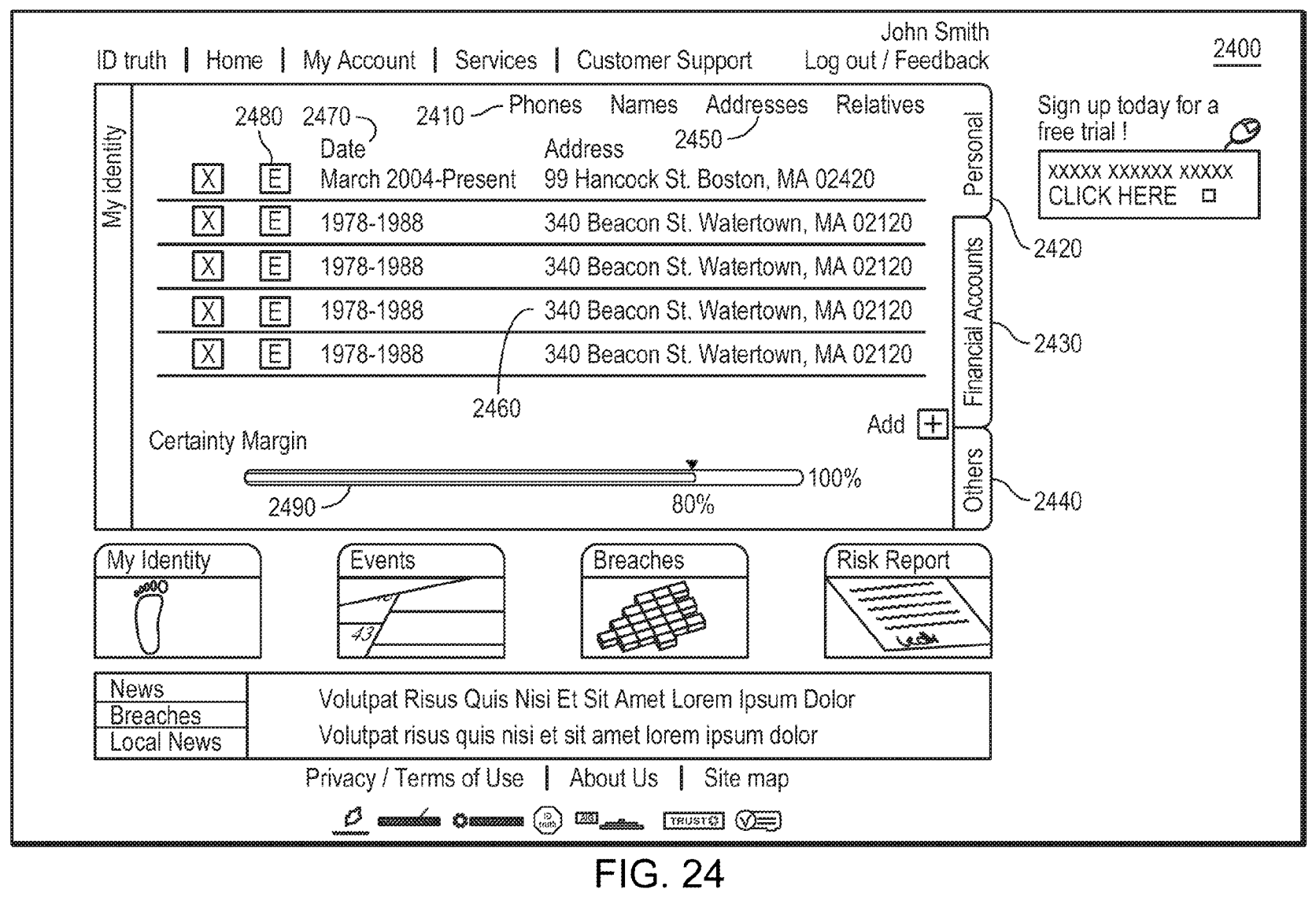

Referring to FIG. 24, a "My Identity" page area 2400 (accessed, for example, by selecting graphical button 2365 on dashboard 2300 of FIG. 23) contains confirmed (e.g., verified by the user) personal credentials/information 2410 about a user that was generated by licensed data (the feeds) and certified by the user, and/or that was entered by the user himself/herself (e.g. current and past addresses, phone numbers, financial accounts, etc.). The user is able to manage his/her information from this area.

The look and feel of the My Identity page 2400 may be the same as the user dashboard 2300 (e.g., same color scheme, same navigation bars, etc.). There may be tab controls denoting the various categories of personal information contained within this section. For example, the tabs may be labeled "Personal" 2420, "Financial Accounts" 2430, and "Others" 2440. The user may click on tabs to toggle between the credential information presented on each tab. There may be some way for the user to determine which tab is currently "active". Within each tab (when necessary), there may be additional navigation in the form of text links for the sub categories within each tab (i.e. phones, emails, and addresses might be sub category links under the "personal" tab. A user may click on navigation links 2450 to toggle within sub categories on each tab (e.g. phones, emails, etc.). There may be some way for the user to determine which link is "active".

There may be views that list the various credentials themselves (e.g. a current or past address). These may be generated from feeds or entered by the user.

Note that all addresses displayed 2460 (whether entered by the user or obtained via a feed) may be the user's "normalized" address which may be in a standard format used by the U.S. postal service.

Credential items may be displayed in a list, preceded by a date or date range 2470 (depending on the type) that is relevant to the credential (if the credential is an address, the date range would depict when the user lived at that address). By default, the lists may be in reverse chronological order. For addresses, the current address may be populated from the user's account information entered during the registration process. There may be controls that allows the user to sort the list items by date (or date range) and address.

When the list of items becomes longer than the allotted viewing space, a scroll bar may appear to the right of the window to allow the user to scroll. For those credentials that have been entered by the user, there may be icons/buttons 2480 that allows the user to edit items that he/she has entered. Clicking on the edit button 2480 may spawn a new window containing the user-created data for the item in the list that was clicked.

The user may see fields that may be populated with the information in the list. Users may be able to edit the information. Users may see a "save" and a "cancel" button which will either cancel and close or save and close the window.

There may be a graphic and description of a "Certainty Margin" 2490 showing how "complete" (on a scale of 100) the information about a user is (and, hence, how "certain" the results are).

There may be accompanying text that tells the user what they are seeing. There may also be a "call to action" in the form of a link that allows the user to provide additional information and therefore increase their certainty score.

Figure 25:
FIG. 25 and FIG. 26 are exemplary events display screens according to an embodiment of the invention.

Referring to FIG. 25, an events view 2500 (accessed, for example, by selecting graphical button 2370 on dashboard 2300 of FIG. 23) may provide a user with a historical list 2540 of detected events, for example, all events that are potential fraud events that are specific to the user, as well as a graphical view 2510 of their detected events over time, weighted by severity. FIG. 25 shows the detected events with a severity graph 2510.

The severity graph view 2510 may contain a slider that allows the user to click and drag in order to change the date range shown within the graph. There may be a severity filter 2530 in the form of a drop-down list. The default setting may be "all".

The user may select from "High", "Medium", and "Low". The selection may change the appearance of the severity graph 2510 by displaying only those data points that are relevant to the category selected. Hovering over a point on the severity graph 2510 may present a tool tip window that displays the event title, the date of the event, the severity, and the status (resolved/unresolved). There may be a list of detected events 2540 positioned next to the severity graph 2510. The list 2540 may contain the title of the event as well as the date of the event. A user may sort by date or by event (presented in reverse chronological order by default). Changing the sort order of the list changes the graph 2510 displaying the corresponding data points.

Figure 26:

Referring to FIG. 26, a list of chronological events 2600 may be provided. The display of a list only view presents the user with a chronological (reverse by default) view of all detected events that may be similar to the detected events view within the user dashboard, only extended to accommodate all the space within the main viewing area.

There may be a column for the date of the event 2610, the name of the institution related to the event 2620, and the severity level of each event 2630.

Clicking on an item may spawn a window providing the details for that item as well as a button and text allowing the user to edit the item's resolved/unresolved state. For example, if a user has made a mistake and goes back and makes a change, then that event becomes part of their identity (e.g., they recognize the event as associated with them).

Figure 27:
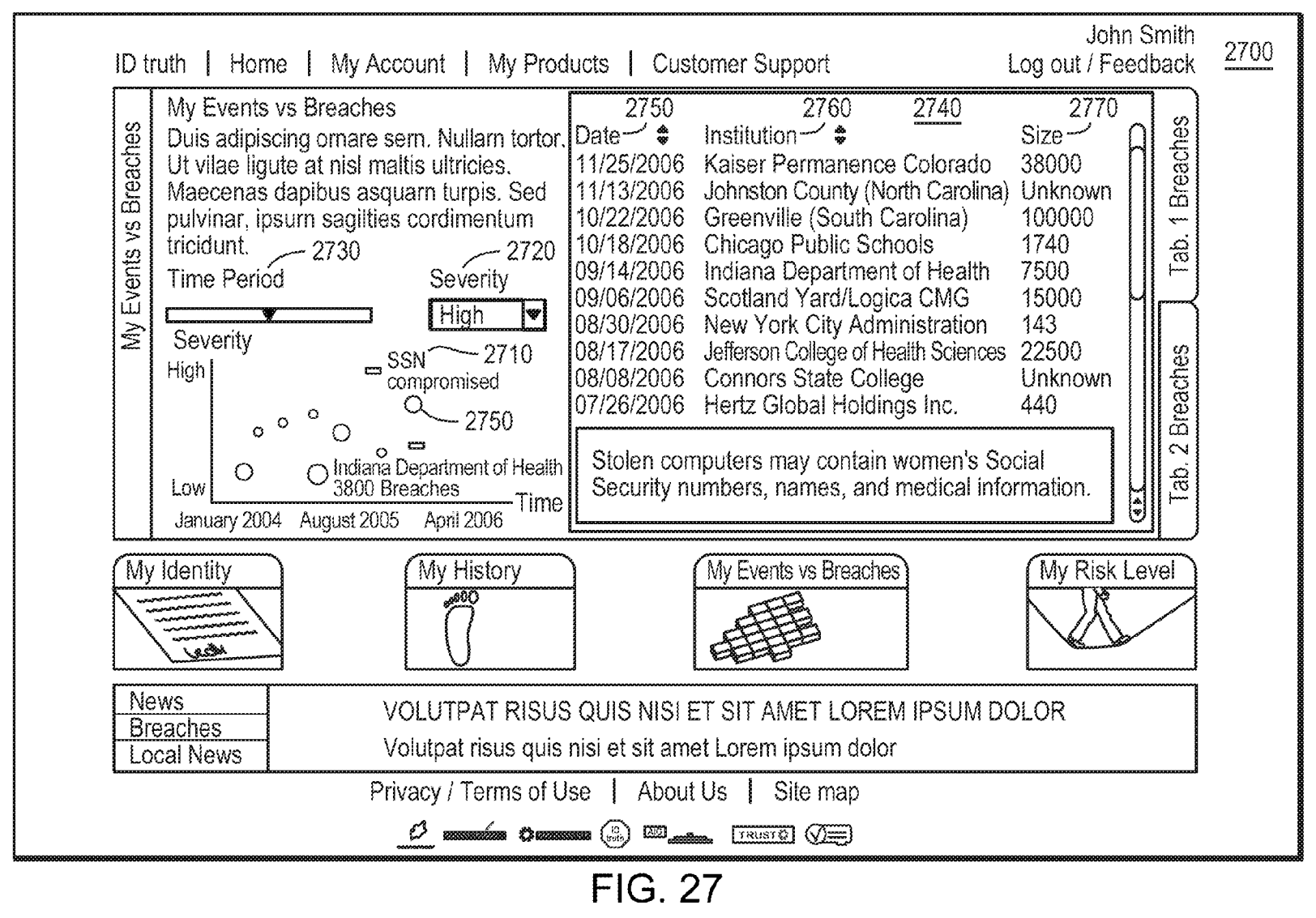

Referring to FIG. 27, in some embodiments, an Events vs. Breaches area 2700 (accessed, for example, by selecting graphical button 2375 on dashboard 2300 of FIG. 23) includes two tabs. The first tab ("Events vs. Breaches") enables a user to view a time series graph 2710 containing known breaches that have occurred throughout the population. The user also may see personal events (e.g., the same events that are listed in a My Fraud Alerts area) superimposed against the known breaches, and may be able to filter the breaches by severity 2720 and time 2730. The user also may be presented with a list of the breaches 2740 to the right of the graph, which contain functionality. Referring also to FIG. 28, a second tab ("Breaches") 2800 allows a user to view a list of the breaches with the same filters, and allows the user to take actions to associate or disassociate the breach with them.

Referring again to FIG. 27, the breaches may be represented by "bubbles" 2750 on the graph 2710. The size of each bubble may represent the size of the breach, if known (i.e. how many people affected by the breach, etc.). The Y-axis of the graph may represent severity (i.e. how potentially damaging the information leaked was), based on an algorithm derived from elements such as SSN, addresses, phone numbers, etc. Therefore, the more severe the breach, the higher the bubble may be placed along the Y-axis. The X-axis may be based on time. There may be a "time period" slider control 2730 positioned above the graph. The user may be able to point, click, and drag the slider from side-to-side. Doing so will change the time range displayed in the graph's X-Axis. There may be a "severity" filter displayed as a drop-down list 2720 and positioned above the graph, adjacent to the time period slider. The default setting may be "all". The user may select from "Low", "Medium", or "High". When doing so, the graph will change by displaying only those bubbles that correspond to the severity level selected. The user's detected events may be displayed superimposed on the graph.

A breach filter area 2740 may be positioned to the right of the graph and will list the breaches including the date of the breach 2750, the name of the institution 2760, and the size 2770 (number of records lost, etc.). A user may hover over a breach in the filter area 2740 and the corresponding bubble may be illuminated and display descriptive text providing the user with a synopsis of the breach. Clicking on a breach item allows a user to associate or disassociate himself/herself with the item. In some embodiments, the items may be listed in reverse chronological order by default and may be able to be sorted. Hovering over the breach items will spawn a tool tip window which will provide a synopsis of the breach.

In one embodiment, clicking on a breach item in the filter area spawns a new browser window. This window may behave similar to the "resolve detected event" window. The pop-up window will show all information known about the breach and ask the user if they are associated with the institution that had the event (yes or no). For example, the user may be asked if he has an account and/or data with the entity that has been breached. Once a user associates a breach with themselves, the corresponding breach bubble in the graph may be highlighted, and the same item in the breach filter may be denoted with a graphic icon. Users may be able to sort the date, institution, and size columns by clicking on sort icons at the top of the columns.

With respect to the breaches tab 2800, the breach items may be listed similar to those in the breach filter area 2740 of the "Events vs. Breaches" section 2700, except that a "severity" column 2810 may be added which may display the corresponding severity values (high, medium, low). The columns may also be able to be sorted by the column headings. Users may be able to click on the breach event to associate/disassociate themselves with the event (may be the same experience as in the Events vs. Breaches filter area. Users may be able to sort the breach events by clicking on sort control at the top of the columns (date, institution, size, and severity).

Figure 29:
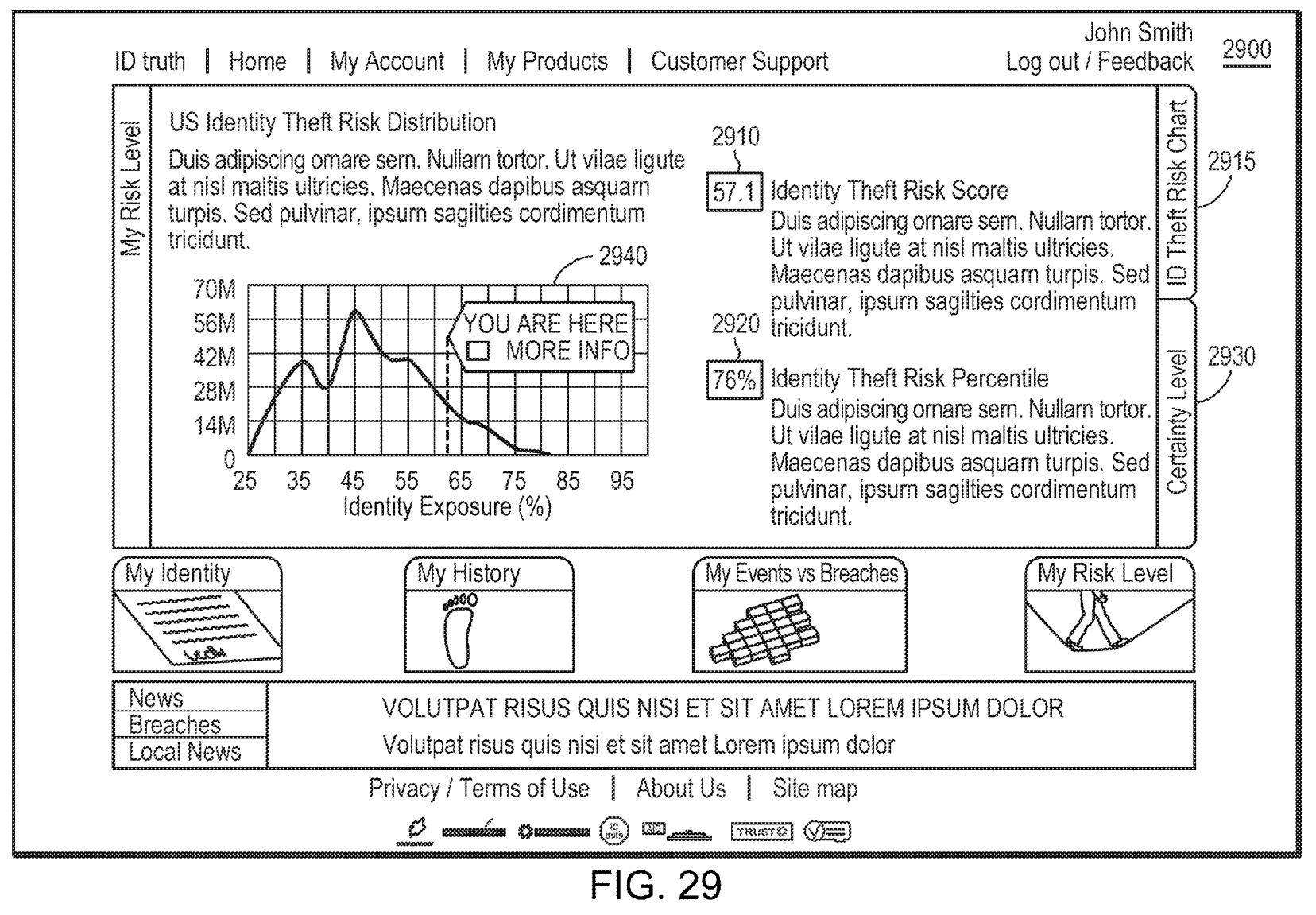

Referring to FIG. 29, a "My Risk Level" display 2900 (accessed, for example, by selecting graphical button 2380 on dashboard 2300 of FIG. 23) may provide the end user with his or her current risk score 2910 as well as provide the user with a "certainty score," which may be an indicator of how certain the system is of the user's risk situation based on the quantity of information that has been provided by the user or from data feeds. Either or both the current risk score 2910 and the certainty score may be associated with a descriptive label regarding their numeric representations.

As shown, this section may contain two tabs. In one embodiment, a first tab 2915 (default) provides the user with his/her current risk score (described further herein) while the second tab 2930 provides a certainty level.

FIG. 29 depicts an exemplary representation of the current risk score tab 2915. The page may contain a title (e.g. "Current Risk Level"), along with some explanatory text that tells the user what he/she is viewing. The page may contain a graph 2940 that contains identity theft risk exposure levels for the U.S. population, along with an indicator of how the user compares with the population. The graph 2940 may contain a link to more information (the information may be displayed in a new browser window). The page may contain the user's Identity Theft Risk Score 2910 displayed numerically. The page may contain text that describes what the score means. The page may contain the user's Identity Theft Risk Percentile 2920, along with some explanatory text.

Figure 30:
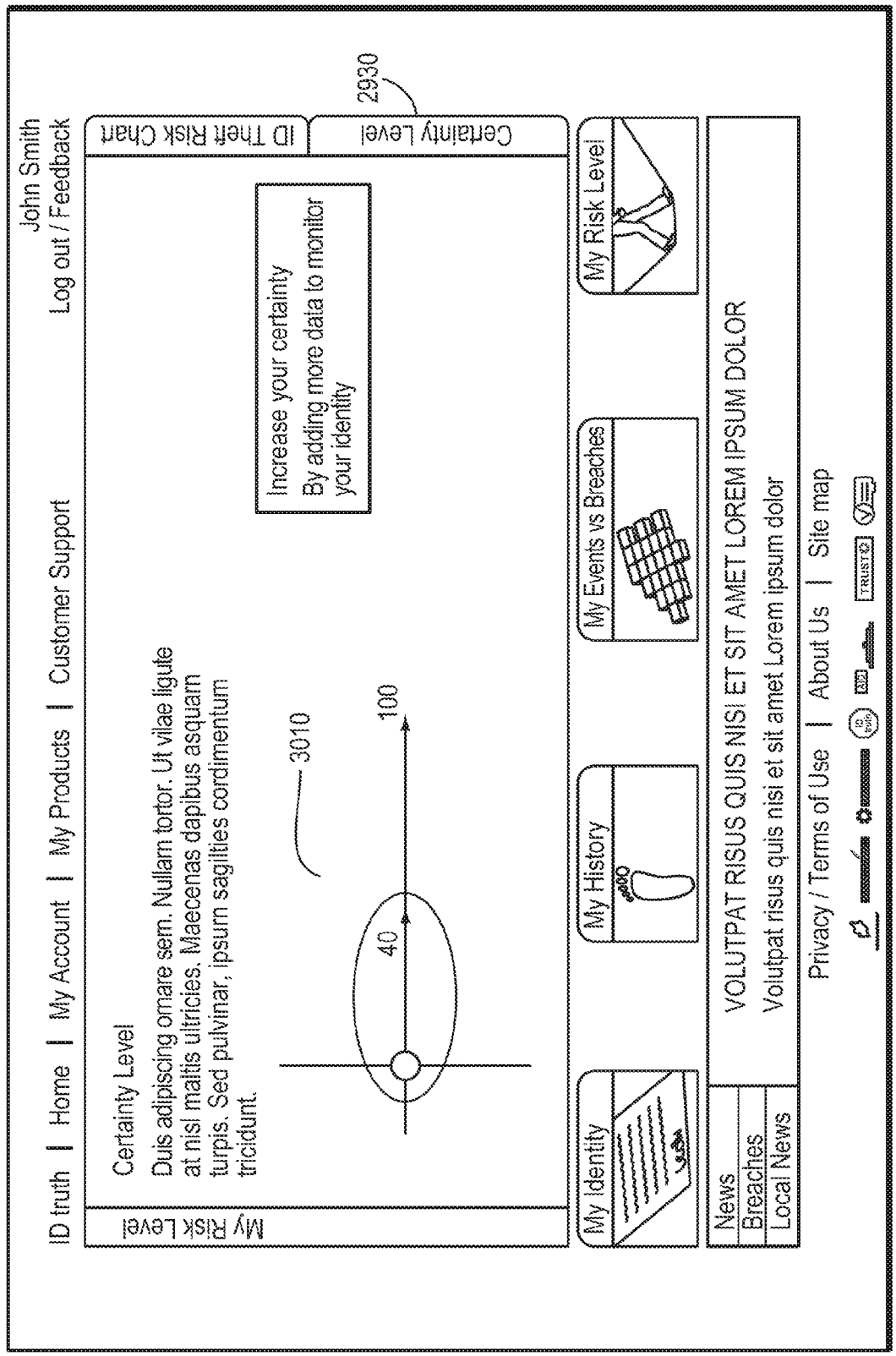
FIG. 30 is an exemplary certainty level display according to an embodiment of the invention.

Referring to FIG. 30, an exemplary representation of the Certainty Level tab 2930 is shown. The page may have a title (e.g. "Your Certainty Level", etc.), along with some explanatory text. The page may have a graphic 3010 that displays the user's overall certainty score. This graphic may be in the form of a circle with a bubble inside of it, where the larger the bubble, the more certain. The page may have some text/graphics that entice the end-user to enter more information to increase his/her certainty score (text may also speak to the benefits of increasing their score). The page may have a horizontal bar graph that displays the level of completeness for the various types of personal information (addresses, credit cards, etc.) that the service has for the user (not shown). The intent is to show the user which areas have strong information and which ones are weak. Clicking on one of the elements may bring the user to their "My Identity" page 2400 for the information type that they had clicked on (addresses, etc.)

News

In some embodiments, the system 100 may provide users with different types of news information, including identity fraud news and events, breach information, and local news within the user dashboard area 2300. In various embodiments, news also may be viewable within the My Identity, My History, My Events, and My Risk Level areas. The news headline display area may be positioned near the footer of each page. The news display area may contain a section for displaying headlines as well as an area for displaying tabs that indicate the category (local news, breaches, etc.) of news that is currently active. The news category tabs may change state as each tab becomes "active". The tabs may automatically rotate. The user may click on a tab to skip to that category (tabs may no longer rotate after doing so). Headlines may be displayed, and in some embodiments, clicking on a headline will spawn a new browser window displaying the full text of the news item.

There also may be a customer support page, and a place for users to provide general comments and feedback regarding the service.

Security

In general, in some embodiments, every user may be assigned certain roles and depending upon the privileges (or policies) associated with each role, access may be granted. The roles and privileges may be defined in a configuration, which may also contain a mapping section, describing which privileges are assigned to a particular role. The configuration may be changed to map new/existing roles to new/existing privileges. For example, there may be an Administrator role for service provider personnel, who may be responsible for managing consumer accounts and the overall administration of the application. There also may be a User role for end-users of the service, who may create accounts and edit account information. In some embodiments, this role will not have permission to downgrade a service plan or terminate service.

In various embodiments, privileges may include:
1. CREATE_CONSUMER_ACCOUNT: Privilege to create a consumer account.
2. UPDATE_CONSUMER_ACCOUNT: Privilege to update a consumer account.
3. DELETE_CONSUMER_ACCOUNT: Privilege to delete consumer accounts.
4. UPDATE_CONSUMER_ACCOUNT_PREFERENCES: Privilege to update consumer account's preferences.
5. UPDATE_CONSUMER_ACCOUNT_STATUS: Privilege to activate, deactivate, and reactivate consumer accounts.
6. VIEW_REPORTS: Privilege to view reports for consumer accounts.
7. VIEW_ADMIN_REPORTS_Privilege to view admin reports
8. UPDATE_MONITORING_SET_PREFERENCES—Privilege to modify the monitoring preferences for user accounts
9. MANAGING_FAQ & GENERAL MARKET DATA—Privilege to update FAQ & General market data & set rules Security settings for a site may dictate the views and functionalities available to the users. The security settings, in turn, may be driven by the privileges associated with a user. A role for a user may be created, for example, by associating predefined privileges with the user, so that a single user may have multiple privileges and multiple roles. Views available to a multi-role user may include a sum total of all the privileges associated with that user.

For example, if an area of the application (e.g., text, a link, an entire section, or entire page or portlet) needs to be shown only to a subset of users, it may be associated with a named privilege. Access to the area may be shown/granted to the user only if the user has that privilege associated with their user account. The association in this case is indirect, since users are directly associated to roles, then roles to privileges. Each user account may be associated with one or more roles. A role, being its own distinct entity, may be associated with one or more privileges.

Administration Requirements

An administration area of the consumer application may be used by administrative personnel for management of customer accounts (e.g., replicating end-user self-service functions that users are unwilling and/or unable to perform themselves), as well as additional functions not available to end-users, and reporting of usage information.

An administration area may include a high-level, population-wide interface for reporting on overall service usage and providing filtered searches for account(s) meeting search criteria, as well as detailed view presenting parameters for an individual account. In some cases, administration users may be customer service representatives (CSRs) working in a call center environment to address customer requests (e.g., password resets, plan changes, etc.). Due to the typical costs attributable to CSR support, care may be taken to optimize the presentation of information in this interface such that CSRs may perform their tasks quickly and efficiently. Wherever possible, a consumer application leverages infrastructure already in place with the business application (e.g., account filter screens).

In some embodiments, a summary usage report may be viewable by internal sales and marketing personnel. The report may provide a breakout of usage by plan type, i.e. "how many plans have been sold?" with relevant filters. It may also include information about time/date purchased, geography, plan type, and percentage of conversions (e.g., how many have upgraded plans). The consumer application may provide a facility to generate a filtered list of account(s) (essentially, an account search functionality). Filter criteria may include: first name, last name, email address, user ID, SSN, and/or subscription plan. The result of the filtered search may be a pick list of accounts, permitting users to select one or more accounts for detailed views. The consumer application may provide a single page view of all information pertaining to a single account. This may include all information entered by the user via the registration wizard, as well as their subscription plan and notification selections. This page may be organized with logical groupings of data correlating to the individual steps of the registration wizard. Within this view, administrators may edit any account information, reset user ids and passwords, change the user to another subscription plan, or terminate service and close the account. In addition, this view may provide a facility to issue account credits to premium subscription plan users in the event of billing mistakes.

In one embodiment, a map is provided that indicates the location of the user. The map may have additional information related to the time zone of the user, and application—relevant information, such as recent identity incidents, and so forth.

In one embodiment, the administration area allows for creation, reading editing, and deleting of plan descriptions, pricing, site content, RSS feeds, notification messages, update fraud models, and so forth. This capability may depend on permissions assigned to the user.

With respect to notifications, the service may provide notifications to users, for example via email and/or SMS messaging for various fraud and account events.

Notification Requirements

The consumer application notification infrastructure may provide notifications to users via email, SMS messaging, and/or telephone (e.g., automatic voice recordings) for various fraud and account events. In some implementations, users may control their preferences for notification mechanism. Upon successful completion of a registration wizard, a notification may be generated welcoming the user to the service, summarizing the benefits of the service plan selected and providing links to login and customer service. Upon detection of a fraud or identity theft event (e.g., if the overall risk value for a particular customer reaches a predetermined threshold value) a notification may be generated alerting the user(s) and providing links to the Service dashboard for additional information and remediation steps. A message may be delivered according to the user's specified preferences.

An alert may direct a customer to log into the portal when their overall risk score has reached this threshold. The notification may convey an appropriate sense of urgency. The user may be able to confirm or deny the notification. A skepticism level may be applied on the model on the response of the end user. In other words, the responses themselves may be inaccurate.

In addition, the service may generate a regular, periodic notification detailing the identity health of the subscriber. Frequency of generation may be determined by the specifics of the subscribed service plan. Again, these messages may be delivered via the communication mechanism specified by the user's preferences.

Periodic email notifications may be sent to the customer to prompt them to log into the portal and check their overall identity scores, view their assets and any discrepancies that rulesets have detected.

All reporting to the customer may be done via the authenticated access to the portal over https. The transmission of pdf files and sensitive information may be performed in a manner that authenticates the recipient and controls the delivery of content to make sure it is timely.

A mechanism to create trust with the customer to alleviate their fears of a phishing attack may be used. Exemplary mechanisms, such as those used in the financial industry, for example, include allowing the user to select a graphic, and including that graphic in communication to the user.

In some embodiments, a notification is generated for a user of a trial subscription plan if the user has not converted membership to a paid plan within a predetermined number of days of the plan expiration date. This notification may provide details as to why their plan is terminating, the benefits they will receive by signing up for a paid plan, and provide links to the dashboard area where the users may upgrade their plan. In some embodiments, a dashboard provides a mechanism to change the user's subscription to a paid plan with collection of credit card billing data, even if the trial plan has terminated. If the user has not taken action by 1 day prior to plan termination, the notification may be re-generated. If the trial plan is terminated without user action, a notification may be generated acknowledging the termination of the user's service, and again providing links to convert to one of the paid plans. When the trial plan has expired, in no case may the user be able to sign up again for the trial plan with that email address. These messages may be delivered via email only.

With respect to the personal identity health score, the intent of this score is to provide subscribers with an indication of the likelihood that a loss will occur as a result of identity theft as well as, in some cases, a measure of the relative size of their possible loss. This may be accomplished by determining the number of assets susceptible to loss, examining the attributes of the subscriber, monitoring for changes in these attributes and detecting events that are known to be part of fraud models.

One factor in determining the possible loss is the number of subscriber assets for which a thief may take control. Bank accounts, credit cards, home equity credit lines and real estate are examples of assets that a thief may control. Another factor is whether or not those assets are active. Inactive assets have the most exposure, as the subscriber is not likely to find out about the loss of control for months. Credit card companies do not send bills for inactive accounts. Thus, diversion of the bill to a new address will not be discovered. For inactive home equity credit lines, the subscriber is not likely to look at the balance, since they know they have not written any checks against the credit line.

Obviously, thieves do not know which accounts are active and which are not, but the more inactive accounts there are, the higher the chances that the one that is taken over by the thief is an inactive account.

For example, inactive credit cards are prime targets of thieves. Since bills are not sent for inactive cards, the subscriber would never know that the bills are being diverted. Not seeing the bills, they are unaware of the activity. Balance and payment history information about credit cards may be determined by commercial sources, such as a credit profile.

As another example, research has shown that a significant percentage of fraud is perpetrated by someone known to the subscriber. Thus, the number of people at the residence over the age of 13 is a measure of the people closest to the subscriber and with best access to personal information. This may be determined from census data and/or from commercial sources.

As another example, live pay checks or pay stub receipts may be stolen or otherwise compromised. They may contain at least partial SSN and personal information. Given partial SSN, birthplace and age may enable a perpetrator to determine a full SSN. Direct deposit therefore may be safer, and the score may be adjusted appropriately.

As another example, bank and credit card statements delivered in U.S. mail may be stolen or otherwise diverted via change of address. Electronic delivery is safer, and the score may be adjusted appropriately.

As another example, credit card offers and pre-approvals are often delivered to prior addresses. The more offers, the more likely this is to occur. This may be determined from commercial information providers.

As yet another example, if a user has had an address change in last year, this increases the likelihood that mail will go to a prior address. This may be determined from commercial information providers.

As another example, renters are much less likely to be subjects of mortgage or real estate fraud as they have less of an established payment history and thus it is more difficult to obtain a loan in their name. This may be determined from the subscriber and from commercial information providers.

As another example, just like inactive credit cards, inactive home equity lines may not be tracked actively by a subscriber. These may be prime targets for a thief. This may be determined from the subscriber and from commercial information providers.

An another example, it may be possible to estimate a level of association with a known breach. For example, if the user may have done business with the organization that was breached then it may be indirect. This may be based on geographic proximity and/or other factors. If the user has affirmatively done business with the breached organization then it may be more direct.

As mentioned, identity fraud may vary by location and age. Young adults may be on average less careful about protecting their personal assets, for example, by not shredding papers with personal information, not processing change of address forms, or not shutting off utility service when leaving a residence. Older people may be more likely to take more care in protecting personal assets. Risk is likely to increase after a certain age due to the need to hire outside help.

Some factors that affect likelihood are more easily determined than others. A user may indicate that he shreds documents, but the service cannot be sure that they do so all the time or even shred the right documents. A user may say that he is careful not to divulge sensitive information, but the service may not be certain that they are always careful. On the other hand, it is likely that users will provide reliable answers to the following: (1) Is your incoming mailbox secure (locked)? (2) Do you receive paper bank statements? (3) Do you receive paper credit card statements? (4) Did you file a Change Of Address form with the USPS after you moved? (5) Do you receive live salary checks or direct deposit? (6) Are you a home owner? The first five factors give some indication of how exposed the subscriber is to mail theft or diversion. In addition, with respect to factor number 6, home owners are susceptible to real estate fraud, while renters are not. Other factors affecting likelihood are the number of previous addresses and the number of residents at the subscriber's address. This data may be gleaned from public records data.

There is empirical evidence from the U.S. Federal Trade Commission that zip code and age are factors in identity theft. While it is not certain that there is a correlation, it is possible to adjust an overall predicted identity risk score according to FTC data.

Calculation of an Identity Health Score

In some embodiments, an identity health score is calculated by presuming that everyone has some base risk that is a result of being a member of society. This risk is increased depending upon the size of potential losses and the relative likelihood that these losses will occur. The entire result may be adjusted based upon the subscriber's zip code and age. The concept of relative likelihood is important. Even if it is not possible to determine the exact likelihood, the relative likelihood of one subscriber to another and to the general population may be determined.

The identity health score for an individual may have three components: a base score, a score due to attributes and likelihood, and a score due to detected events. As explained below, the first two components may be weighted by demographic information (e.g., location and age). In some embodiments, the location/age factors vary from 0.8 to 1.2.

In some embodiments, the identity health score for an individual ranges from 0 to 100. A score of 100 is for an individual who has a very low risk of identity theft (e.g., an individual who lives on a deserted island and has no assets). A score of zero is for an individual who has a very high risk of identity theft and/or who has already suffered identity theft. For example, an individual who has had their identity stolen and who has suffered serious financial damage (more than incidental credit card fraud) may have an identity health score of 0.

In some such embodiments, the base score is assigned a nominal value of 20, attributes and likelihood are assigned a nominal value of 30, and events are assigned a nominal value of 50. The actual score available to the events may be such that the total score cannot exceed 100.

A general formula for the first two components (i.e., the base score and the score due to likelihood and attributes (e.g., the individual's number and use of credit cards and the individual's risk of exposure due to inactive home equity credit lines)) is given by:

$$HS_{12}=100-[D_b 20+D_{cc}(10*(1-e^{-(all/(active+1))})+D_{he}(20*(HECL))]*likelihood \quad (1)$$

where, $HS_{12}$ is the health score for the first two components; $D_b$, $D_{cc}$, and $D_{he}$ are demographic constants which may be chosen based upon the individual's zip code and age; "all" is the number of credit cards the individual owns; "active" is the number of active credit cards the individual owns; "HECL" is a value representing the individual's risk of identity theft due to an inactive home equity credit line; and "likelihood" is a factor representing the likelihood that a individual will in fact suffer financial loss due to identity theft. As explained, the "likelihood" factor may be calculated using Table 7 below.

In one embodiment, $D_b$ (a demographic base score constant), $D_{cc}$ (a demographic credit card score constant), and $D_{he}$ (a demographic home equity score constant) are each chosen to lie between 0.8 and 1.2. The greater the demographic constants are chosen to be, the lower $HS_{12}$ is calculated (by equation (1) above) to be, and the greater the individual's risk of identity theft is determined to be. In one particular embodiment, the demographic constants are chosen so that $D_b=D_{cc}=D_{he}$. Where the individual lives a region (determined, for example, by the individual's zip code) in which homes have a relatively high real estate value, $D_{he}$ may be increased to represent the greater loss to be incurred by that individual should an identity thief obtain access to the individual's inactive home equity credit line and abuse it.

With respect to the component of $HS_{12}$ determined from the individual's number and use of credit cards (i.e., the variables "all" and "active"), in some embodiments a presumption is made that the individual has zero inactive credit cards when he owns only one credit card, one inactive credit card when he owns two or three credit cards, and an upper limit of two inactive credit cards when he owns four or more credit cards. In other embodiments, the individual specifies to the system exact values for the variables "all" and "active."

With respect to the component of $HS_{12}$ determined from the individual's home equity credit lines, in some embodiments the variable "HECL" is assigned a value of 0 where the individual does not have an inactive home equity credit line and a value of 1 where the individual does have an inactive home equity credit line. Alternatively, a value for "HECL" may be determined to lie between 0 and 1 from U.S. Census Bureau information found at, for example, http://www.census.gov/hhes/www/housing/hvs/qtr406/q406tab6.html and http://www.census.gov/hhes/www/housing/hvs/annual06/ann06ind.html.

As mentioned, the variable "likelihood" may be calculated using Table 7 below. As explained below, a "likelihood" value for a typical individual is 0.8. Upper and lower limits for the "likelihood" variable may be chosen to be 1.2 and 0.6, respectively.

In another embodiment, where an individual provides only his age (for example by providing his birth date) and zip code to the system, $HS_{12}$ for a typical individual of the individual's age and residential location may be calculated from the following equation:

$$HS_{12}=100-[D_b 20+D_{cc}(10*(1-e^{-(STAC/(STAC-1))})+D_{he}(20*(HOF))]*0.8 \quad (2)$$

As can be seen from equation (2), the value for the variable "likelihood" is assumed to be 0.8. $D_b$, $D_{cc}$, and $D_{he}$ are demographic constants as described above. The variable "STAC" represents the average number of credit cards held by a typical individual in the state the individual lives in (as determined from the zip code provided by the individual interfacing with the system), and the variable "HOF" represents a home ownership factor for a typical individual being of the same age and living in the same location as the particular individual interfacing with the system, as further explained below.

In one embodiment, knowing only the individual's age and zip code, the variable "HOF" is determined from the following table:

TABLE 4

HOME OWNERSHIP FACTOR (HOF)
Source: U.S. Census Bureau 2006 statistics

| Age | NE or W | S | MW |
|---|---|---|---|
| <35 | .38 | .43 | .49 |
| 35-44 | .65 | .70 | .75 |
| >44 | .72 | .78 | .80 |

In this table: S=zip codes beginning with 27, 28, 29, 40, 41, 42, 37, 38, 39, 35, 36, 30, 31, 32, 34, 70, 71, 73, 74, 75, 76, 77, 78, 79; MW=zip codes beginning with 58, 57, 55, 56, 53, 54, 59, 48, 49, 46, 47, 60, 61, 62, 82, 83, 63, 64, 65, 66, 67, 68, 69; and NE or W=all other zip codes.

If, however, the zip code provided by the individual also matches a zip code used in a "principle city", the HOF determined from Table 4 is, in some embodiments, multiplied by a factor of 0.785 to acknowledge the fact that home ownership in "principle cities" is 55% vs. 70% for the entire country. The U.S. Census Bureau defines which cities are considered to be "principle cities." Examples include New York City, San Francisco, and Boston.

With knowledge of the individual's zip code, a value for the variable STAC may be obtained from the following table:

TABLE 5

STATE AVERAGE CARDS (STAC)

| State | Avg. cards |
|---|---|
| New Hampshire | 5.3 |
| New Jersey | 5.2 |
| Massachusetts | 5.1 |
| Rhode Island | 5.0 |
| Minnesota | 4.9 |
| Connecticut | 4.8 |
| Maine | 4.7 |
| North Dakota | 4.6 |
| Michigan | 4.5 |
| New York | 4.5 |
| Pennsylvania | 4.5 |
| South Dakota | 4.5 |
| Florida | 4.4 |
| Maryland | 4.4 |
| Montana | 4.4 |
| Nebraska | 4.4 |
| Ohio | 4.4 |
| Vermont | 4.4 |
| Hawaii | 4.3 |
| Virginia | 4.3 |
| Idaho | 4.2 |
| Illinois | 4.2 |

TABLE 5-continued

STATE AVERAGE CARDS (STAC)

| State | Avg. cards |
|---|---|
| Wyoming | 4.2 |
| Colorado | 4.1 |
| Delaware | 4.1 |
| Utah | 4.1 |
| Wisconsin | 4.1 |
| United States | 4.0 |
| Iowa | 4.0 |
| Missouri | 4.0 |
| Nevada | 4.0 |
| Washington | 4.0 |
| California | 3.9 |
| Kansas | 3.9 |
| Oregon | 3.9 |
| Indiana | 3.8 |
| Alaska | 3.7 |
| West Virginia | 3.6 |
| Arkansas | 3.5 |
| Arizona | 3.5 |
| Kentucky | 3.5 |
| North Carolina | 3.5 |
| South Carolina | 3.5 |
| Tennessee | 3.5 |
| Georgia | 3.4 |
| New Mexico | 3.4 |
| Alabama | 3.3 |
| Oklahoma | 3.3 |
| Texas | 3.3 |
| Louisiana | 3.2 |
| District of Columbia | 3.0 |
| Mississippi | 3.0 |

There is, however, a degree of uncertainty associated with the actual number of credit cards owned by a typical individual having the same age and residing at the same location as the individual interfacing with the system. By defining an upper limit for $HS_{12}$ to be:

$$HS_{12}=100-[D_b 20+D_{cc}(10*(1-e^{-(7/(3))})+D_{he}(20*(1))]*1.2 \quad (3)$$

and a lower limit to be:

$$HS_{12}=100-[D_b 20+D_{cc}(10*(1-e^{-(7/(3))})+D_{he}(20*(0))]*0.6, \quad (4)$$

the individual may be told that his $HS_{12}$ score (or full identity health score, $HS_{full}$, as described below) is "x" percent certain, where "x" may be determined from the following table:

TABLE 6

CERTAINTY OF IDENTITY HEALTH SCORE

| State | Certainty |
|---|---|
| New Hampshire | 76.80% |
| Massachusetts | 78.40% |
| Minnesota | 79.31% |
| Rhode Island | 78.63% |
| Maine | 81.83% |
| Vermont | 83.20% |
| North Dakota | 82.06% |
| New Jersey | 77.14% |
| South Dakota | 82.29% |
| Connecticut | 79.89% |
| Montana | 82.86% |
| Hawaii | 84.57% |
| Pennsylvania | 81.83% |
| Nebraska | 82.63% |
| Iowa | 85.37% |
| Maryland | 81.83% |
| Ohio | 81.94% |
| Michigan | 81.03% |
| Wisconsin | 84.23% |
| Wyoming | 83.43% |
| Virginia | 82.97% |
| New York | 81.26% |
| Utah | 83.43% |
| Delaware | 83.89% |
| Missouri | 84.34% |
| Illinois | 83.43% |
| Idaho | 82.17% |
| Florida | 81.49% |
| Washington | 84.34% |
| Kansas | 84.80% |
| United States | 54.72% |
| Oregon | 55.40% |
| West Virginia | 58.43% |
| Alaska | 57.11% |
| Kentucky | 58.94% |
| Colorado | 54.60% |
| Indiana | 56.88% |
| Nevada | 55.22% |
| Tennessee | 59.79% |
| California | 56.77% |
| Arkansas | 59.91% |
| South Carolina | 60.19% |
| Alabama | 61.33% |
| Georgia | 60.42% |
| North Carolina | 59.96% |
| New Mexico | 61.22% |
| Oklahoma | 62.02% |
| Louisiana | 88.57% |
| Mississippi | 90.51% |
| Arizona | 85.83% |
| Texas | 87.54% |
| District of Columbia | 89.71% |

In one embodiment, additional information may be requested from the individual through survey questions in order to calculate a more certain identity health score for the individual. For example, referring back to equation (1), the variable "likelihood" may be determined using the following table:

TABLE 7

ATTRIBUTES AND CALCULATION OF LIKELIHOOD

| Questions for the Individual | None (LV = 0.00) | Low (LV = 0.05) | Medium (LV = 0.10) | High (LV = 0.15) |
|---|---|---|---|---|
| Number of residents 13 years of age or older living in the individual's residence, other than the individual himself and his spouse? | 0 | 1 | 2 or 3 | 4 or more |
| Live check or Direct Deposit? | Direct Deposit | Live | | |
| Bank statement delivered electronically or in paper? | Electronic | | Paper | |
| Credit Card statement delivered electronically or in paper? | Electronic | | Paper | |

TABLE 7-continued

ATTRIBUTES AND CALCULATION OF LIKELIHOOD

| Questions for the Individual | None (LV = 0.00) | Low (LV = 0.05) | Medium (LV = 0.10) | High (LV = 0.15) |
|---|---|---|---|---|
| Number of prior addresses? | 0 | 1 | 2 | 3 or more |
| Moved in last year? | Changed address with U.S. Postal Service | | | Did not change address with U.S. Postal Service |
| Mailbox Security? | Locked or Post Office Box | | Unsecured | |
| Breach Affiliation? | No connection | | Indirect | Direct |

Referring to Table 7, questions for individuals are listed in the left-hand column, while possible responses to those questions (attributes) are listed in one or more of the four columns labeled "None," "Low," "Medium," or "High." For each particular question, if the individual's response lies in the column "None," the likelihood value ("LV") for that question is 0.00. If, however, the response lies in the column "Low," "Medium," or "High," the likelihood value ("LV") for that question is 0.05, 0.10, or 0.15, respectively. The variable "likelihood" for equation (1) above may then be determined by summing the various likelihood values ("LV") for each of the questions as follows:

$$\text{Likelihood} = 0.4 + \Sigma LV \quad (5)$$

The attributes for what is considered to be, in one embodiment, a typical individual are italicized in Table 7. As shown, the exemplary typical individual has 1 resident 13 years of age or older living at the individual's residence (LV=0.05), direct deposit (LV=0.00), paper delivery of bank (LV=0.10) and credit card (LV=0.10) statements, 1 prior address (LV=0.05), and an unsecured mailbox (LV=0.10). Accordingly, the variable "likelihood" for this exemplary typical individual is calculated as follows:

$$\text{Likelihood} = 0.4 + \Sigma LV = 0.4 + 0.05 + 0.00 + 0.10 + 0.10 + 0.05 + 0.10 = 0.8 \quad (6)$$

Having calculated $HS_{12}$ for the individual, the individual's full identity health score may then be determined from the following equation:

$$HS_{full} = (HS_{12}) \ast (1 - (\text{Event Score})/120) \quad (7)$$

In equation (7), $HS_{12}$ is multiplied by a factor that depends upon particular events that are detected for the individual. In one embodiment, it is assumed that detected events are the acts of identity thieves until the individual indicates otherwise. In one embodiment, given the events that may be detected for the individual (the left-most column in Table 8 below) and follow-on events (the two middle columns in Table 8 below), a value is assigned to each possible event/follow-on event combination (the right-most column in Table 8 below). The variable "Event Score" in equation (7) is, in one embodiment, then set equal to the value for the particular event/follow-on event combination experienced by the individual. Where the individual experiences more than one event/follow-on event combination, the highest value in the right-most column of Table 8 below for those events/follow-on events may be assigned to the variable "Event Score" in equation (7).

TABLE 8

EVENT SCORE

| Event | Followed by | Followed by | Value |
|---|---|---|---|
| New phone for address | Nothing | | 6 |
| New phone for address | Change of address | | 12 |
| New phone for address | New home loan application | | 1 if refinanced, 2 if home equity, 5 if cell phone and refinanced, 10 if cell phone and home equity |
| New phone for address | Credit card application | | 49 if cell, 7 if landline |
| New phone for address | Loan discharged | New home loan | 18 |
| New phone for address | Loan discharged | Title transfer | 36 |
| New phone for address | $2^{nd}$ mortgage | | 45 |
| New phone for address | Social security number out of channel | | 42 |
| New phone for address | Credit card number out of channel | | 42 |
| Phone is changed | | | 16 |
| Phone is changed | Change of address | | 4 |
| Phone is changed | Home loan application | | 25 |
| Phone is changed | Credit card application | | 25 |
| Phone is changed | Equity credit line application | | 25 |
| Phone is changed | Loan discharged | | 45 |
| Phone is changed | $2^{nd}$ mortgage | | 24 |

TABLE 8-continued

| Event | Followed by | Followed by | Value |
|---|---|---|---|
| Phone is changed | Social security number out of channel | | 42 |
| Phone is changed | Credit card number out of channel | | 42 |
| New telephone for name or social security number | | | 12 |
| New telephone for name or social security number | Change of address | | 24 |
| New telephone for name or social security number | Home loan application | | 30 |
| New telephone for name or social security number | Credit card application | | 36 |
| New telephone for name or social security number | Equity credit line application | | 36 |
| New telephone for name or social security number | Loan discharged | | 36 |
| New telephone for name or social security number | $2^{nd}$ mortgage | | 45 |
| New telephone for name or social security number | Social security number out of channel | | 42 |
| New telephone for name or social security number | Credit card number out of channel | | 42 |
| Telephone records purchased | | | 40 |
| Telephone records purchased | Change of address | | 56 |
| Telephone records purchased | New home loan application | | 36 |
| Telephone records purchased | Equity credit line application | | 36 |
| Telephone records purchased | Loan discharged | | 18 |
| Telephone records purchased | Credit card application | | 18 |
| Telephone records purchased | $2^{nd}$ mortgage | | 45 |
| Telephone records purchased | Social security number out of channel | | 30 |
| Telephone records purchased | Credit card number out of channel | | 42 |
| Name/social security number appears on national change of address list | New address is existing address | | 40 |
| Name/social security number appears on national change of address list | Neither address tied to subscriber | | 40 |
| Name/social security number appears on national change of address list | Old address not tied to subscriber | | 40 |
| Name/social security number appears on national change of address list | From existing address to new address | | 32 |
| Name/social security number appears on national change of address list | Credit card application | | 42 |

TABLE 8-continued

| Event | Followed by | Followed by | Value |
|---|---|---|---|
| Name/social security number appears on national change of address list | Equity credit line application | | 36 |
| Name/social security number appears on national change of address list | Loan discharged | | 30 |
| Name/social security number appears on national change of address list | $2^{nd}$ mortgage | | 36 |
| Name/social security number appears on national change of address list | Social security number out of channel | | 42 |
| Name/social security number appears on national change of address list | Credit card number out of channel | | 42 |
| New mortgage on subscriber property | Property previously not mortgaged | | 35 |
| New mortgage on subscriber property | New phone number, No change of address | | 14 if landline 49 if mobile |
| New mortgage on subscriber property | New phone number, change of address | | 14 if landline 56 if mobile |
| New mortgage on subscriber property | Change of address | | 42 |
| New mortgage on subscriber property | Equity credit line application | | 36 |
| New mortgage on subscriber property | Credit card application | | 36 |
| New mortgage on subscriber property | Loan discharged | | 36 |
| New mortgage on subscriber property | Social security number out of channel | | 63 |
| New mortgage on subscriber property | Credit card number out of channel | | 63 |
| New mortgage tied to subscriber name or social security number | No other active loans | | 30 |
| New mortgage tied to subscriber name or social security number | No other active loans | Change of address | 48 |
| New mortgage tied to subscriber name or social security number | One or more other active loans | | 24 |
| New mortgage tied to subscriber name or social security number | New cell phone | | 56 |
| New mortgage tied to subscriber name or social security number | New landline phone | | 14 |
| New mortgage tied to subscriber name or social security number | New equity credit line | | 36 |
| New mortgage tied to subscriber name or social security number | Loan discharge >7 year | | 36 |

TABLE 8-continued

| EVENT SCORE | | | |
|---|---|---|---|
| Event | Followed by | Followed by | Value |
| New mortgage tied to subscriber name or social security number | Credit card application | | 36 |
| New mortgage tied to subscriber name or social security number | Social security number out of channel | | 56 |
| New mortgage tied to subscriber name or social security number | Credit card number out of channel | | 56 |
| New property tied to name/social security number | | | 30 |
| New property tied to name/social security number | Property sale | | 24 |
| New property tied to name/social security number | New mortgage loan | | 30 |
| New property tied to name/social security number | New mortgage loan | Change of address | 48 |
| New property tied to name/social security number | New loan of X | Existing loan of Y | 24 |
| New property tied to name/social security number | New loan of X | Existing loans of y and z . . . | 18 |
| New property tied to name/social security number | New cell phone | | 64 |
| New property tied to name/social security number | New landline phone | | 4 |
| New property tied to name/social security number | New credit card application | | 36 |
| New property tied to name/social security number | New equity credit line | | 36 |
| New property tied to name/social security number | Loan discharge >7 years | | 36 |
| New property tied to name/social security number | Social security number out of channel | | 63 |
| New property tied to name/social security number | Credit card number out of channel | | 63 |
| Loan (mortgage) tied to subscriber address discharged | | | 36 |
| loan (mortgage) tied to subscriber address discharged | Change of address | | 36 |
| loan (mortgage) tied to subscriber address discharged | New loan | | 25 |
| loan (mortgage) tied to subscriber address discharged | New cell phone | | 64 |
| loan (mortgage) tied to subscriber address discharged | New landline phone | | 4 |
| loan (mortgage) tied to subscriber address discharged | New equity credit line application | | 36 |
| loan (mortgage) tied to subscriber address discharged | New credit card application | | 36 |
| loan (mortgage) tied to subscriber address discharged | Social security number out of channel | | 63 |

TABLE 8-continued

| Event | Followed by | Followed by | Value |
|---|---|---|---|
| loan (mortgage) tied to subscriber address discharged | Credit card number out of channel | | 63 |
| loan (mortgage) tied to subscriber name/social security number discharged | | | 36 |
| loan (mortgage) tied to subscriber name/social security number discharged | Change of address | | 36 |
| loan (mortgage) tied to subscriber name/social security number discharged | New loan | | 25 |
| loan (mortgage) tied to subscriber name/social security number discharged | New cell phone | | 64 |
| loan (mortgage) tied to subscriber name/social security number discharged | New landline phone | | 4 |
| loan (mortgage) tied to subscriber name/social security number discharged | New equity credit line application | | 36 |
| loan (mortgage) tied to subscriber name/social security number discharged | New credit card application | | 36 |
| loan (mortgage) tied to subscriber name/social security number discharged | Social security number out of channel | | 63 |
| loan (mortgage) tied to subscriber name/social security number discharged | Credit card number out of channel | | 63 |
| Social security number on Social Security Administration Master death file | | | 100 |
| Social security number on Social Security Administration Master death file | New cell phone | | 45 |
| Social security number on Social Security Administration Master death file | New landline phone | | 45 |
| Social security number on Social Security Administration Master death file | New equity credit line application | | 81 |
| Social security number on Social Security Administration Master death file | New credit card application | | 49 |
| Social security number on Social Security Administration Master death file | Loan discharged >7 years | | 72 |
| Social security number on Social Security Administration Master death file | Loan discharged <7 years | | 72 |

TABLE 8-continued

| EVENT SCORE | | | |
|---|---|---|---|
| Event | Followed by | Followed by | Value |
| Social security number on Social Security Administration Master death file | New loan on previously unmortgaged property | No change of address | 56 |
| Social security number on Social Security Administration Master death file | Social security number out of channel | | 63 |
| Social security number on Social Security Administration Master death file | Credit card number out of channel | | 63 |
| New lien attached to property | | | 35 |
| New lien attached to property | New cell phone | | 63 |
| New lien attached to property | New landline phone | | 35 |
| New lien attached to property | New equity credit line application | | 49 |
| New lien attached to property | New credit card application | | 36 |
| New lien attached to property | Loan discharged >7 years | | 42 |
| New lien attached to property | Loan discharged <7 years | New mortgage | 21 |
| New lien attached to property | New loan on previously unmortgaged property | | 42 |
| New lien attached to property | Social security number out of channel | | 63 |
| New lien attached to property | Credit card number out of channel | | 63 |
| New court judgment against subscriber | | | 42 |
| New court judgment against subscriber | New cell phone | | 63 |
| New court judgment against subscriber | New landline phone | | 35 |
| New court judgment against subscriber | New equity credit line application | | 49 |
| New court judgment against subscriber | New credit card application | | 36 |
| New court judgment against subscriber | Loan discharged >7 years | | 42 |
| New court judgment against subscriber | Loan discharged <7 years | | 21 |
| New court judgment against subscriber | New loan on previously unmortgaged property | | 42 |
| New court judgment against subscriber | Social Security Number out of channel | | 63 |
| New court judgment against subscriber | Credit card number out of channel | | 63 |
| New address for Subscriber (not a change of address) | | | 42 |
| New address for subscriber | Change of Address | | 35 |
| New resident at sub address | | | 35 |
| Resident removed from subscriber address | | | 9 |
| Social security number out of channel | | | 100 |

TABLE 8-continued

| EVENT SCORE | | | |
|---|---|---|---|
| Event | Followed by | Followed by | Value |
| Credit card number out of channel | | | 100 |
| Subscriber Bank reports breach | | | 100 |
| Subscriber investment account institution or retirement account holder reports breach | | | 100 |
| Credit card application with Subscriber social security number | | | 36 |
| Driver's license issued in subscriber name in subscriber state | | | 48 |
| Driver's lice issued in subscriber name out of state | | | 56 |
| Automobile loan on car registered to subscriber | | | 35 |
| New car registration with subscriber social security number | | | 35 |
| Boat loan on boat registered to subscriber | | | 42 |
| Boat registration on subscriber's social security number in subscriber's home state | | | 42 |
| Boat registration on subscriber's social security number not in subscriber's home state | | | 49 |
| Warrant issued in name of subscriber or using subscriber social security number | | | 60 |

Alternatively, the identity health score may be calculated based solely on geographic location. There is data that indicates that fraud per capita varies by region. Therefore, it may be possible to assign a risk factor based on regional factors such as zip code and/or metropolitan area and on 3 digit zip. For example, the ten metropolitan areas with the highest identity fraud rates are:
1. New York, N.Y. 100-104
2. Detroit, Mich. 481-482
3. Los Angeles, Calif. 900-901
4. Little Rock, Ark. 720-722
5. Greenville, Miss. 387
6. Atlanta, Ga. 300-303
7. Phoenix, Ariz. 850, 852, 853
8. Portland, Oreg. 970-972
9. Dallas, Tex. 751-753
10. Springfield, Ill. 625-627

In a different embodiment, other factors, shown in Table 9 below, may be used in calculating the identity health score. The number of steps that would need to be taken by a thief in order to invoke fraud (the third column from the left in Table 9 below) is provided. The potential monetary damage level, "s", (with 1 being the lowest and 10 being the highest) and the difficulty to invoke fraud, "d", (with 1 being the most difficult and 10 being the least difficult) are also provided for each of the factors. In one embodiment of the invention, the identity health score "HS" may calculated by the following equation:

$$HS = s*d \qquad (8)$$

In such an embodiment, the greater the value of HS, the greater the risk of identity theft to the individual in question.

The factors may be ranked based on the resulting identity health score, "HS" (the right-most column in Table 9 below). As can be seen, for the factor of inactive credit cards (the first row in Table 9 below), the identity health score, "HS," is 15, which is assigned a rank of 6 for the factors listed in Table 9.

TABLE 9

HEALTH SCORE FACTORS AND RANK

| Factors | Potential monetary damage level (s) | Number of steps needed to invoke fraud | Difficulty to invoke fraud (d) (1 is most difficult) | Score (=s * d) | Rank |
|---|---|---|---|---|---|
| Inactive credit cards (guess 2 for now) | 5 | Get credit card number, change address, go to town | 3 | 15 | 6 |
| Inactive home equity credit line | 10 | Get checking account number, wash checks, go to town | 3 | 30 | 3 |
| Number of residents older than 12 years of age living in the individual's residence, other than the individual himself and his spouse | 3 | Get credit card number, social security number, bank account numbers, provide to others | 10 | 30 | 3 |
| Live check or Direct Deposit | 6 | Find full social security number, apply for credit, receive credit | 3 | 18 | 5 |
| Paper delivery of bank and credit card statement | 5 | Intercept mail, get numbers, access accounts. | 5 | 25 | 4 |
| Home owner | 10 | Impersonate, discharge loan and get new loan. | 1 | 10 | 7 |
| Level of affiliation with known breach | 3 | Get credit card number and use. Get social security number and impersonate. | 4 | 12 | 6 |
| Number of prior addresses (nominal = 2) | 4 | Apply for credit card offers, receive card, use | 8 | 32 | 2 |
| Moved in last year but no change of address filed | 5 | Apply for credit card offers, receive card, use | 8 | 40 | 1 |
| Mail delivered to unlocked box | 5 | Intercept mail, get numbers, access accounts. | 5 | 25 | 4 |

Having described certain embodiments of the invention, it will be apparent to those of ordinary skill in the art that other embodiments incorporating the concepts disclosed herein may be used without departing from the spirit and scope of the invention. For example, although the examples and calculations presented herein have focused on the United States, they may just as easily be adapted for other countries and/or regions of the world. Accordingly, the described embodiments are to be considered in all respects as only illustrative and not restrictive.

What is claimed is:

1. A computing system for providing identity fraud risk indicia, the system comprising:
  a fraud model subsystem that specifies patterns of events indicative of identity fraud, wherein each pattern comprises a type of fraud and information related to event timing;
  a business rules subsystem that, based on the patterns of events, specifies rules to identify fraud;
  a data aggregation subsystem that collects data input from a variety of sources, the data comprising demographic data for individuals, asset data for individuals, event occurrence data, identity theft statistical data, and personal data; and
  a processor for executing computer readable instructions that, when executed, employ the rules to:
    examine a static structure of a subset of the data that relates to an individual relative to underlying financial and physical assets and personal attributes of the individual;
    correlate interconnectivity of the subset with events that have changed the static structure in the past;
    correlate interconnectivity of the subset with new events discovered during a monitoring process; and determine whether the events and the new events are correlative with at least one of the patterns based on the rules.

2. The system of claim 1, wherein the processor further executes computer readable instructions that provide a prediction of fraud events that are likely to occur.

3. The system of claim 2, wherein the prediction comprises a probability that such fraud events are likely to occur.

4. The system of claim 2, wherein the processor further executes computer readable instructions that provide recommendations of steps to be taken to avoid predicted fraud events.

5. The system of claim 1, wherein the processor further executes computer readable instructions that identify fraud events that are likely to occur.

6. The system of claim 5, wherein the identified fraud events are compared to fraud scenarios specified in the patterns of events indicative of identity fraud.

7. The system of claim 5, further comprising rulesets, and wherein the processor further executes computer readable instructions that use the rulesets to evaluate fraud events that have occurred.

8. The system of claim 1, further comprising a communication subsystem for communicating to the first individual fraud events that are likely to occur.

9. The system of claim 1, further comprising a communication subsystem for communicating with a financial organization.

10. The system of claim 1, further comprising a communication subsystem for alerting the first individual.

11. The system of claim 1, wherein the processor further executes computer readable instructions that cause at least some of the data input from the variety of sources to be normalized.

* * * * *